(12) United States Patent
Crosier

(10) Patent No.: US 11,990,721 B2
(45) Date of Patent: May 21, 2024

(54) ELECTRICAL CABLE CONNECTING SYSTEM

(71) Applicant: Mark David Crosier, Ipswich (GB)

(72) Inventor: Mark David Crosier, Ipswich (GB)

(73) Assignee: Mark D. Crosier, Ipswich (GB)

( * ) Notice: Subject to any disclaimer, the term of this patent is extended or adjusted under 35 U.S.C. 154(b) by 0 days.

(21) Appl. No.: 18/215,071

(22) Filed: Jun. 27, 2023

(65) Prior Publication Data

US 2023/0344156 A1 Oct. 26, 2023

Related U.S. Application Data

(62) Division of application No. 17/164,266, filed on Feb. 1, 2021, now Pat. No. 11,728,581.

(Continued)

(51) Int. Cl.
*H01R 4/22* (2006.01)
*H01R 4/48* (2006.01)
(Continued)

(52) U.S. Cl.
CPC ........... *H01R 4/48185* (2023.08); *H01R 4/22* (2013.01); *H01R 13/6271* (2013.01);
(Continued)

(58) Field of Classification Search
None
See application file for complete search history.

(56) References Cited

U.S. PATENT DOCUMENTS

| 4,445,739 A | 5/1984 | Wooten |
| 4,824,395 A | 4/1989 | Blaha |
| (Continued) | | |

FOREIGN PATENT DOCUMENTS

| CN | 109616809 A | 4/2019 |
| DE | 3330177 A1 | 4/1985 |
| (Continued) | | |

OTHER PUBLICATIONS

International Search Report and Written Opinion for Application No. PCT/IB2021//050790, dated Jun. 22, 2021, 18 pages.

(Continued)

*Primary Examiner* — Tho D Ta
(74) *Attorney, Agent, or Firm* — McCarter & English, LLP

(57) ABSTRACT

An electrical cable connecting system includes a modular electrical or electronic wiring device assembly, in which an electrical or electronic wiring device and a connector may be electrically coupled via pig-tail jumper electrical wires. The connector may be coupled to cable electrical wires fitted with a cable protector to protect the electrical wire conductors therein. The connector may include internal electrical terminals for electrically coupling building electrical cable wires with corresponding jumper electrical wires. The connector may be mechanically and electrically coupled to and directly terminate one or more building electrical cables, which may provide power to or from one or more electrical or electronic wiring devices by establishing an electrical pathway from a source of electrical power, through the building electrical cable wires, the connector, the pig-tail jumper electrical wires and an electrical or electronic wiring device.

3 Claims, 32 Drawing Sheets

Related U.S. Application Data

(60) Provisional application No. 62/969,042, filed on Feb. 1, 2020.

(51) Int. Cl.
    *H01R 13/627*     (2006.01)
    *H01R 25/00*     (2006.01)
    *H02G 3/18*     (2006.01)

(52) U.S. Cl.
    CPC ......... *H01R 25/003* (2013.01); *H01R 25/006* (2013.01); *H02G 3/18* (2013.01)

(56) References Cited

U.S. PATENT DOCUMENTS

| | | |
|---|---|---|
| 6,746,286 B2 | 6/2004 | Blaha |
| 7,195,517 B1 | 3/2007 | Savicki, Jr. |
| D574,773 S | 8/2008 | Sutter |
| 7,407,410 B1 | 8/2008 | Benoit et al. |
| 7,510,429 B1 | 3/2009 | Savicki, Jr. et al. |
| 7,527,509 B1 | 5/2009 | Bethurum et al. |
| 7,666,010 B2 | 2/2010 | Arenas et al. |
| D616,831 S | 6/2010 | Arenas et al. |
| D618,627 S | 6/2010 | Arenas et al. |
| 7,851,704 B2 | 12/2010 | Fitch et al. |
| 8,113,874 B2 | 2/2012 | Lacey et al. |
| 8,235,748 B2 | 8/2012 | Lacey et al. |
| 8,944,843 B2 | 2/2015 | Keswani |
| 9,466,895 B2 | 10/2016 | Köllmann et al. |
| 9,664,197 B2 | 5/2017 | Walker et al. |
| 10,490,956 B2 * | 11/2019 | King ................... H01R 25/006 |
| 11,728,581 B2 * | 8/2023 | Crosier ............. H01R 13/6271 |
| | | 439/441 |
| 2009/0181580 A1 | 7/2009 | Bethurum et al. |
| 2021/0242610 A1 | 8/2021 | Crosier |

FOREIGN PATENT DOCUMENTS

| | | |
|---|---|---|
| DE | 102008028575 A1 | 12/2008 |
| DE | 102008032264 A1 | 1/2009 |
| DE | 102010028790 A1 | 11/2010 |
| EP | 3118936 A1 | 1/2017 |

OTHER PUBLICATIONS

International Preliminary Report on Patentability for Application No. PCT/IB2021//050790, dated Aug. 11, 2022, 13 pages.

\* cited by examiner

FIG.3A                    FIG.3B

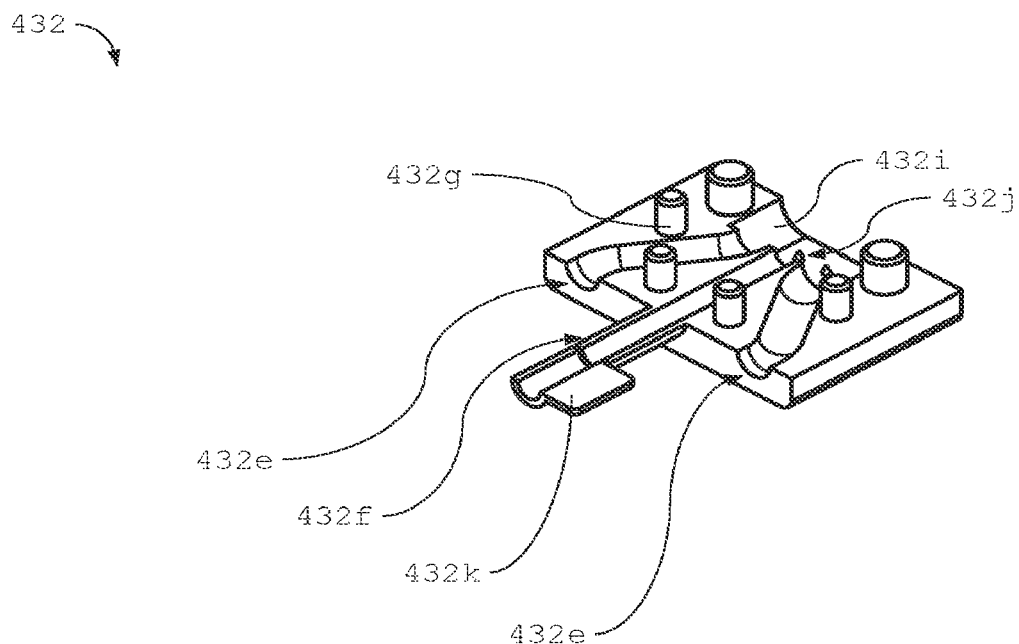
FIG.3I
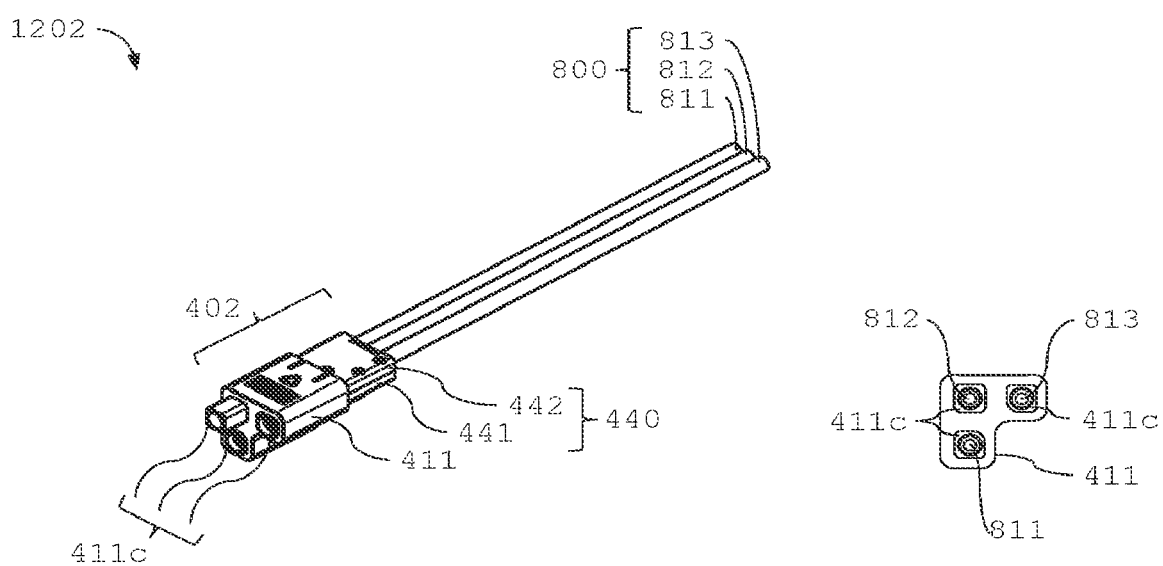
FIG.3J
FIG.3K

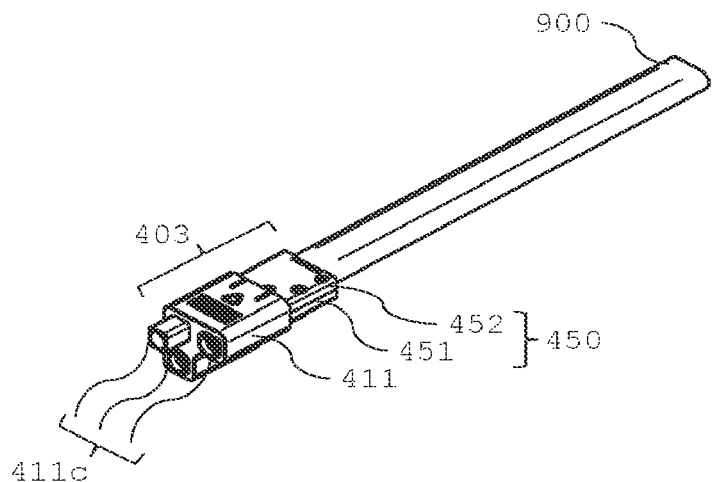
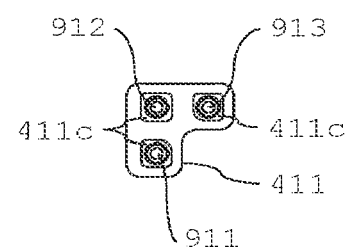
FIG.3N　　　　　　　　　　FIG.3P
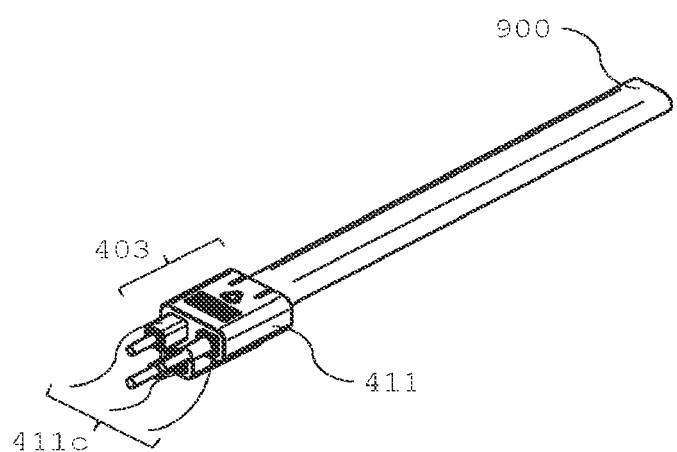
FIG.3Q

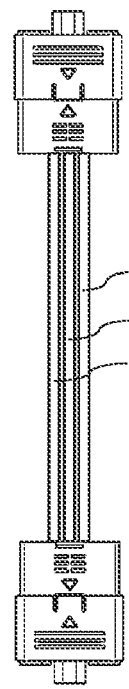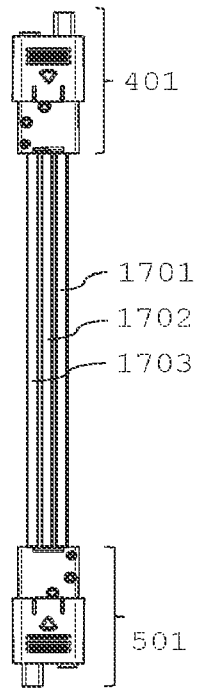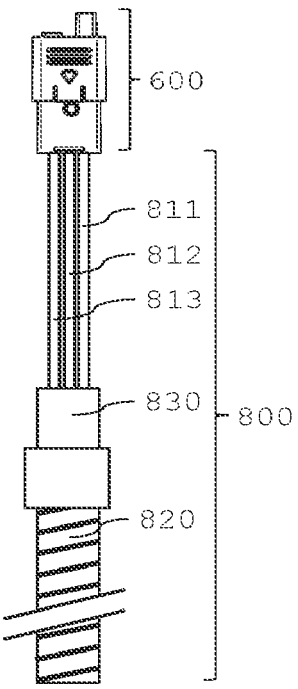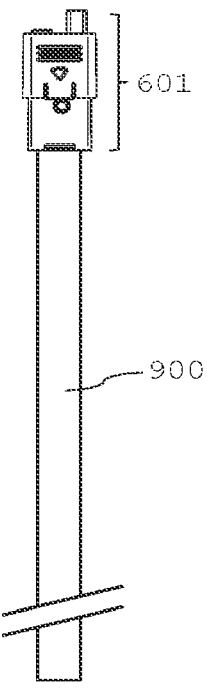
FIG.23A    FIG.23B    FIG.24A    FIG.24B
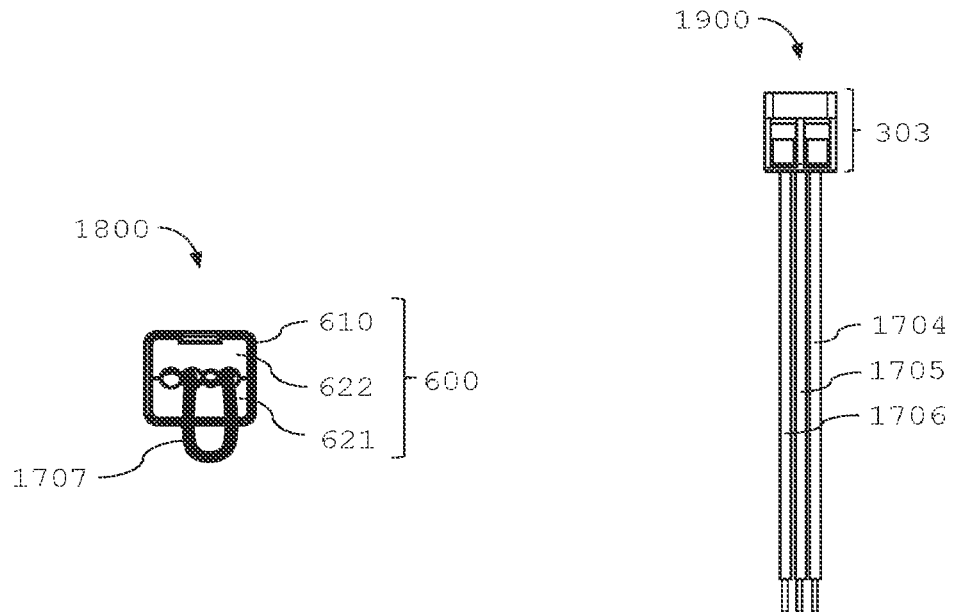
FIG.25    FIG.26

ELECTRICAL CABLE CONNECTING SYSTEM

CROSS-REFERENCE TO RELATED APPLICATION

This application is a divisional of U.S. patent application Ser. No. 17/164,266, filed on Feb. 1, 2021, which claims the benefit of priority to U.S. Provisional Patent Application No. 62/969,042 filed on Feb. 1, 2020, the entire contents of which are incorporated herein by reference.

TECHNICAL FIELD

The present invention comprises an electrical cable connecting system and components thereof, for use in industrial, commercial and residential building wiring infrastructure and other applications. More particularly, but not exclusively, the present invention comprises a connecting system for use in industrial, commercial and residential building wiring infrastructure that enables pre-cut and factory terminated building electrical cables to be installed and connected to suitably adapted electrical or electronic wiring devices using substantially less field installation labor than present systems.

BACKGROUND

Installing electrical wiring and electrical and electronic wiring devices, including, but not limited to, receptacles, switches, wired spur connectors, Transient Voltage Surge Suppressors (TVS S), Ground Fault Circuit Interrupters (GFCI), Arc Fault Circuit Interrupters (AFCI), dimmers, thermostats, timer devices, and sensors or similar devices, in and around industrial, commercial and residential buildings is a very labor-intensive process. Skilled electricians are often needed to at least complete or to perform the whole installation. For large-scale installations, the need for skilled electricians results in a significant financial cost to the contractor and ultimately the building owner or occupier.

A typical electrical cable installation process in accordance with current procedures is as follows. The installation process is typically split into two phases, a "rough-in phase" and a "trim-out phase." During rough-in, building electrical cables are typically pulled from bulk reels and routed throughout the building with differing cables and internal wire gauges specified for the different applications. Building electrical cables are typically cut to length at the job site. Wiring device electrical boxes are installed at various points in the building typically in the building's walls, floors and ceilings. These wiring device electrical boxes house one or more types of electrical or electronic wiring devices. For conventional building electrical cable installations, the cabling is routed through an opening formed in the wiring device electrical box, and the outer jacket of the cable is stripped back and removed making the enclosed insulated and/or uninsulated wire conductors visible and accessible for the trim-out phase of the project.

During trim-out, typically, an electrical or electronic wiring device is electrically coupled to the stripped and exposed wire conductors of the building electrical cables in the wiring device electrical box. In conventional electrical installations, the individual building electrical cable wires are stripped to expose the conductors. The electrical or electronic wiring device is then electrically coupled to the stripped building electrical cable wire conductors using short "pig-tail" jumper wires, such that one end of each pig-tail jumper wire is electrically coupled to the electrical or electronic wiring device, forming an electrical and mechanical coupling, and the other end of each respective pig-tail jumper wire is terminated to the appropriate stripped building electrical cable wire conductor using twist-on or push-in type electrical wire connectors. During the above-referenced process, each exposed building electrical cable wire conductor must be electrically coupled to the electrical or electronic wiring device in the above-referenced manner. Typically, the above-referenced process requires a building electrical cable wire conductor that will be a hot (or live) building electrical wire conductor to be electrically coupled to an electrical connection terminal that will be a hot electrical connection terminal on the electrical or electronic wiring device via a pig-tail jumper wire that will be a hot (or live) pig-tail jumper wire, a neutral building electrical cable wire conductor to be coupled to a neutral electrical connection terminal on the electrical or electronic wiring device via a neutral pig-tail jumper wire, and a ground (or protective earth) building electrical cable wire conductor to be electrically coupled to a ground (or protective earth) electrical connection terminal on the electrical or electronic wiring device via a ground (or protective earth) pig-tail jumper wire. Further, in addition to the foregoing example, other wiring methods exist that may be used to fulfill the electrical design for the building. For example, in commercial and industrial buildings, the building electrical cabling and the devices connected thereto may be configured to transmit three-phase power.

Following proper safety procedures in a typical installation, when work is being conducted on the electrical or electronic wiring devices or the building electrical cabling in general, whether during installation or maintenance, the power source should be turned off at the circuit breaker panel to ensure that the exposed building electrical cable wire conductors and the terminals of the electrical or electronic wiring devices are not live and hazardous to the installer. However, proper safety procedures are not always adhered to, and the power source is not always turned off, thereby creating a hazardous environment for the person that is working on the electrical wiring and/or the electrical or electronic wiring devices. Such situations may arise due to a lack of care or knowledge of the status of the power source, or because the person performing the electrical work does not know which circuit breaker should be turned off, or because the building occupier does not want the rest of the circuits connected to the circuit breaker turned off while the work proceeds (live working).

Hence, there is a need for an electrical cable connecting system that prevents the hazards of electrical shocks, or even death, to electricians, and others that are installing and conducting electrical maintenance in industrial, commercial and residential buildings There is furthermore a need for a building electrical cabling system that simplifies and reduces the labor involved with connection of various electrical and electronic wiring devices, such as receptacles, GFCIs, AFCIs, 1-pole switches, 2-pole switches, 3-way switches, 4-way switches, dimmers, etc. Furthermore, there is a need for an electrical cable connecting system that enables creation of branch circuits from any of the plurality of different types of electrical or electronic wiring devices to other electrical or electronic wiring devices without a high level of skill required to configure the connections.

SUMMARY OF THE INVENTION

An electrical cable connecting system is provided for electrically connecting electrical cable wires, for example, building electrical cable wires, with electrical or electronic wiring devices. The electrical cable connecting system may include a cable protector. The electrical cable connecting system may include a connector. The connector may connect first electrical wires with second electrical wires. The first electrical wires may be part of a building electrical cable assembly, and the second electrical wires may be "pig tail" jumper electrical wires configured for connection with an electrical or electronic wiring device. The connector may be an external connector, external to the electrical or electronic wiring device, or may be integral with the electrical or electronic wiring device. The connector and the electrical or electronic wiring devices may comprise modular electrical or electronic wiring device assemblies.

The building electrical cable may comprise an electrical wire designated to be a hot (or live) electrical wire, a neutral electrical wire and optionally a ground (or protective earth) electrical wire and/or a traveler electrical wire. The electrical wires of the building electrical cable may pass through a cable protector and be inserted into a connector. The connector may be configured to connect to building electrical cable wires which may be connected to an electrical or electronic wiring device or multiple devices through the connector.

One or more of the electrical or electronic wiring devices may be from a group comprising receptacles, switches, wired spur connectors, Transient Voltage Surge Suppressors (TVSSs), Ground Fault Circuit Interrupters (GFCIs), Arc Fault Circuit Interrupters (AFCIs), dimmers, thermostats, timer devices, and sensors. This group is not exclusive, and one or more of the electrical or electronic wiring devices may be a device not illustrated in the particular embodiments described in detail herein. The building electrical cable may be from a group comprising a building electrical supply cable, a building electrical load cable, a building electrical branch cable, a building electrical jumper cable and a building electrical feeder cable.

The cable protector may be configured to receive electrical wires of the building electrical cable at a second end of the cable protector. The cable protector may be configured to permit passage of the electrical wires through the cable protector. The cable protector may be configured to secure the body of the electrical wires within an inner portion of the cable protector. The cable protector may be configured to permit protrusion of the electrical wires beyond a first end of the cable protector.

The cable protector may include an upper body, a lower body and optionally an intermediate body. The upper body, the lower body and the intermediate body may be configured to form an assembly. The cable protector may include a slidable cover. The slidable cover may be configured to slide along an exterior surface of the assembled body of the cable protector assembly. The slidable cover may slide back and forth into a retracted position and an extended position. When the slidable cover is in the retracted position, the building electrical cable wires may protrude beyond the first end of the cable protector assembly. When the slidable cover is in the extended position, the ends of the building electrical cable wires may be protected and covered within the cable protector, allowing for safe handling of the building electrical cable. The slidable cover may have protruding features that correspond to features on the connector, to guide coupling of the cable protector in the correct orientation and position with the connector.

The connector may be configured to receive electrical wires of the building electrical cable at a second end and/or a first end of the connector. The connector may be configured to secure the electrical wires within an inner portion of the connector. The connector may be configured to permit the electrical wires to enter a second end and/or a first end of the connector through terminal ports.

The connector may include second end and/or first end terminations, configured to receive the building electrical cable wires, and first-end terminations, configured to receive the pig-tail jumper electrical wires. The connector may include manual or tool operated clamp connection terminals, with levers or actuators corresponding to each such terminal and with the terminals comprising a spring clamp with a spring jaw configured to clamp the building electrical cable wires against the second-end or first end terminations.

The pig-tail jumper electrical wires, may be resistance welded or spring clamped to the first-end terminations. The pig-tail jumper electrical wires may also be attached to the first-end terminations with any other physical and/or chemical, electrically conductive attachment method (with or without heat) including or excluding solder. The attachments may be prefabricated or made in the field. The pig-tail jumper electrical wires may connect to electrical or electronic wiring devices.

The connector may releasably connect to building electrical cable wires and/or pig-tail jumper electrical wires.

The connector and/or cable protector, alone or in combination, also may be used independently of building electrical cabling systems, in any other wiring systems in which a connector and/or cable protector having the physical characteristics in accordance with the descriptions herein may be useful.

A method for electrically connecting a building electrical cable with one or more modular electrical or electronic wiring device assemblies is also provided. The method may include providing a cable protector. The method may include receiving electrical wires of the building electrical cable at a second end of the cable protector. The method may include permitting passage of the building electrical cable wires through the cable protector. The method may include securing the body of the building electrical cable wires and optionally the building electrical cable jacket within an inner portion of the cable protector. The method may include permitting protrusion of the building electrical cable wires beyond a first end of the cable protector. The method may include providing a connector. The method may include receiving pig-tail jumper electrical wires at a first end of the connector. The method may include securing the pig-tail jumper electrical wires within an inner portion of the connector. The method may include permitting the building electrical cable wires to enter a second end of the connector. The method may include securing the building electrical cable wires within an inner portion of the connector. The method may include electrically connecting the connector with one or more electrical or electronic wiring devices via pig-tail jumper electrical wires. The method may include electrically connecting the building electrical cable wires and the pig-tail jumper electrical wires through the connector. The method may include electrically connecting the building electrical cable wires with the pig-tail jumper electrical wires when the cable protector is coupled with the connector.

According to an exemplary embodiment of the invention, an electrical wire protector is configured to: receive at least one wire at a second end of the protector, secure the at least one wire within an inner portion of the protector, and permit protrusion of the at least one wire beyond a first end of the protector, wherein a conductor end of the at least one wire is enclosed in the protector until ready for connection of the at least one wire directly with an electrical connection terminal of a connector, wherein the conductor end is stripped of insulation or bare, wherein the protector includes a body, wherein the body includes at least one channel for the at least one wire, wherein the protector includes a slidable cover, wherein the slidable cover is configured to receive the body of the protector and to slide along an exterior surface of the body, wherein the slidable cover comprises: a face side, at least one opening on the face side configured such that the at least one wire is configured to pass through the at least one opening on the face side, and at least one polarization or key-way feature on the face side that allows for alignment of the protector with a connector terminal port in only one or certain configurations, such that the least one wire may be coupled to an electrical connection terminal within the connector, wherein the slidable cover is configured to slide back and forth between a retracted position and an extended position, wherein, when the slidable cover is in the extended position, the conductor end of the at least one wire is enclosed within the protector by the slidable cover, and wherein, when the slidable cover is in a retracted position, the conductor end of the at least one wire protrudes beyond the face side of the slidable cover.

According to another exemplary embodiment of the invention, an electrical connector is configured to: receive at least one electrical wire directly through at least one terminal port of the connector, secure a stripped or bare conductor of the at least one electrical wire within an inner portion of the connector such that the at least one electrical wire conductor is electrically coupled to a corresponding conductive internal electrical member of an electrical connection terminal within the connector, wherein the connector is configured to connect to the at least one electrical wire conductor via a releasable or non-releasable clamp connection terminal or a push-in clamp connection terminal, and wherein the at least one terminal port of the connector is configured to receive a slidable cover of an electrical wire protector, and wherein the at least one terminal port is configured to allow for alignment with the slidable cover of the electrical wire protector in only one or certain configurations.

According to a further exemplary embodiment of the invention, an electrical cable connecting system for electrically connecting at least two cable wires, at least two jumper electrical wires, and at least one electrical or electronic wiring device includes: a protector configured to: receive the at least two cable wires at a second end of the protector, secure the at least two cable wires within an inner portion of the protector, and permit protrusion of the at least two cable wires beyond a first end of the protector; a connector having at least two terminal ports at a second end of the connector and at least two terminal openings at a first end of the connector, the connector configured to: receive the at least two cable wires directly through the terminal ports of the connector, and receive respective second ends of the at least two jumper electrical wires directly through the at least two terminal openings of the connector, secure the at least two cable wires and the second ends of the at least two jumper wires within an inner portion of the connector by direct mechanical contact, such that each of the at least two cable wires and each of the at least two jumper electrical wires is electrically coupled to a corresponding electrical connection terminal of the connector, and secure respective first ends of the at least two jumper wires to respective electrical connection terminals of the at least one electrical or electronic wiring device, wherein the at least two terminal ports of the second end of the connector are configured to receive the first end of the protector such that the at least two cable wires pass directly through respective terminal ports of the second end of the connector, and are secured within the connector by direct mechanical contact and electrically coupled to respective corresponding electrical connection terminals of the connector.

According to a further exemplary embodiment of the invention, a method for electrically connecting at least one building electrical cable and at least one electrical or electronic wiring device includes: providing a protector: receiving at least two cable wires of the at least one building electrical cable at a second end of the protector, securing the at least two cable wires within an inner portion of the protector, and permitting protrusion of the at least two cable wires beyond a first end of the protector by sliding a cover of the protector into a retracted position, providing a connector, providing jumper electrical wires, receiving second ends of the jumper electrical wires at a first end of the connector, securing the second ends of the jumper electrical wires within an inner portion of the connector, and electrically coupling the at least two cable wires of the at least one building electrical cable with the connector by aligning the protector with terminal ports of the connector and permitting the at least two cable wires of the at least one building electrical cable to pass through the terminal ports and couple with corresponding electrical terminals within the connector, wherein the second ends of the jumper electrical wires are electrically coupled with respective electrical terminals within the connector and the first ends of the jumper electrical wires are electrically coupled to respective electrical connection terminals of the at least one electrical or electronic wiring device.

According to a further exemplary embodiment of the invention, an electrical cable connecting system for electrically connecting at least one cable wire and at least one electrical or electronic wiring device includes: a protector configured to: receive the at least one cable wire at a second end of the protector, secure the at least one cable wire within an inner portion of the protector, and permit protrusion of the at least one cable wire beyond a first end of the protector; a connector having at least one terminal port at a second end of the connector, the connector configured to: receive the at least one cable wire directly through the at least one terminal port of the connector, secure the at least one cable wire within an inner portion of the connector by direct mechanical contact, such that the at least one cable wire is electrically coupled to at least one electrical connection terminal of the connector, receive at least one jumper electrical wire through a terminal opening at a first end of the connector, and secure the at least one jumper electrical wire within an inner portion of the connector, such that the at least one jumper electrical wire I electrically coupled to at least one electrical connection terminal of the connector, wherein the at least one jumper electrical wire is electrically coupled to respective electrical connection terminals of the at least one electrical or electronic wiring device.

According to a further exemplary embodiment of the invention, an electrical connector is configured to: receive at least two cable wires directly through terminal ports of the connector, and secure stripped or bare conductors of the at least two cable wires within an inner portion of the connector such that each of the at least two cable wires is electrically coupled to a corresponding conductive internal electrical member of an electrical connection terminal within the connector, wherein one or more of the terminal ports is configured to align with at least one polarization or key-way feature of a slidable cover of an electrical wire protector in only one or certain configurations.

According to a further exemplary embodiment of the invention, an integrated modular electrical or electronic wiring device includes: an integrated electrical connector that is integral with an electrical or electronic wiring device, wherein the integrated modular electrical or electronic wiring device is configured to: receive at least two cable wires directly through at least two terminal ports of the integrated electrical connector, and secure stripped or bare conductors of the at least two cable wires within an inner portion of the integrated electrical connector such that each of the at least two cable wires is electrically coupled to a corresponding conductive internal electrical member of an electrical connection terminal within the integrated electrical connector, wherein one or more terminal ports is configured to align with at least one polarization or key-way feature of a slidable cover of at least one electrical wire protector in only one or certain configurations, and wherein the electrical or electronic wiring device comprises internal electrical connection terminals that are directly coupled to or integral with respective conductive internal electrical members of the integrated electrical connector.

These and other features of the present invention will be more fully understood after a review of the following figures, detailed description, and claims.

BRIEF DESCRIPTION OF THE DRAWINGS

These and/or other features and utilities of the present invention will become apparent and more readily appreciated from the following description of exemplary embodiments of the present invention, taken in conjunction with the accompanying drawings, of which:

FIG. 3A illustrates a front perspective view of a supply cable protector assembly fitted to the end of a Metal Clad (MC) type building electrical supply cable assembly, with a corresponding cable protector slidable cover in an extended position, in accordance with an exemplary embodiment;

FIG. 3B illustrates a front view of a building electrical supply cable assembly in accordance with the exemplary embodiment of FIG. 3A;

FIG. 3I illustrates a front perspective view of the upper body of a supply cable protector assembly including a snap-off cable cutting guide, in accordance with an exemplary embodiment of the supply cable protector assembly;

FIG. 3J illustrates a front perspective view of a supply cable protector assembly fitted to the end of an MC type building electrical supply cable assembly, with a corresponding cable protector slidable cover in an extended position;

FIG. 3K illustrates a front view of a supply cable protector assembly in accordance with the exemplary embodiment of FIG. 3J;

FIG. 3N illustrates a front perspective view of a supply cable protector assembly fitted to the end of a Non-Metallic sheathed (NM) type building electrical supply cable assembly according to an exemplary embodiment, with a corresponding cable protector slidable cover in an extended position;

FIG. 3P illustrates a front view of a building electrical supply cable assembly in accordance with the exemplary embodiment of FIG. 3N;

FIG. 3Q illustrates a front view of a building electrical supply cable protector assembly of FIG. 3N, with the cable protector slidable cover in a retracted position exposing the stripped conductors of the building electrical supply cable wires;

FIG. 23A illustrates an internal electrical branch cable assembly according to an exemplary embodiment;

FIG. 23B illustrates an internal electrical branch cable assembly according to an exemplary embodiment;

FIG. 24A illustrates a Metal Clad (MC) type building electrical load cable according to an exemplary embodiment;

FIG. 24B illustrates a Non-Metallic sheathed (NM) type building electrical load cable according to an exemplary embodiment;

FIG. 25 illustrates a load shorting link assembly according to an exemplary embodiment;

FIG. 26 illustrates a load link cable assembly according to an exemplary embodiment;

Figure 1A:
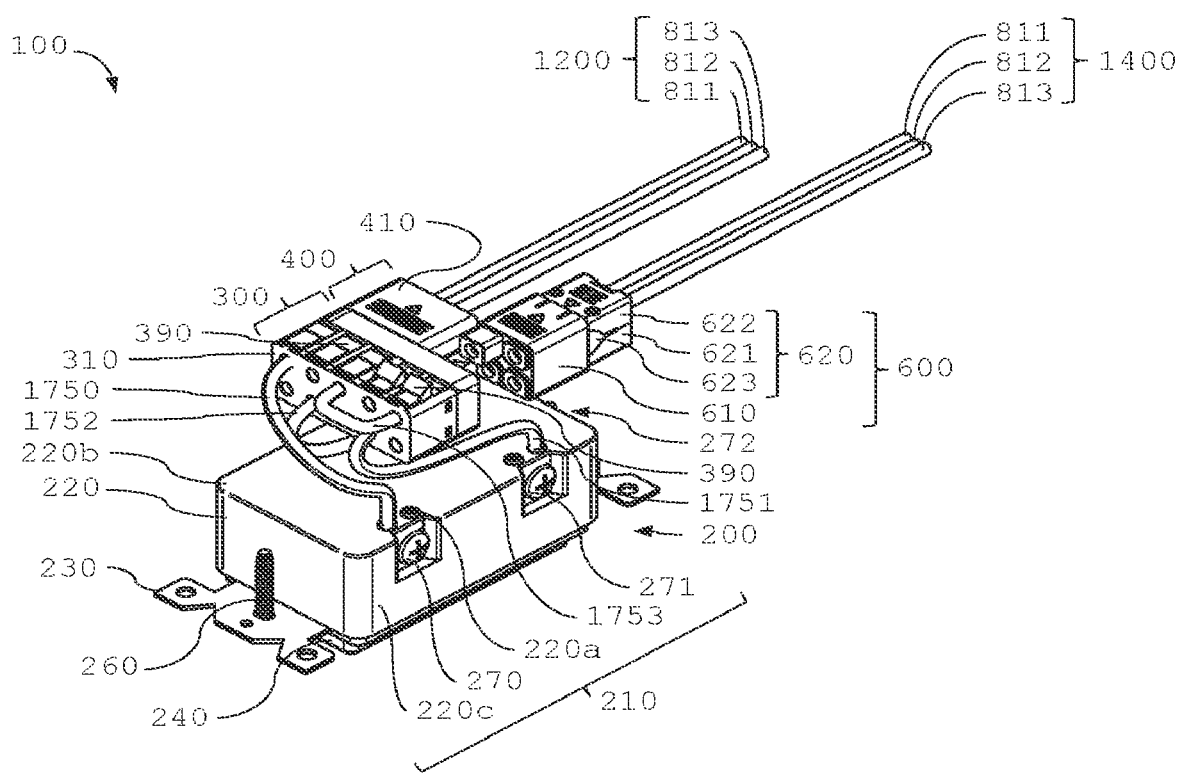
FIG. 1A illustrates a perspective view of an electrical or electronic wiring device connected to a cable connecting system according to an exemplary embodiment.

While the various drawings illustrate exemplary embodiments of the present invention, these drawings are not to be considered limiting in scope. The elements and features shown in the drawings illustrate some principles of exemplary embodiments of the present invention. In the drawings, reference numerals designate like or corresponding, but not necessarily identical, elements throughout the several views.

DETAILED DESCRIPTION

Reference will now be made in detail to exemplary embodiments of the present invention, examples of which are illustrated in the accompanying drawings. Like reference numerals as used herein refer to like or corresponding, but not necessarily identical, elements throughout. In certain instances, like reference numerals may refer to like elements which may not be identical; for example, they may not be identically positioned, and may not be identically configured, in various specific figures, in which circumstances the differences between these generally like elements is apparent from the description herein and figures (see, for example, FIGS. 2A, 2C, and 2F, wherein terminal ports referenced therein (350-359, 350-355, and 350-359 respectively) refer to connector terminal ports which may be different in location and characteristics). Also, while describing exemplary embodiments referenced herein, detailed descriptions about related functions or configurations that may diminish the clarity of the points of the description may be omitted.

When a range of numbers is referenced herein with a hyphen ("-") between the numbers, for example "811-813", the hyphen is inclusive, for example "811-813" refers to 811, 812 and 813.

Also, when a part "includes" or "comprises" an element, unless there is a particular description contrary thereto, the part may further include other elements, not excluding the other elements.

Some exemplary embodiments described herein are directed to a complex electrical cable connecting system for use in industrial, commercial and residential building wiring infrastructure and other commercial and industrial applications. More particularly, but not exclusively, some exemplary embodiments described herein relate to a multi-faceted electrical cable connecting system of external connector assemblies and cable protector assemblies and ancillary components for use in industrial, commercial and residential building wiring infrastructure, which enables pre-cut and factory terminated building electrical cables to be installed and connected to various types of suitably adapted electrical or electronic wiring devices (modular electrical or electronic wiring devices) or other suitable assemblies and wiring systems while requiring substantially less field installation labor than present systems.

The present invention also provides a system that prevents the hazards of electrical shocks while installing and performing electrical maintenance in industrial, commercial and residential buildings. The present invention also provides a system for building electrical cabling that simplifies and reduces the labor involved with connection of various electrical and electronic wiring devices, such as receptacles, wired spur connectors, GFCIs, AFCIs, 1-pole switches, 2-pole switches, 3-way switches, 4-way switches, or dimmer switches, etc.

Further, the present invention also provides an electrical cable connecting system that enables creation of branch circuits from any of a plurality of different types of electrical or electronic wiring devices to other similar types of electrical or electronic wiring devices, without a high level of skill required to make such connections.

Further, the present invention also provides an electrical cable connecting system for feeder and jumper cables that enables creation of complex multi-switch and multi-floor lighting circuits (such as those used in staircases) from any of a plurality of different types of electrical or electronic wiring devices to other similar types of electrical or electronic wiring devices, and lighting loads without a high level of skill required to make such connections.

The present invention also provides a system of external connector assemblies and cable protector assemblies for use with conventional electrical and electronic wiring devices, and corresponding methods of installation. More specifically, the present invention also provides one or more conventional electrical and electronic wiring devices fitted with one or more external connector assemblies for electrically and mechanically coupling to building electrical cables fitted with one or more supply, branch, jumper, feeder or load output cable protector assemblies, and corresponding methods of installation. Although the description of various exemplary embodiments is provided below in conjunction with particular types of electrical or electronic wiring devices, alternate embodiments of the present invention are applicable to other types and configurations of electrical or electronic wiring devices.

FIG. 1A is a rear perspective view of an electrical cable connecting system 100 that includes a modular electrical or electronic wiring device assembly 210 electrically coupled to a building electrical supply cable assembly 1200 (end portion illustrated—See FIG. 21A for a full illustration of the building electrical supply cable assembly) and not yet electrically coupled to the building electrical load cable assembly 1400 (end portion illustrated—See FIG. 24A for a full illustration of the building electrical load cable assembly) shown with a cable protector slidable cover 610 extended in accordance with an exemplary embodiment.

Figure 1B:
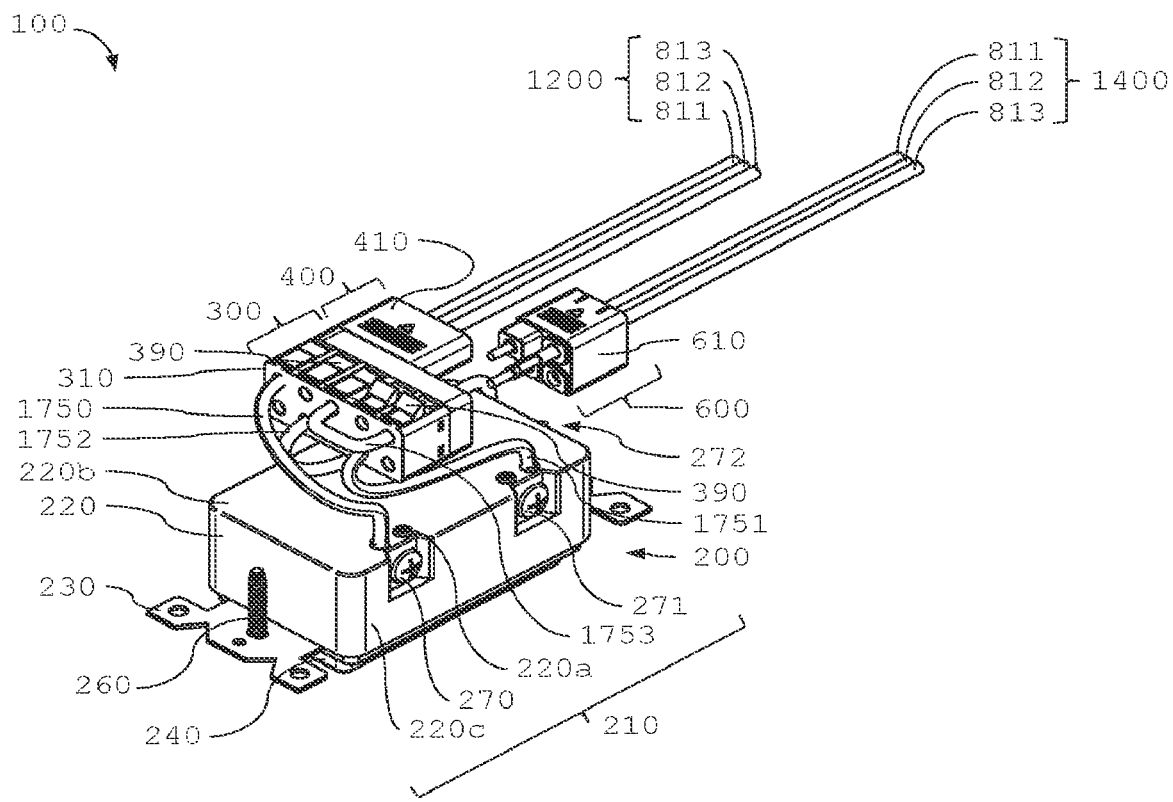
FIG. 1B illustrates a perspective view of an electrical or electronic wiring device connected to the cable connecting system according to the exemplary embodiment of FIG. 1A.

FIG. 1B is a rear perspective view of an electrical cable connecting system 100 that includes a modular electrical or electronic wiring device assembly 210 electrically coupled to a building electrical supply cable assembly 1200 and not yet electrically coupled to the building electrical load cable assembly 1400 shown with the cable protector slidable cover 610 retracted in accordance with an exemplary embodiment.

Figure 1C:
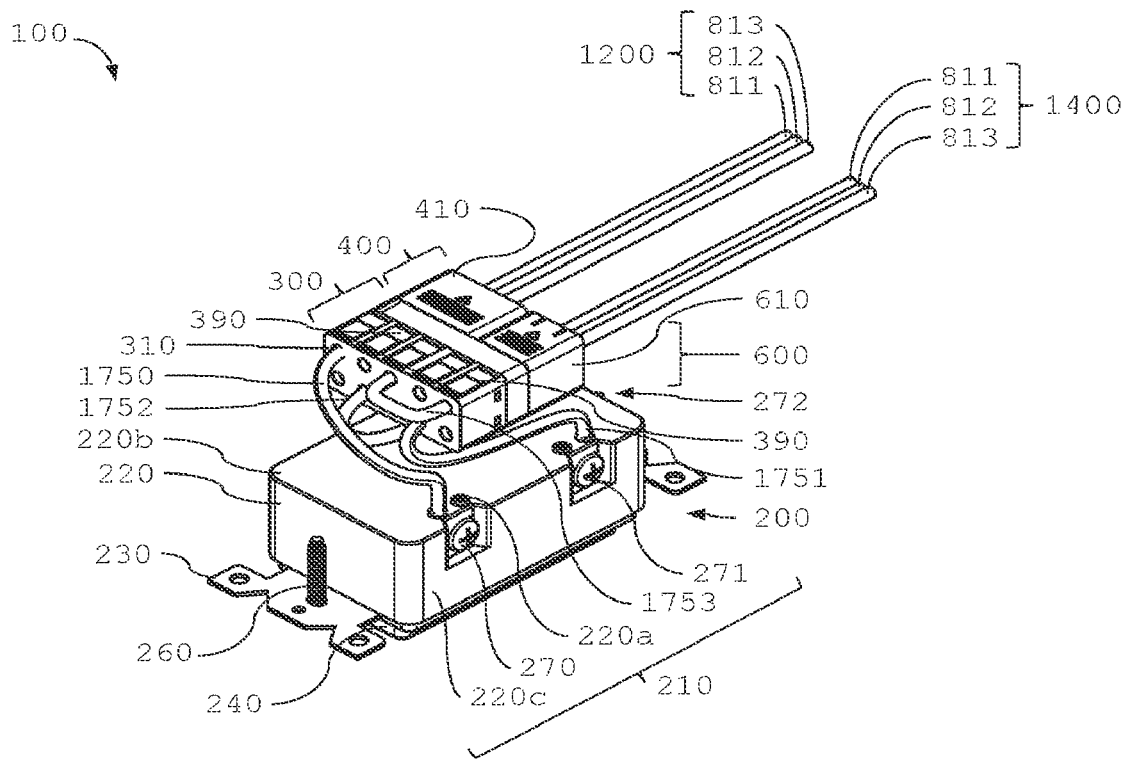
FIG. 1C illustrates a perspective view of an electrical or electronic wiring device connected to the cable connecting system according to the exemplary embodiment of FIG. 1A.

FIG. 1C is a rear perspective view of an electrical cable connecting system 100 that includes a modular electrical or electronic wiring device assembly 210 electrically coupled to a building electrical supply cable assembly 1200 and a building electrical load cable assembly 1400 in accordance with an exemplary embodiment.

Referring to FIGS. 1A-C, an external connector assembly 300 may be configured to safely and accurately couple to and uncouple from a supply cable protector assembly 400, and an electrical supply may be continually provided to the building electrical supply cable assembly 1200 when the supply cable protector assembly 400 is coupled to and uncoupled from the external connector assembly 300. An advantage of the present invention is to avoid a need to turn off a main circuit breaker providing electricity to the building electrical supply cable assembly 1200 in order to connect or disconnect the electrical or electronic wiring device 200 from the electrical supply. Although the building electrical supply cable assembly 1200, with the corresponding fitted supply cable protector assembly 400, is illustrated and described in particular for a building electrical supply cable, the system of external connector assemblies and cable protector assemblies may also provide similar functions for building electrical branch, load, feeder and jumper cables, or any other type of electrical cable and electrical cable connecting system for buildings and other commercial or industrial applications. The supply cable protector assembly 400 according to an exemplary embodiment may include a slidable cover 410 that may be extended or retracted with respect to a corresponding supply cable protector body assembly 420 (see FIGS. 3A-D). The slidable cover 410 may retract over the body assembly 420 to expose stripped conductors of the building electrical supply cable wires 811-813 when the supply cable protector assembly 400 is being coupled to the external connector assembly 300. As will be described in further detail below, the conductors of the building electrical supply cable wires 811-813 may be securely fastened within the body assembly 420 in separate channels. These channels enable the stripped conductors of the building electrical supply cable wires 811-813 to be accurately aligned with corresponding second-end supply connection terminal ports 350-352 (see FIG. 2A) formed in the body 320 of the external connector assembly 300, in order to provide a precise and secure electrical and mechanical coupling. The specific functions of the precise and secure electrical and mechanical coupling of the building electrical supply cable wires 811-813 via the second-end supply connection terminal ports 350-352 are described in more detail below with reference to FIGS. 2A-K. The phrase "terminal ports" as used herein helps to distinguish from other ones of the external connector assembly 300 terminals; however, any of these terminal ports may be connected for inputting power from a supply or outputting power to a load output or branch cable protector and the cables fitted thereto in accordance with various exemplary embodiments of the present invention.

Figure 1D:
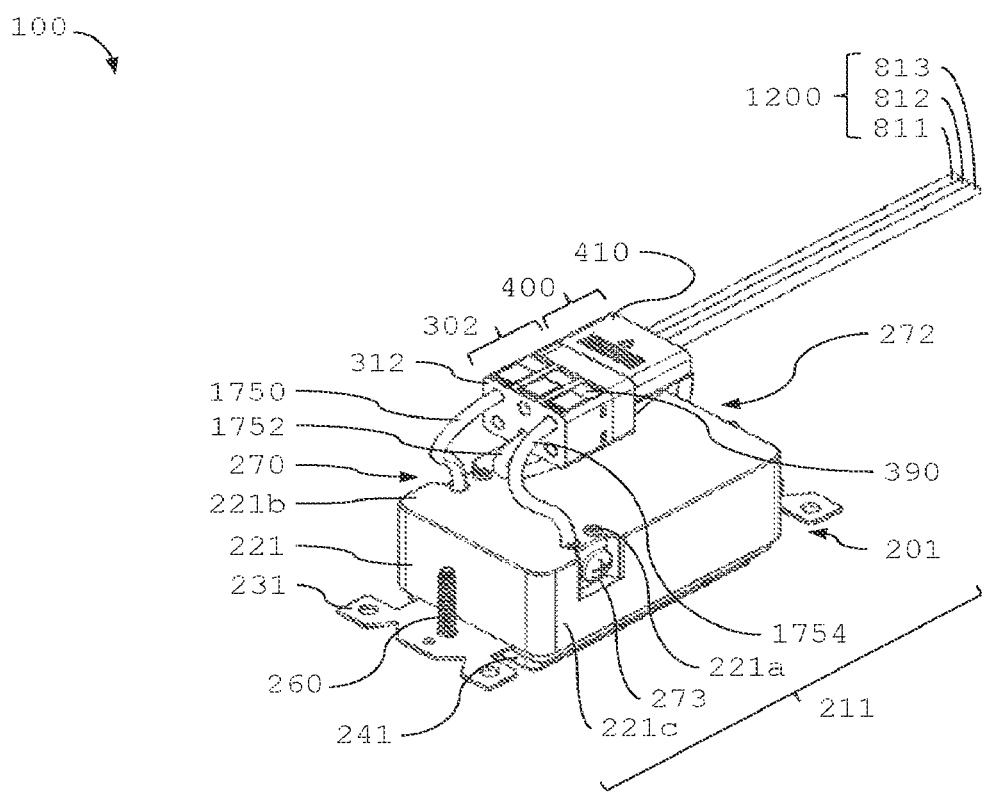
FIG. 1D illustrates a perspective view of an electrical receptacle wiring device connected to a cable connecting system according to an exemplary embodiment.

FIG. 1D is a rear perspective view of an electrical cable connecting system 100 that includes a modular electrical receptacle wiring device assembly 211 electrically coupled to a building electrical supply cable assembly 1200 in accordance with an exemplary embodiment.

Referring to FIGS. 1A-C, the electrical cable connecting system 100 may include a modular electrical or electronic wiring device assembly 210 comprising an electrical or electronic wiring device 200 and an external connector assembly 300 with, for example, ten manual or tool operated and releasable clamp connection terminals that may electrically couple with a building electrical supply cable assembly 1200 and building electrical load cable assembly 1400 by the operation of manual levers 390 (left three levers shown are closed and right two levers shown are open in FIGS. 1A-B; all are shown closed in FIG. 1C). In an exemplary embodiment as shown in FIGS. 1A-C, an external connector assembly 300 may include ten manual or tool operated and releasable clamp connection terminals (with five corresponding levers shown on the upper side and five additional corresponding levers (not shown—see FIG. 2J for an example) on the bottom side of external connector assembly 300 in FIGS. 1A-C). According to these exemplary embodiments, the electrical or electronic wiring device 200 may be a 1-pole switch. However, according to alternative exemplary embodiments illustrated below, the modular electrical or electronic wiring device assembly 210 may comprise other types of electrical or electronic wiring devices including, but not limited to, a receptacle 201 (as shown in FIG. 1D), a Ground Fault Circuit Interrupter (GFCI), an Arc Fault Circuit Interrupter (AFCI), a wired spur connection, a 2-pole switch, a 3-way switch, a 4-way switch, a dimmer switch, a Passive Infra-Red (PIR) switch, a sensor switch or a timer switch in lieu of the shown 1-pole switch electrical or electronic wiring device 200 without departing from the scope and spirit of the exemplary embodiments. For example, referring to FIG. 1D, the electrical cable connecting system 100 may include a modular electrical receptacle wiring device assembly 211 comprising an electrical receptacle wiring device 201 and an external connector 302 that electrically couples with a building electrical supply cable 1200. In an exemplary embodiment, the external connector assembly 302 may include only six manual or tool operated and releasable clamp connection terminals for the connection of a building electrical supply cable assembly 1200 and/or a building electrical branch cable assembly or internal electrical branch cable assembly (not shown—see FIG. 22-23), as no connection to a building electrical load cable assembly 1400 (as shown in FIGS. 1A-C) is necessary.

Referring to FIGS. 1A-G, the electrical or electronic wiring device 200 and the electrical receptacle wiring device 201 may include respectively a body 220 or 221, a yoke element 230 or 231, and a cover 240 or 241. The body 220 or 221 may include one or more openings 220*a* or 221*a* along the body's rear side 220*b* or 221*b* and may be configured to house one or more electrical terminals 270-273. The openings 220*a* or 221*a* may provide entrances to pathways within the body 220 or 221 to the electrical terminals 270-273 for the electrical coupling of pig-tail jumper electrical wires 1750-1752 and 1754-1755. While the terms "pig-tail jumper electrical wire" and "pig-tail jumper electrical wires" are used herein to describe some exemplary embodiments, these terms are not intended to be limiting. Any suitable electrical wire of any suitable type may be used.

The exemplary embodiments shown in FIGS. 1A-C and 1E-G are a three-wire system. The three-wire system may include a building electrical supply cable assembly 1200 or 1202 with a hot (or live) electrical cable wire 811, a ground (or protective earth) electrical cable wire 812 and a neutral electrical cable wire 813. Also, the three-wire system may include a building electrical load cable assembly 1400 with a switched hot (or switched live) electrical cable wire 811, a ground (or protective earth) electrical cable wire 812 and a neutral electrical cable wire 813. Further, the three-wire system may include an electrical or electronic wiring device 200 with a hot (or live) electrical terminal 270, a switched hot (or switched live) electrical terminal 271 and a ground (or protective earth) electrical terminal 272. The exemplary embodiment shown in FIG. 1D may also be a three-wire system that may include the following: a building electrical supply cable assembly 1200 with a hot (or live) electrical cable wire 811, a ground (or protective earth) electrical cable wire 812 and a neutral electrical cable wire 813; and an electrical receptacle wiring device 201 with a hot (or live) electrical terminal 270, a neutral electrical terminal 273 and a ground (or protective earth) electrical terminal 272. However, in both these exemplary embodiments, people having ordinary skill in the art will recognize that different wiring systems, either greater than a three-wire system or less than a three-wire system, may be used. For example, a two-wire system may be used where Metal Clad (MC) AP type cable may be used. In another example, a four-wire system that includes a traveler electrical wire may be used or a five-wire system for use in three-phase power systems may be used. Additionally, the one or more openings 220*a* or 221*a* may be positioned along the body's 220 or 221 side surfaces 220*c* or 221*c* without departing from the scope and spirit of the exemplary embodiments.

Referring to FIGS. 1A-G and FIGS. 2A, 2C, 2E, 2F and 2G, the openings 220*a* or 221*a* may be configured to allow one or more pig-tail jumper electrical wires 1750-1752 and 1754-1755 to proceed from the wiring device electrical terminals 270-273 to the electrical or electronic wiring device 200 or 201. In these exemplary embodiments, the hot (or live) supply pig-tail jumper electrical wire 1750 and the hot (or live) branch pig-tail jumper electrical wire 1755 may have black colored insulation surrounding conductors. The hot (or live) supply pig-tail jumper electrical wire 1750 or the hot (or live) branch pig-tail jumper electrical wire 1755 may pass through one of the openings 220*a* or 221*a* and may be electrically coupled at a first-end to the wiring device hot (or live) electrical terminal 270 and at a second-end to the external connector assembly 300, 302 or 304 hot (or live) supply first-end connection terminal 330 or hot (or live) branch first-end connection terminal 333 respectively. The switched hot (or switched live) pig-tail jumper electrical wire 1751 may have black colored insulation surrounding a conductor. The switched hot (or switched live) pig-tail jumper electrical wire 1751 may pass through one of the openings 220*a* or 221*a* and may be electrically coupled at a first-end to the wiring device switched hot (or switched live) electrical terminal 271 and at a second-end to the external connector assembly 300, 302 or 304 switched hot (or switched live) load output first-end connection terminal 338. The ground (or protective earth) pig-tail jumper electrical wire 1752 may have green colored insulation surrounding a conductor. The ground (or protective earth) pig-tail jumper electrical wire 1752 may pass through one of the openings 220*a* or 221*a* or alternatively from a crimp terminal 1722 (see FIG. 5E) electrically and mechanically attached to the yoke 230 or 231 grounding screw 272 and may be electrically coupled at a first-end to the wiring device ground (or protective earth) electrical terminal (not shown—see FIG. 5E) and at a second-end to the external connector assembly 300, 302 or 304 ground (or protective earth) branch first-end connection terminal 334. The neutral pig-tail jumper electrical wire 1754 may have white colored insulation surrounding a conductor. The neutral pig-tail jumper electrical wire 1754 may pass through one of the openings 220*a* or 221*a* and may be electrically coupled at a first-end to the wiring device neutral electrical terminal 273 and at a second-end to the external connector assembly 302 neutral supply first-end connection terminal 332. In the exemplary embodiments shown in FIGS. 1A-C and FIGS. 1E-G, a further external connector neutral link electrical wire 1753 may have white insulation surrounding a conductor. The external connector neutral link electrical wire 1753 may be electrically coupled at a first-end to the external connector assembly 300 or 304 neutral supply first-end connection terminal 332 and at a second-end to the external connector assembly 300 or 304 neutral load output first-end connection terminal 337 providing a neutral link from the supply to the load connection terminal. Also, in the exemplary embodiments shown in FIGS. 1A-G the external connector assembly 300, 302 or 304 ground (or protective earth) supply and branch first-end connection terminals 331 and 334 respectively are internally electrically connected to the external connector assembly 300, 302 or 304 ground (or protective earth) load output first-end connection terminal 336 with internal electrical cross-link member 372 (see FIG. 2E). The color of the insulation for each of the pig-tail jumper and external connector link electrical wires 1750-1755 may be changed to any other color in accordance with the electrical code requirements for a given country and region of application. In these exemplary embodiments shown in FIGS. 1A-D the external connector assembly 300 or 302 hot (or live) supply and branch first-end connection terminals 330 and 333 respectively and the ground (or protective earth) supply and branch first-end connection terminals 331 and 334 respectively and the neutral supply and branch first-end connection terminals 332 and 335 respectively may each be electrically coupled together in pairs with internal electrical link members 370 (see FIG. 2E). In alternative exemplary embodiments, the electrical or electronic wiring devices 200-201 may be replaced with other types of electrical or electronic wiring devices such as a Ground Fault Circuit Interrupter (GFCI) or an Arc Fault Circuit Interrupter (AFCI) wherein the electrical or electronic wiring device may in some cases provide dedicated branch circuit protection, which may be referred to as "protected feed-thru". In such alternative exemplary embodiments as these (see FIGS. 10-11), the external connector assembly 302 or 305 hot (or live) supply and branch first-end connection terminals 330 and 333 respectively and the neutral supply and branch first-end connection terminals 332 and 335 respectively may be electrically coupled to further electrical or electronic wiring device electrical terminals (see FIGS. 10-11, 274-275) with further pig-tail jumper electrical wires (see FIGS. 10-11, 1755-1756) and any external connector internal electrical link members 370 replaced with internal electrical members 371 (see FIG. 2E) in the external connector's construction to separate the supply and branch circuits at the external connector assembly 302 or 305 and enable the electrical or electronic wiring device 202 (for example see FIGS. 10-11) to provide feed-thru protection. In such alternative exemplary embodiments, the external connector assembly 302 or 305 and their covers 312 or 315 (see FIGS. 10-11) may include a reduced set of connection terminal openings appropriate to the number of pig-tail jumper electrical wires and external connector link electrical wires used as shown for example in FIG. 2G. Additionally, although the exemplary embodiments show each of the pig-tail jumper electrical wires 1750-1753 and 1755 going through a separate and distinct opening 220a or 221a, each of the pig-tail jumper electrical wires 1750-1753 and 1755 may be grouped together such that they all proceed through a single combined opening 220a or 221a. In those exemplary embodiments, the pig-tail jumper electrical wires 1750-1753 and 1755 may be grouped together such that they are contained within a single combined multi-wire opening. The pig-tail jumper electrical wires and external connector link electrical wires 1750-1755 may be of twelve American Wire Gauge (12AWG), or alternatively may be of any other gauge suitable to the application requirements without departing from the scope and spirit of the exemplary embodiments. The pig-tail jumper electrical wires and external connector link electrical wires 1750-1755 may be fabricated from insulated solid copper electrical wire, insulated stranded copper electrical wire, or any other suitable insulated electrical wire. The pig-tail jumper electrical wires 1750-1753 and 1755 may be coupled to respective electrical or electronic wiring device 200 or 201 via electrical terminals 270-273 with any suitable method including, but not limited to, soldering, welding, screw-clamping or spring-clamping. Further, the pig-tail jumper electrical wires 1750-1753 and 1755 may be any length, and preferably are less than about eight inches long in some exemplary embodiments, so that the occupied space within the wiring device electrical box 2000 (see FIG. 6-7) may be minimized. In alternate exemplary embodiments, the length of pig-tail jumper electrical wires 1750-1753 and 1755 may be less than or greater than about eight inches long without departing from the scope and spirit of the exemplary embodiments. The external connector assembly 300, 302 or 304 may be pre-configured with pig-tail jumper electrical wires connected between selected ones of the first-end connection terminal openings 330-339 in order to provide readily available options for electrical installation of different types of electrical or electronic wiring devices 200 or 201, including different types of switches and different types of receptacles, etc. including for field wiring of electrical or electronic wiring devices.

Referring to FIGS. 1A-G, the electrical or electronic wiring devices 200 and 201 may be of conventional types widely available. The body 220 or 221 may be substantially rectangular in shape; however, the body 220 or 221 may be formed in any geometric shape without departing from the scope and spirit of the exemplary embodiments. The body 220 may be fabricated using materials such as polymers, polycarbonates and polyamide materials, or any other suitable material. The yoke element 230 or 231 may be mechanically coupled to the body 220 or 221 and may extend above the top side of the electrical or electronic wiring device 200 or 201 and below the bottom side of the electrical or electronic wiring device 200 or 201. The yoke element 230 or 231 may be used for at least mounting the modular electrical or electronic wiring device assembly 210 or 211 to a wiring device electrical box 2000 (see FIGS. 6-7). The yoke element 230 or 231 may be fabricated as a single component or in multiple components. The yoke element 230 or 231 may be mechanically coupled to the electrical or electronic wiring device 200 or 201. The yoke element 230 or 231 may have a screw opening or openings at each end for receiving screws 260, which thereby facilitate the coupling of the modular electrical or electronic wiring device assembly 210 or 211 to a wiring device electrical box 2000. The yoke element 230 or 231 may be fabricated using plated steel, or any other suitable material. The electrical or electronic wiring device cover 240 or 241 may be mechanically coupled to the body 220 or 221. According to an exemplary embodiment as shown in FIG. 1D, the cover 241 may include receptacle openings configured for receiving a load plug and hence providing power to a load. The load plug may be configured to be electrically coupled with the receptacle wiring device 201 internal contacts when inserted into the receptacle openings. Alternative exemplary embodiments may have different types of covers based on the type of electrical or electronic wiring device. The cover 240 may be fabricated using materials such as polymers, polycarbonates or polyamide materials, or any other suitable material. The external connector assembly 302 may be disposed externally to the electrical or electronic wiring device 201 and may be electrically coupled to electrical terminals 270, 272 and 273 with pig-tail jumper electrical wires 1750, 1752 and 1754. The pig-tail jumper electrical wires 1750, 1752 and 1754 may enter the cover 312 of the external connector assembly 302 through first-end connection terminal openings 330, 332 and 334 (see FIG. 2E for numbering scheme). The second-end conductors of pig-tail jumper electrical wires 1750, 1752 and 1754 may be electrically coupled to the corresponding first-ends of internal electrical link members 370 (for example 370b shown in FIG. 2E) each forming part of one or more external connector manual or tool operated and releasable clamp connection terminals, with the coupling arrangements determined based upon the electrical configuration required for the particular electrical or electronic wiring device used. Each internal electrical member 371 (or internal electrical link member 370 or internal electrical cross-link member 372 in other exemplary embodiments) may be provided with a recess groove or other alignment and grip feature into which the second-end conductors of each pig-tail jumper electrical wire 1750, 1752 and 1754 (or external connector link electrical wires in other exemplary embodiments) may be electrically coupled and consolidated, for example, by electric resistance welding. In alternative exemplary embodiments, for example, by the method of electrical coupling of the second-end conductors of each pig-tail jumper electrical wire 1750, 1752 and 1754 (or other pig-tail jumper electrical wires in other exemplary embodiments) and the corresponding first-ends of the internal electrical member 371 (or internal electrical link member 370 or internal electrical cross-link member 372 in other exemplary embodiments) may be by any other suitable method, including, for example, soldering, screw-clamping, or spring-clamping (see FIG. 2I), without departing from the scope and spirit of the exemplary embodiments. In alternative exemplary embodiments the functions of the external connector (for example 300) may be directly incorporated into the electrical or electronic wiring device (for example the rear side 200) without departing from the scope and spirit of the exemplary embodiments. In such alternative exemplary embodiments the electrical or electronic wiring device openings 220a or 221a may be directly replaced by connection terminal ports similar to those on an external connector (for example 350-352) to allow the coupling of building electrical cables directly to the electrical or electronic wiring device.

Referring to FIGS. 1-2 the external connector assembly 300, 302 or 304 (and 305 not shown—see FIGS. 9 and 11) of the modular electrical or electronic wiring device assembly 210 or 211 may be configured to be mechanically and electrically coupled with one or more building electrical cables each having a cable protector fitted to an end of the building electrical cable. The supply cable protector assembly 400 (and, for example, 401-403—see FIG. 21) fitted to the building electrical supply cable assembly 1200 (and 1201-1203 not shown—see FIG. 21) may be configured to couple with the second-end connection terminal ports 350-352 of external connector assemblies 300, 302 and 304 (and, for example, 305—see FIGS. 9 and 11).

Figure 1E:
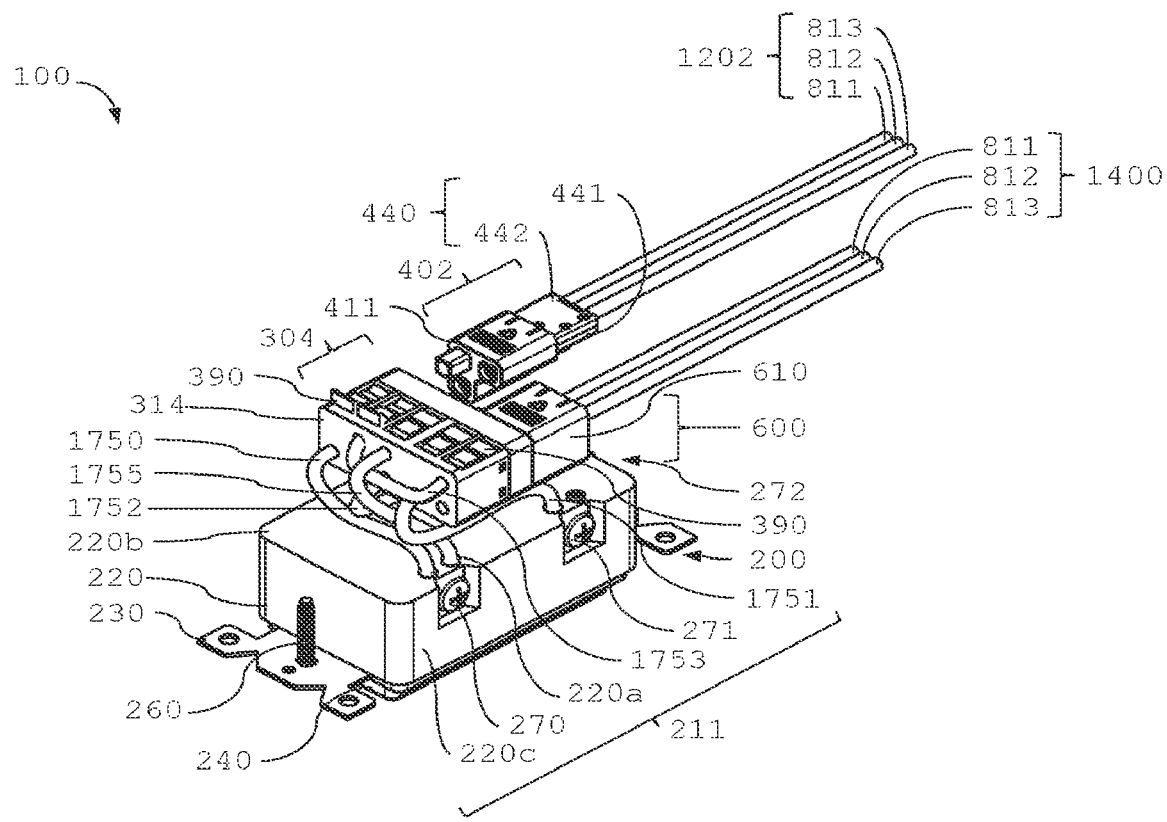
FIG. 1E illustrates a perspective view of an electrical or electronic wiring device connected to a cable connecting system according to an exemplary embodiment.
Figure 1F:
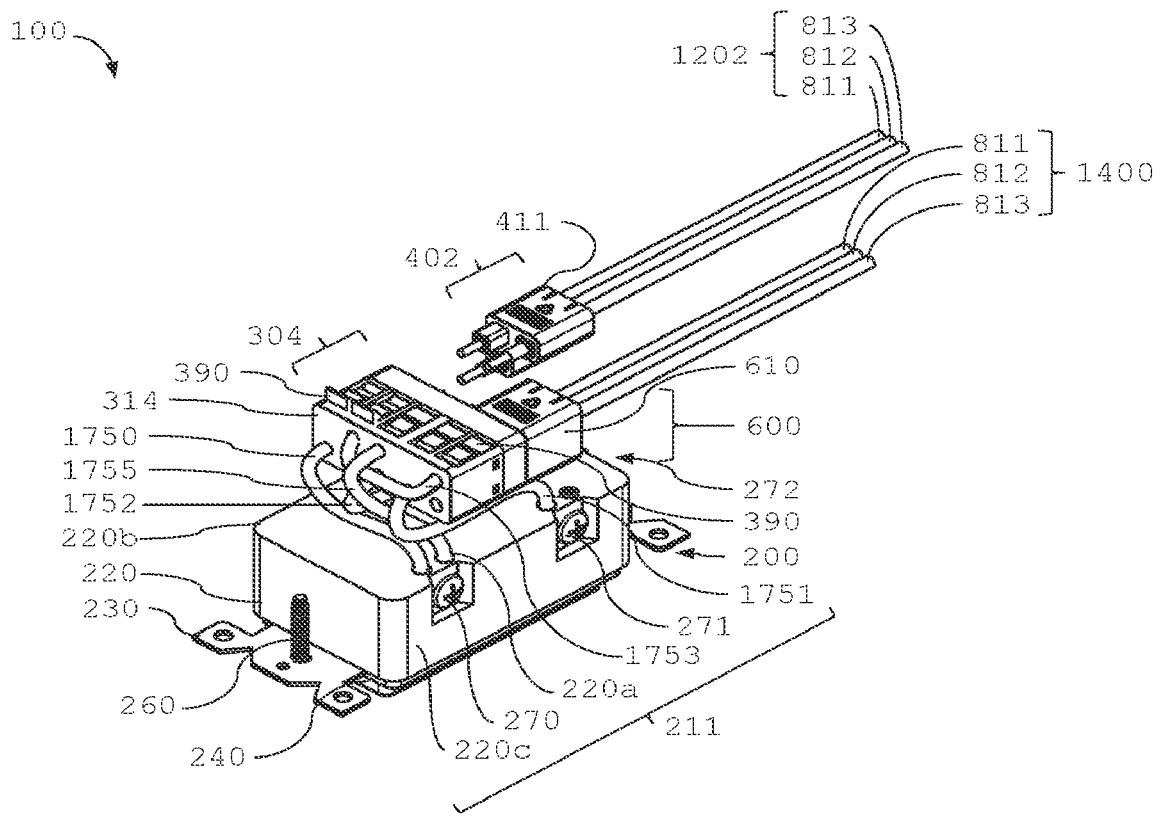
FIG. 1F illustrates a perspective view of an electrical or electronic wiring device connected to the cable connecting system according to the exemplary embodiment illustrated in FIG. 1E.
Figure 1G:
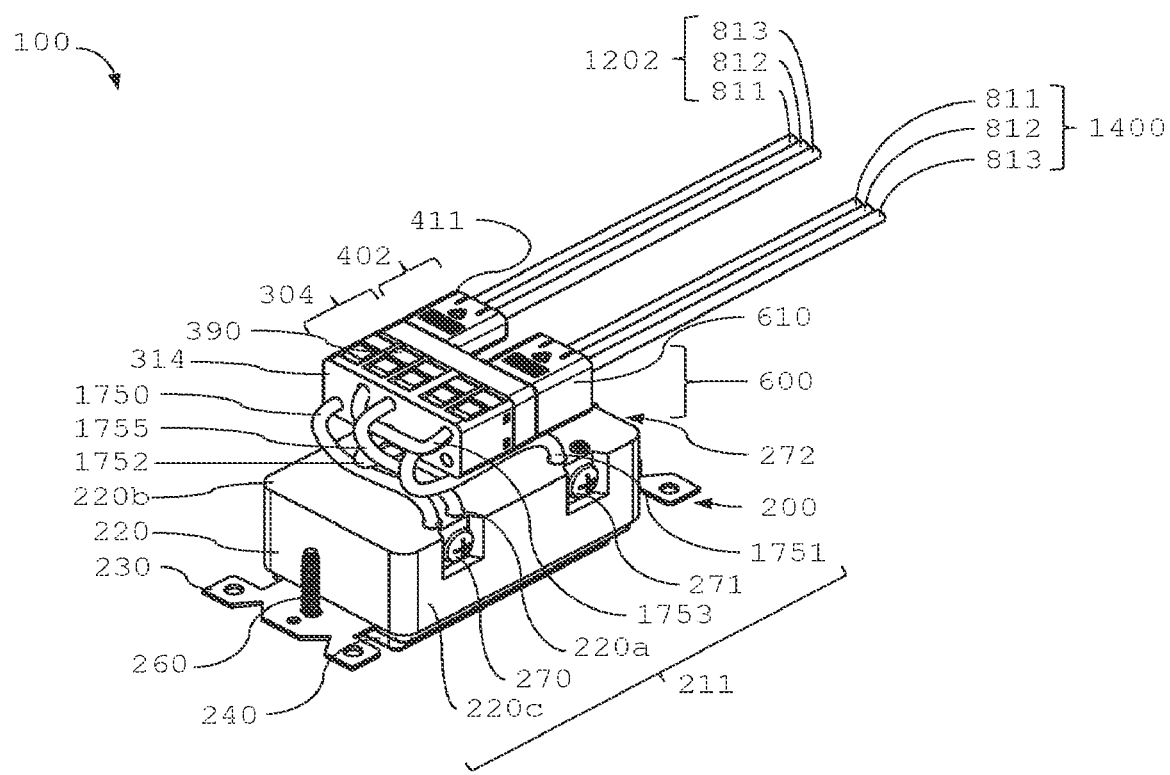
FIG. 1G illustrates a perspective view of an electrical or electronic wiring device connected to the cable connecting system according to the exemplary embodiment illustrated in FIG. 1E.
Figure 2A:
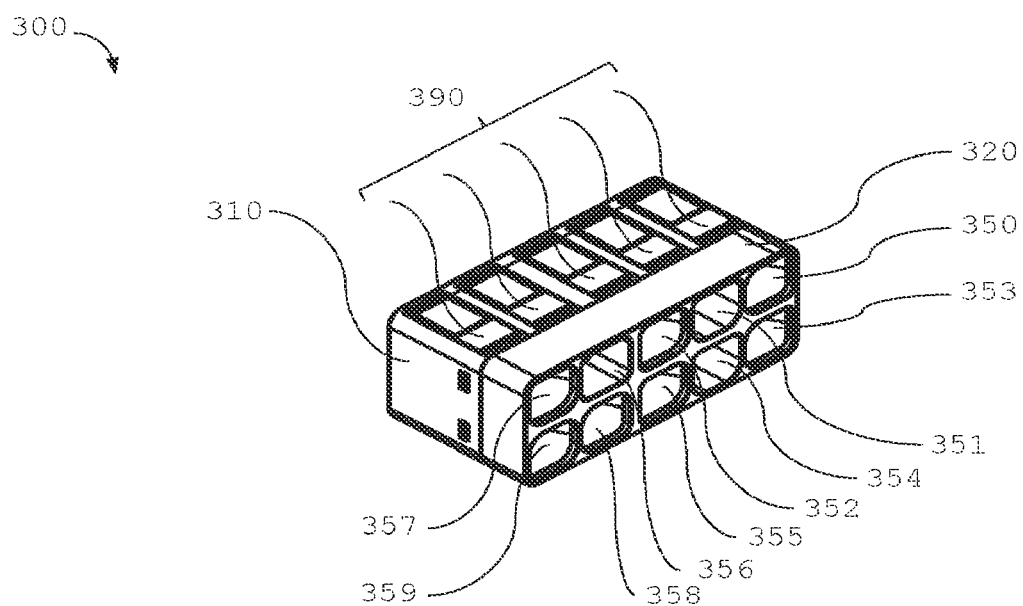
FIG. 2A illustrates a front perspective view of a 10-way external connector assembly in accordance with an exemplary embodiment.
Figure 2B:
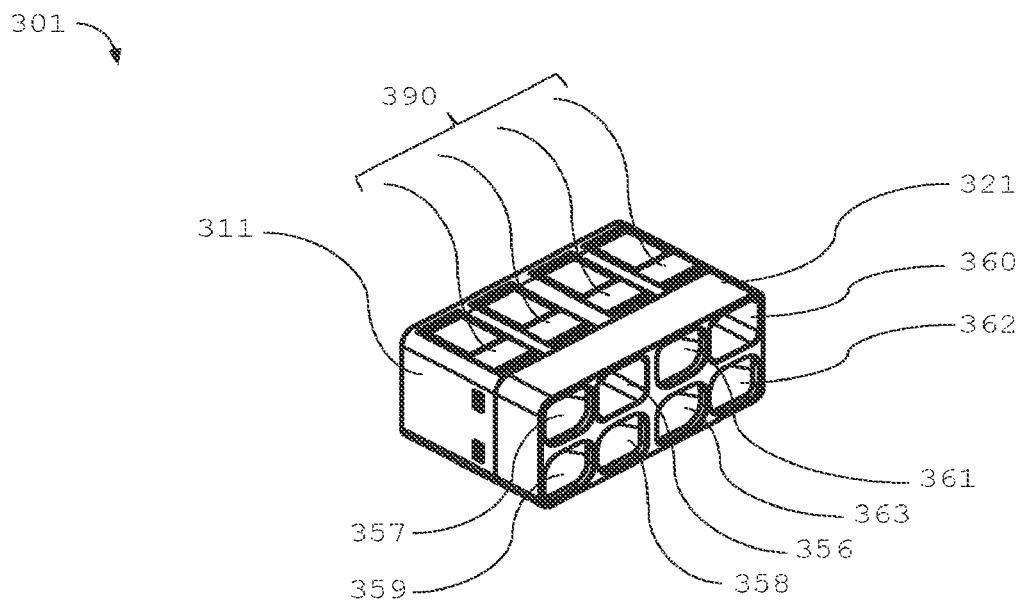
FIG. 2B illustrates a front perspective view of an 8-way external connector assembly in accordance with an exemplary embodiment.
Figure 2C:
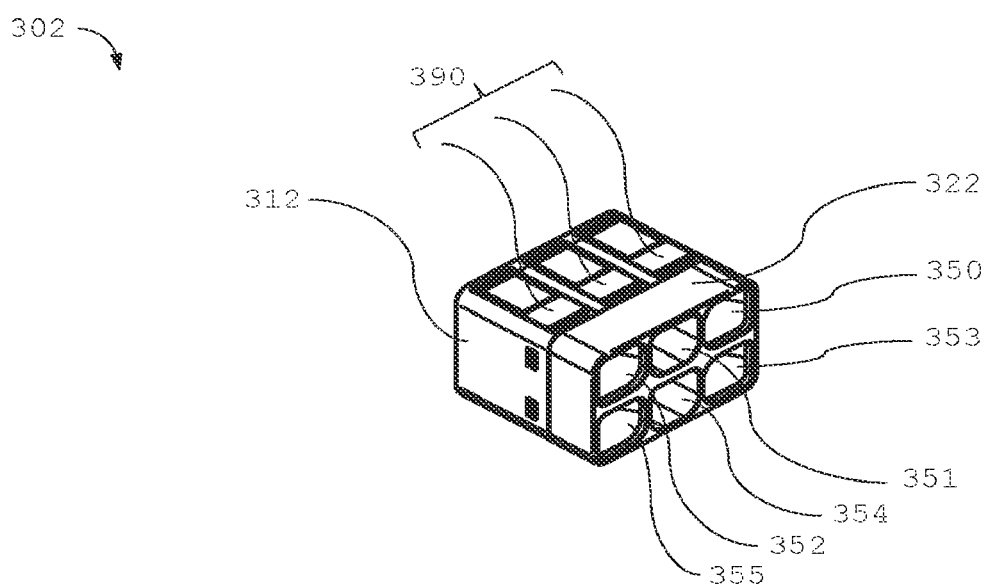
FIG. 2C illustrates a front perspective view of a 6-way external connector assembly in accordance with an exemplary embodiment.
Figure 2D:
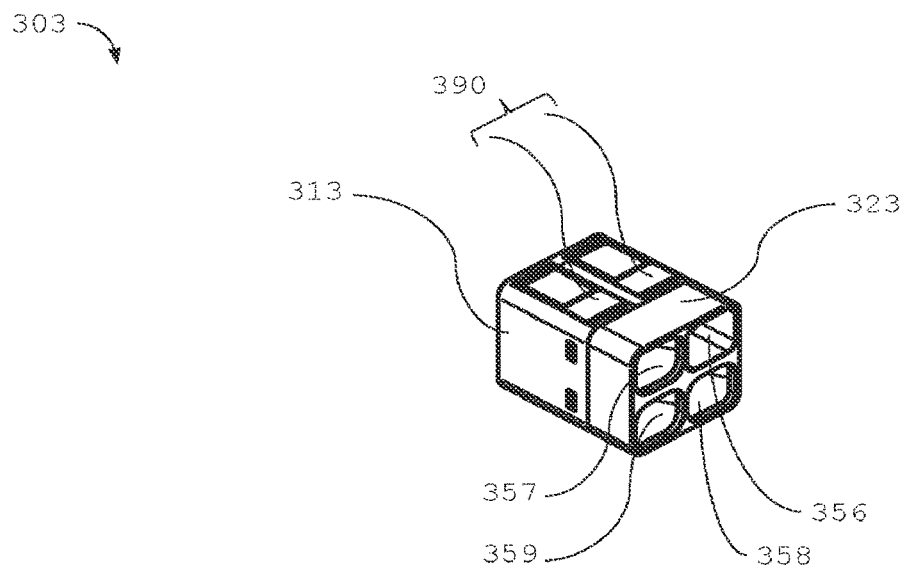
FIG. 2D illustrates a front perspective view of a 4-way external connector assembly in accordance with an exemplary embodiment.

The supply cable protector assemblies 400-403 also may be fitted to one end of the building electrical branch cable assemblies 1300-1303 and internal electrical branch cable assemblies 1304-1305 (see FIGS. 22-23). The supply cable protector assemblies 400-403 also may be configured to couple into the external connector assembly 300, 302 or 304-305 second-end connection terminal ports 350-352 (see FIGS. 2A, 2C and 2F). In some exemplary embodiments, only one position and only one orientation may be possible for the correct coupling of the supply cable protector assembly 400-403 due to, for example, common industry configurations, applicable standards, building codes and/or regulatory requirements. For example, wiring device electrical boxes may have a standard-sized "knock-out"—which references a partially-stamped or plugged hole in, for example, a metal wiring device electrical box, designed to be easily removed (that is, "knocked-out"). A common size for such "knock-outs" is commonly referred to as a "½-inch knock-out" (which is an industry term known to persons of ordinary skill in the art). In order to fit through a ½-inch knock-out, the cable protector may be configured in an L-shaped configuration as shown in FIG. 1E-G for example. In such circumstances, an external cable connector comprising second-end connection terminal ports configured to receive an L-shaped cable protector is necessary as shown in FIG. 2F for example. The other end of the building electrical branch cable assembly 1300-1303 and internal electrical branch cable assembly 1304-1305 may be fitted with a branch cable protector assembly 500-503 and may be configured to couple with the external connector assembly 300, 302, 304 or 305 (see FIG. 9) second-end connection terminal ports 353-355 (see FIGS. 2A, 2C and 2F). Again, in some exemplary embodiments, only one position and only one orientation may be possible in order for the cable protector to be correctly coupled. The positions and orientations of cable protectors during building electrical cable coupling (and coupling of other cables fitted with cable protectors, such as internal cables) may be controlled by the second-end connection terminal ports 350-359 entrance shapes, which may form polarization and key-way features (such as, for example, differences in the dimensions and shapes of the circumferences of the terminal ports and their respective locations, which correspond to the cable protector such that the cable protector may only be coupled to the external connector in one configuration), preventing the building electrical cables (and others fitted with cable protectors) from incorrect coupling. In the exemplary embodiments shown in FIG. 1 (for example) the second-end connection terminal ports 350-352 (FIGS. 2A, 2C and 2F) may be used for the incoming connection of building electrical supply cable assemblies 1200-1203 or the other end of the following: building electrical branch cable assemblies 1300-1303; or internal electrical branch cable assemblies 1304-1305. The second-end connection terminal ports 353-355 (FIGS. 2A, 2C and 2F) may be used for the outgoing connection of building electrical branch cable assemblies 1300-1303, or internal electrical branch cable assemblies 1304-1305. The load output cable protector assembly 600-601 fitted to the building electrical jumper cable assembly 1500-1501 and the building electrical load cable assembly 1400-1401 (see FIGS. 24 and 28) may be configured to couple with the external connector assemblies 300, 301, 303 and 304 second-end connection terminal ports 356-359 (FIGS. 2A-B and 2D-F). As above, in some exemplary embodiments, only one position and only one orientation for the correct coupling may be possible. In alternative embodiments, a different combination of polarization and key-way features or different geometric groupings of the second-end connection terminal ports may be used from those shown to achieve similar results or to make the electrical cable connecting system coupling even more specific or allow the use with different wiring device electrical boxes having different sizes of knock-outs without departing from the scope and spirit of the exemplary embodiments.

FIG. 1E illustrates a rear perspective view of an electrical cable connecting system 100 according to an exemplary embodiment. An external connector assembly 304 may be connected to the building electrical load cable assembly 1400 or 1401 (not shown—see FIG. 24B) with the same load output cable protector assembly 600 or 601 (not shown—see FIG. 24B) as illustrated in the exemplary embodiment of FIG. 1A-C. In FIG. 1E the external connector assembly 304 is illustrated as not yet connected to a building electrical supply cable assembly 1202 (end portion illustrated—See FIG. 21C for a full illustration of the MC type building electrical supply cable assembly). FIG. 1E illustrates a front perspective view of a cable protector assembly 402, according to another exemplary embodiment. The supply cable protector assembly 402 according to the exemplary embodiment shown in FIG. 1E may be configured for use with wiring device electrical boxes having ½-inch knock-outs, and therefore may be configured in an L-shape configuration, as opposed to the flat, wider shape of the supply cable protector assembly 400 illustrated in FIGS. 1A-D. The L-shape configuration of the supply cable protector assembly 402 may be configured to fit through a ½-inch knock-out aperture of a wiring device electrical box. A supply cable protector assembly 402 having a configuration such as that shown in FIG. 1E may have the added advantage of being able to fit through smaller knock-outs, such as the common ½ inch knock out, than a supply cable protector assembly having a different configuration, (such as the supply cable protector assembly 400 illustrated in FIGS. 1A-D) may be configured to fit through. The supply cable protector assembly 402 may alternatively have a different design shape that will perform the intended purpose of easily fitting through a ½-inch knock-out aperture of a wiring device electrical box, without departing from the spirit and scope of the present invention. The supply cable protector assembly 402 is illustrated to comprise a corresponding L-shaped slidable cover 411, which may be disposed in an extended position with respect to a body assembly 440. The L-shaped slidable cover 411 may also include a set of polarization and key-way features 411c (see FIGS. 3J-R) formed on the front portion thereof to prevent the supply cable protector assembly 402 from electrically and mechanically coupling with the wrong second-end connection terminal ports of the external connector assembly 304 (see, for example FIG. 2F for second-end connection terminal ports 350-352).

FIG. 1F illustrates a rear perspective view of the electrical cable connecting system 100 according to the exemplary embodiment of FIG. 1E, wherein the slidable cover 411 of the supply cable protector assembly 402 is illustrated to be in a retracted position, which is not normally the position for the slidable cover 411 when the supply cable protector assembly 402 is not fully coupled to the external connector assembly 304. In particular, the slidable cover 411 is shown in the retracted position for illustration purposes. FIG. 1F shows the stripped conductors of the building electrical supply cable assembly 1202 electrical cable wires 811-813 protruding from supply cable protector assembly 402, in alignment for corresponding second-end connection terminal ports 350-352 (see FIG. 2F) of the external connector assembly 304.

FIG. 1G illustrates a rear perspective view of the electrical cable connecting system 100 according to the exemplary embodiment of FIG. 1E, wherein the supply cable protector assembly 402 (coupled to the corresponding electrical supply cable assembly 1202) is illustrated to be fully electrically and mechanically coupled to the external connector assembly 304. As illustrated in FIG. 1G, the slidable cover 411 is in the fully retracted position, which is the normal position when the supply cable protector assembly 402 is fully electrically and mechanically coupled to the external connector assembly 304. The building electrical supply cable assembly electrical wires 811-813 are extended into the second-end connection terminal ports 350-352 (see FIG. 2F) of the external connector assembly 304, and each building electrical supply cable assembly electrical wire 811-813 is electrically and mechanically connected to the manual or tool operated and releasable clamp connection terminals of the external connector assembly 304. In FIGS. 1E-G, the building electrical supply cable protector assembly 402 is depicted in the L-shaped configuration, with two upper second-end openings for connection with external connector assembly 304 second-end terminal ports 351 and 352 and one lower second-end opening for connection with external connector assembly 304 second-end connection terminal port 350 (the second-end supply connection terminal ports). In some exemplary embodiments, only one upper second-end connection terminal port 352 and only one lower second-end connection terminal port 350 may be used for example when Metal Clad (MC) AP type cable is used. The second-end branch connection terminal ports 353-355 are illustrated as not in use (see FIG. 2F). A more detailed description of the electrical and mechanical coupling of the supply cable protector assembly 402 (and the corresponding building electrical supply cable assembly 1202) and the second-end connection terminal ports of the external connector assembly 304 is provided below in the detailed description with respect to FIGS. 2F-I.

FIGS. 2A-D and 2F are front perspective views showing various types of external connectors, including 10-way, 8-way, 6-way and 4-way that may be used within the electrical cable connecting system 100 (shown, for example, in FIG. 1A). FIGS. 2F-G are front and rear perspective views showing an alternative embodiment of the 10-way external connector illustrated in FIG. 2A for use with wiring device electrical boxes having ½-inch knock-outs. In these exemplary embodiments shown in FIGS. 2F-G, the cable protector slidable covers 411 (shown, for example, in FIGS. 1E-G) may be axially configured in an L-shape such that they may fit through the opening of a ½-inch knock-out. The supply cable protector assembly 402 (shown, for example, in FIGS. 1E-F) thus may align with second-end connection terminal ports 350-352 of an external connector assembly 304 such as shown in FIG. 2F.

The phrase "external connector" as used herein is used to reference various exemplary embodiments wherein the electrical cable connecting system's connector is external to the items to which it is connected via pig-tail jumper electrical wires, for example electrical or electronic wiring devices, as shown by the exemplary external connectors of FIGS. 1A-G. It is to be understood that the connector may be integral with such items without departing from the scope and intent of the present invention.

Figure 2E:
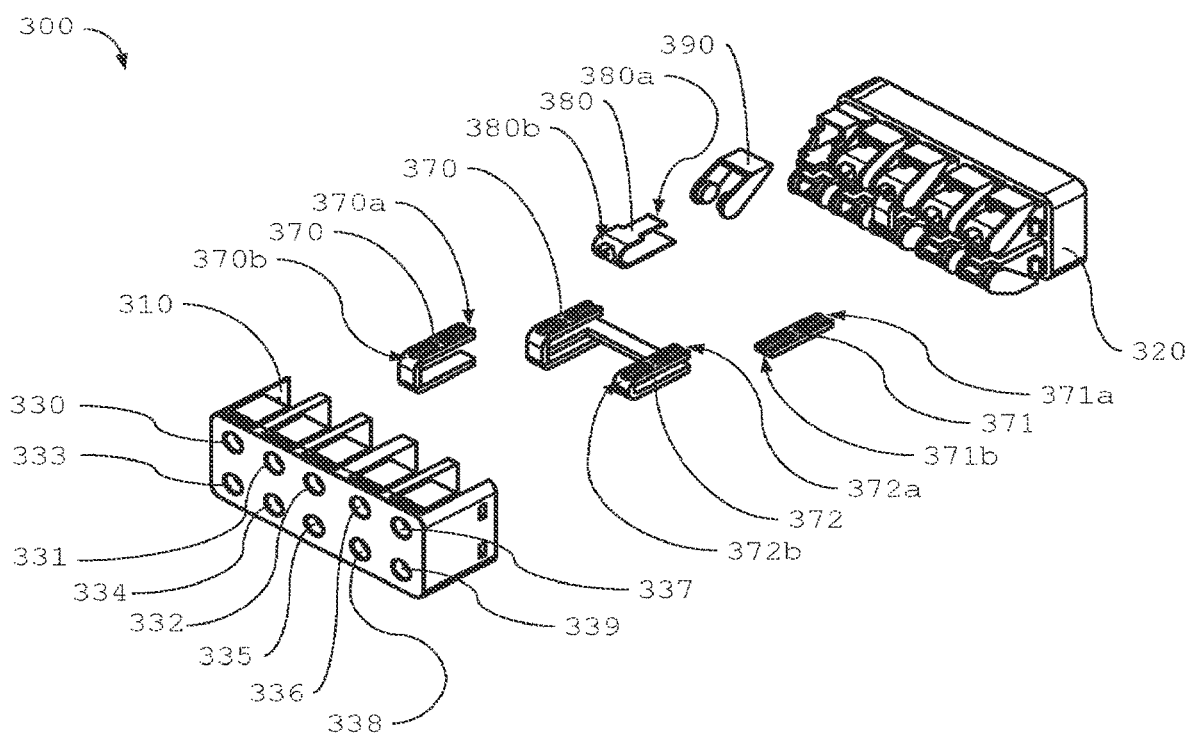
FIG. 2E illustrates a rear exploded view of an exemplary 10-way external connector assembly showing internal components thereof, in accordance with the exemplary embodiment of FIG. 2A.
Figure 2F:
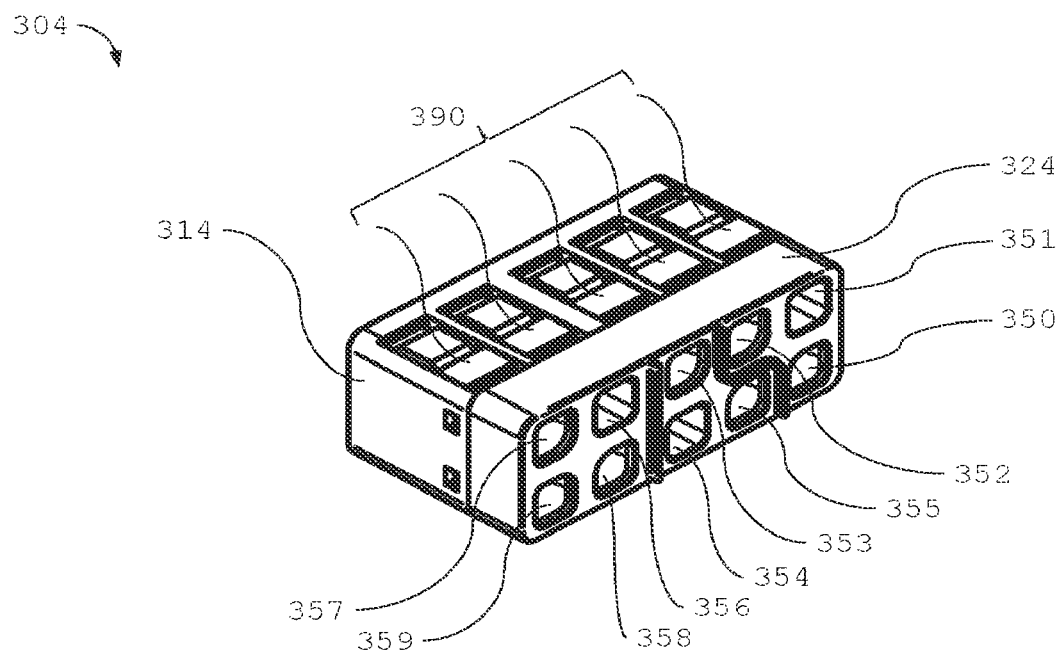
FIG. 2F illustrates a front perspective view of a 10-way external connector assembly according to an exemplary embodiment.
Figure 2G:
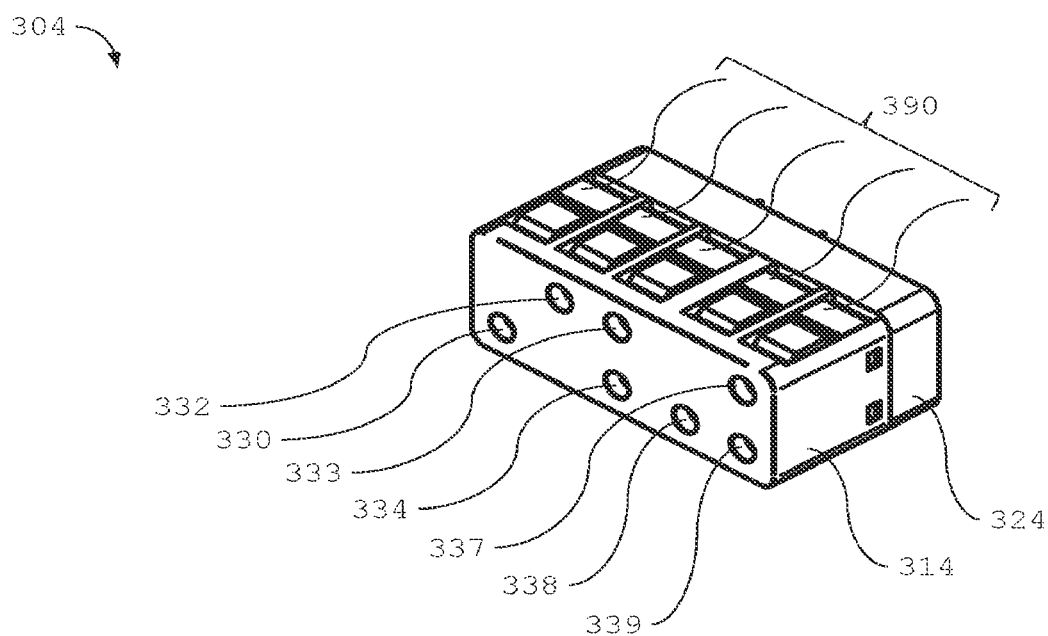
FIG. 2G illustrates a rear perspective view of a 10-way external connector assembly according to the exemplary embodiment of FIG. 2F, configured to have a predetermined wiring pattern for the connection of pig-tail jumper electrical wires.

FIG. 2E is a rear exploded view of a 10-way external connector assembly 300. Each external connector may comprise a cover 310-315 and a body 320-325 (cover 310 and body 320 are shown in FIGS. 2E, 2A-D, 2F-G and 9A-C). External connector assembly 300 may be configured to encase, partition and insulate a series of internal electrical members 371 and/or internal electrical link members 370 and/or internal electrical cross-link members 372-375 (member 372 is shown in FIG. 2E, see FIGS. 8-20), which may form the conductive parts of the external connector's manual or tool operated and releasable clamp connection terminals. The second-ends of internal electrical members 371, and/or internal electrical link members 370 and/or internal electrical cross-link members 372-375 (for example 371a, 370a, 372a) may each be configured to slidably receive a spring-clamp 380 through an opening 380b into which a manual lever 390 may be slidably inserted prior to snap-fitting the external connector cover 310-315 to the body 320-325. In these exemplary embodiments the manual levers 390 may be configured to each rotate independently (see FIG. 1A-B) about 90-degrees to a vertical position whereby the spring-clamp 380 and a jaw 380a of the spring-clamp 380 (see FIGS. 2H-I) are opened with two internal eccentric cams 390a on the substantially circular, bearing portions of the manual lever 390, allowing the associated building electrical cable wire conductor to pass into the recess groove or other alignment and grip feature on the second-end of the internal electrical member 371*a*, or internal electrical link member 370*a*, or internal electrical cross-link member 372*a*-375*a*, respectively, having already passed through the associated second-end connection terminal ports 350-363. Upon the return of each manual lever 390 to a horizontal position (see FIG. 1C) the associated spring-clamp 380 and the jaw 380*a* may be released, and the spring-clamp 380 may exert a spring pressure with the jaw 380*a* impacting the top side of the associated building electrical cable wire conductor and the lower side of the second-end of the internal electrical member 371, or internal electrical link member 370, or internal electrical cross-link member 372-375, respectively. Thus, the associated building electrical cable wire conductor may be compressed with sufficient force onto the recess groove or other alignment and grip feature on the top face of the internal electrical member 371*a*, or internal electrical link member 370*a*, or internal electrical cross-link member 372*a*-375*a* of the external connector manual or tool operated and releasable clamp connection terminals, respectively, to maintain contact, and the electrical resistance between these conductive elements may be reduced to a minimum suitable for a permanent or semi-permanent electrical and mechanical coupling when carrying the rated load of the building electrical cable. The building electrical cable wire conductors may protrude beyond the face (also referenced herein as front) of the cable protector slidable cover (for example 410, 411 or 610) in a retracted position such that the building electrical cable wire conductors may pass within the spring-clamps 380 and the jaws 380*a* only when the cable protector slidable cover (for example 410, 411 or 610) polarizing and key-way features align correctly with the external connector assembly 300-305 second-end connection terminal ports 350-363. This alignment permits the face of a cable protector slidable cover (for example 410, 411, 610) to enter the face of connector covers 320-324 (see FIGS. 2A-2G), such that the building electrical cable wire conductors may enter into the external connector 300-305 second-end connection terminal ports 350-363 only when aligned. This required alignment thus prevents incorrect mechanical and electrical coupling of building electrical cables fitted with cable protectors with incorrect external connector manual or tool operated and releasable clamp connection terminals.

FIGS. 2F-G illustrate front and rear perspective views, respectively, of an alternative exemplary embodiment of a 10-way external connector assembly 304. The 10-way external connector assembly 304 may be configured to be used in the case where wiring device electrical boxes have, for example, a ½-inch knock-out. In accordance with an exemplary embodiment, a supply or branch cable protector (including a corresponding body and slidable cover thereof) may be axially configured in an L-shape in order to fit through a ½-inch knock-out. Additional variations regarding shapes and sizes of the supply or branch cable protector may be provided to correspond with and fit through commonly used or newly provided wiring device electrical box knock-outs, without departing from the spirit and scope of the present invention as described herein.

In order to electrically couple a building electrical cable to an external connector assembly 300-305 as shown in FIGS. 2A-G, the following method may be followed: (1) all of the manual levers 390 that correspond to a building electrical cable wire to be connected may be opened in a 90-degree position; (2) a cable protector slidable cover (for example 410, 411 or 610) polarizing and key-way features (for example 410*c*, 411*c* or 610*c*), if provided, may be aligned correctly with the second-end connection terminal ports (for example 350-363); (3) a cable protector assembly (for example 400-403, 500-503, 600-601, 700-701) fitted to the building electrical cable may be pressed against the external connector assembly 300-305, and the cable protector slidable cover (for example 410, 411, 610) may be pushed back until fully retracted over the cable protector body assembly allowing the building electrical cable wire conductors to pass within the external connector spring-clamps 380 and under their jaws 380*a*; and (4) the manual levers 390 may be closed back to the horizontal position to complete the mechanical and electrical coupling. For example, in FIGS. 2J-K, the coupling between the building electrical supply cable assembly 1201 ground (or protective earth) electrical wire conductor 912 and the external connector assembly 300 second-end ground (or protective earth) supply connection terminal port 351 (not labelled) and the ground (or protective earth) pig-tail jumper electrical wire 1752 is shown in cut-away view FIG. 2J and isometric cut-away view FIG. 2K. However, in these exemplary embodiments, people having ordinary skill in the art will recognize that a different combination of external connector assemblies, cable protector slidable covers and body assemblies may be used to those shown to achieve similar results, for example where fewer first-end connection terminal openings are required (see FIG. 2G), without departing from the scope and spirit of the exemplary embodiments. People having ordinary skill in the art will also recognize that instead of a separate manual lever 390: for each external connector manual or tool operated and releasable clamp connection terminal, combined manual levers for multiple manual or tool operated and releasable clamp connection terminals may also be used; alternative actuator types such as a push-button actuator or sliding actuator may be used for each (or multiple) manual or tool operated and releasable clamp connection terminals; alternatively a push-in non-releasable clamp connection terminal may be used, for example, in circumstances where subsequent disconnection is not required without departing from the scope and spirit of the exemplary embodiments. Further, people having ordinary skill in the art will also recognize that external connectors may be provided with connection terminal ports not only on the second end of the external connector but also in place of connection terminal openings for pig-tail electrical wires on the first end of the external connector, for example to facilitate the in-line extension of building electrical cables.

Referring to FIG. 2, the external connector assembly 300-305 (see FIG. 9) second-end connection terminal ports 350-363 may be configured to receive building electrical cable wires without cable protectors fitted, such as discrete electrical wires or cables once their conductors are stripped of insulation to about one quarter of an inch or another suitable length following the same procedure for coupling the electrical wires to the second-end connection terminal ports 350-363 described above. People having ordinary skill in the art will recognize that the external connector bodies (for example 320-325) upper and lower surfaces, and/or cable protectors (for example 400-403, 500-503, 600-601, 700-701) may have markings to indicated their function or reference, with suitable letters such as "W" indicating neutral, or "H" indicating hot and symbols such as the ground symbol to indicate ground (or protective earth), to further facilitate the use of building electrical cables or discrete electrical wires without cable protectors fitted, either molded-in or with another suitable marking method, such as pad printing or hot-foil embossing, without departing from the scope and spirit of the exemplary embodiments.

Referring to FIGS. 2A-K each external connector type may be used with various different electrical or electronic wiring devices within a modular electrical or electronic wiring device assembly 210-222 (see FIGS. 8-20) as follows.

The 10-way external connector assembly 300 (FIGS. 2A and 2E) may be used, for example, with a 1-pole switch, a 2-pole switch or a 3-way switch, a dimmer switch or a Passive Infra-Red (PIR) switch with a local power feed connection. In modular wiring device assemblies 210, 216 and 218, the 10-way external connector assembly 300 (see FIGS. 2A, 12, 14 and 16) may include the following: three internal electrical link members 370 between the connection terminals with second-end ports 350—the hot (or live) supply connection terminal port and 353—the hot (or live) branch connection terminal port, and between 352—the neutral supply connection terminal port and 355—the neutral branch connection terminal port, and between 351—the ground (or protective earth) supply connection terminal port and 354—the ground (or protective earth) branch connection terminal port; and one internal electrical cross-link member 372 between the internal electrical link member 370 connecting the connection terminals with second-end ports 351, 354 and 356—the ground (or protective earth) load output connection terminal port; and up to three internal electrical members 371 forming the connection terminals with second-end ports, 357—the neutral load output connection terminal port, 358—the switched hot (or switched live) or traveler #1 load output connection terminal port and 359—the traveler #2 load output connection terminal port as required by the type of electrical or electronic wiring device used; up to ten manual levers 390; and up to ten spring-clamps 380.

The 10-way external connector assembly 304 (FIGS. 2F and 2G) may also be used with a 1-pole switch, a 2-pole switch or a 3-way switch, a dimmer switch or a Passive Infra-Red (PIR) switch with a local power feed connection. In modular wiring device assemblies 211, 217 and 218 the 10-way external connector assembly 304 (see FIGS. 2F, 13, 15 and 17) for use with wiring device electrical boxes having ½-inch knock-outs may be used and similarly may include the following: one internal electrical link member 370 between the connection terminals with second-end ports 352—the neutral supply connection terminal port and 355—the neutral branch connection terminal port, and one internal electrical cross-link member 374 between the connecting terminals with second-end openings 351—the ground (or protective earth) supply connection terminal port, 354—the ground (or protective earth) branch connection terminal port and 356—the ground (or protective earth) load output connection terminal port; and up to five internal electrical members 371 forming the connection terminals with second-end ports, 350—the hot (or live) supply connection terminal port, 353—the hot (or live) branch connection terminal port, 358—switched hot (or switched live) or traveler #1 load output connection terminal port and 357—neutral load output connection terminal port, 359—the traveler #2 load output connection terminal port as required by the type of electrical or electronic wiring device used; up to ten manual levers 390; and up to ten spring-clamps 380.

The 8-way external connector assembly 301 (see FIG. 2B) may be used with a 3-way switch or a 4-way switch with a remote power feed connection. In these modular electrical or electronic wiring device assemblies 220-221 the 8-way external connector assembly 301 (see FIGS. 2B, 18 and 19) may include the following: one internal electrical cross-link member 375 between the connection terminals with second-end ports 360—the ground (or protective earth) load input connection terminal port and 356—the ground (or protective earth) load output connection terminal port; and up to six internal electrical members 371 in the connection terminals with second-end ports, 357—the neutral load output connection terminal port, 358—the common or output #1 load output connection terminal port, 359—the output #2 load output connection terminal port, 361—the neutral load input connection terminal port, 362—the traveler #1 or input #1 load input connection terminal port, and 363—the traveler #2 or input #2 load input connection terminal port as required by the type of electrical or electronic wiring device used; up to eight manual levers 390; and up to eight spring-clamps 380.

The 6-way external connector assembly 302 (see FIG. 2C) may be used with a power receptacle, a wired spur connection, a non-feed through GFCI receptacle or a non-feed-through AFCI receptacle. In these modular electrical or electronic wiring device assemblies 212 the 6-way external connector assembly 302 (see FIGS. 2C, and 8) may include up to three internal electrical link members 370 between the connection terminals with second-end ports 350—the hot (or live) supply connection terminal port and 353—the hot (or live) branch connection terminal port, and between 352—the neutral supply connection terminal port and 355—the neutral branch connection terminal port, and between 351—the ground (or protective earth) supply connection terminal port and 354—the ground (or protective earth) branch connection terminal port; up to six manual levers 390; and up to six spring-clamps 380.

The 6-way external connector assembly 305 (see FIG. 9) may also be used with a power receptacle, a wired spur connection, a non-feed through GFCI receptacle or a non-feed-through AFCI receptacle. In these modular electrical or electronic wiring device assemblies 213, the alternative 6-way external connector assembly 305 for use with wiring device electrical boxes having ½-inch knock-outs may include one internal electrical link member 370 between the connection terminals with second-end ports 352—the neutral supply connection terminal port and 355—the neutral branch connection terminal port, one internal electrical cross-link member 373 between the connecting terminals with second-end openings 351 the ground (or protective earth) supply connection terminal port 354—the ground (or protective earth) branch connection terminal port and up to two internal electrical members 371 forming the connection terminals with second-end ports, 350—the hot (or live) supply connection terminal port, 353—the hot (or live) branch connection terminal port; up to six manual levers 390; and up to six spring-clamps 380.

The 6-way external connector assembly 302 (see FIG. 2C) may also be used with protected feed-thru GFCI receptacles or feed-through AFCI receptacles. In these modular electrical or electronic wiring device assemblies 214 the 6-way external connector 302 (see FIGS. 2C, 10) may include the following: one internal electrical link member 370 between the connection terminals with second-end ports 351—the ground (or protective earth) supply connection terminal port and 354—the ground (or protective earth) branch connection terminal port; up to four internal electrical members 371 in the connection terminals with second-end ports, 350—the hot (or live) supply connection terminal port, 352—the neutral supply connection terminal port, 353—the hot (or live) branch connection terminal port and 355—the neutral branch connection terminal port; up to six manual levers 390; and up to six spring-clamps 380.

The 6-way external connector assembly 305 (see FIG. 11) may also be used with protected feed-thru GFCI receptacles or feed-through AFCI receptacles. In modular electrical or electronic wiring device assemblies 215 the alternative 6-way external connector assembly 305 for use with wiring device electrical boxes having ½-inch knock-outs may be used and similarly may include one internal electrical cross-link member 373 between the connecting terminals with second-end openings 351—the ground (or protective earth) supply connection terminal port, 354—the ground (or protective earth) branch connection terminal port and up to four internal electrical members 371 forming the connection terminals with second-end ports, 350—the hot (or live) supply connection terminal port, 352—the neutral supply connection terminal port, 353—the hot (or live) branch connection terminal port, 355—the neutral branch connection terminal port; up to six manual levers 390; and up to six spring-clamps 380.

The 4-way external connector assembly 303 (FIG. 2D) may be used with a 1-pole switch, with a remote power feed connection and with the load link cable assembly 1900 (see FIG. 26). In the modular electrical or electronic wiring device assembly 222 (see FIG. 20) the 4-way external connector assembly 303 may include the following: up to four internal electrical members 371 in the connection terminals with second-end ports, 356—the ground (or protective earth) load output connection terminal port, 357—neutral or traveler #1 load output connection terminal port, 358—switched hot (or switched live) load output connection terminal port (port 359 is not used in this exemplary embodiment); up to four manual levers 390; and up to four spring-clamps 380.

Figure 2H:
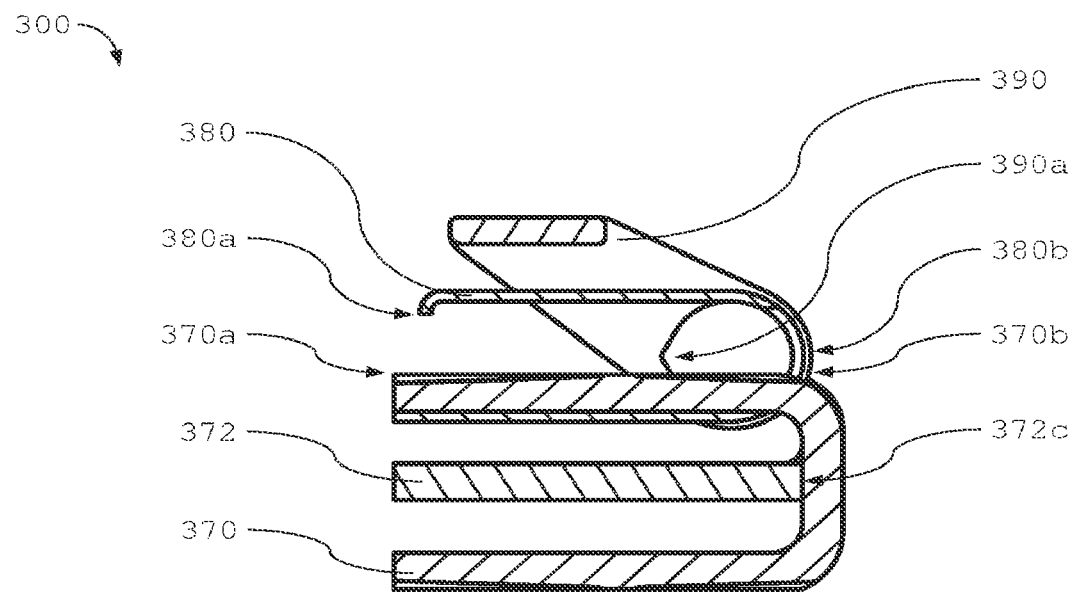
FIG. 2H illustrates an enlarged cross-sectional view of internal components of a single manual or tool operated and releasable clamp connection terminal of an external connector assembly, in accordance with an exemplary embodiment.

FIG. 2H shows a cross-sectional view of external connector conductive, current-path components comprising a manual or tool operated and releasable clamp connection terminal assembly. The manual lever 390 and the spring-clamp 380 and a jaw 380a of the spring-clamp 380 are shown in a closed state in which pressure would be applied to the conductor of the building electrical cable (not shown—see FIG. 2J-K for an example) making contact with the jaw 380a compressing the conductor onto the second-end recess groove or other alignment and grip feature 370a of the internal electrical link member 370. One of the manual levers 390 cams 390a may be clearly seen. When the manual lever 390 is raised into a 90-degree position (as shown in FIG. 1A-B) the cams 390a will be rotated to push against the internal surface of the spring-clamp 380 raising the jaw 380a away from the electrical wire conductor of the building electrical cable, allowing the electrical wire conductor to be admitted or withdrawn from the external connector manual or tool operated and releasable clamp connection terminal port. The first-end recess groove or other alignment and grip feature 370b of the internal electrical link member 370 forms a weld connection terminal, where the stripped pig-tail jumper electrical wire conductor or external connector link electrical wire conductor may be resistance welded. The butt or projection weld location 372c between the internal electrical link cross-member 372 and the internal electrical link member 370 may also be clearly seen. This weld connection facilitates the coupling of one external connector manual or tool operated and releasable clamp connection terminal to another within the body of the external connector assembly via the internal electrical link cross-member 372. The opening 380b in the spring-clamp 380 allows the internal electrical link member 370 and its pre-welded pig-tail jumper wire or external connector link electrical wire, to pass into the manual or tool operated and releasable clamp connection terminal assembly.

Figure 2I:
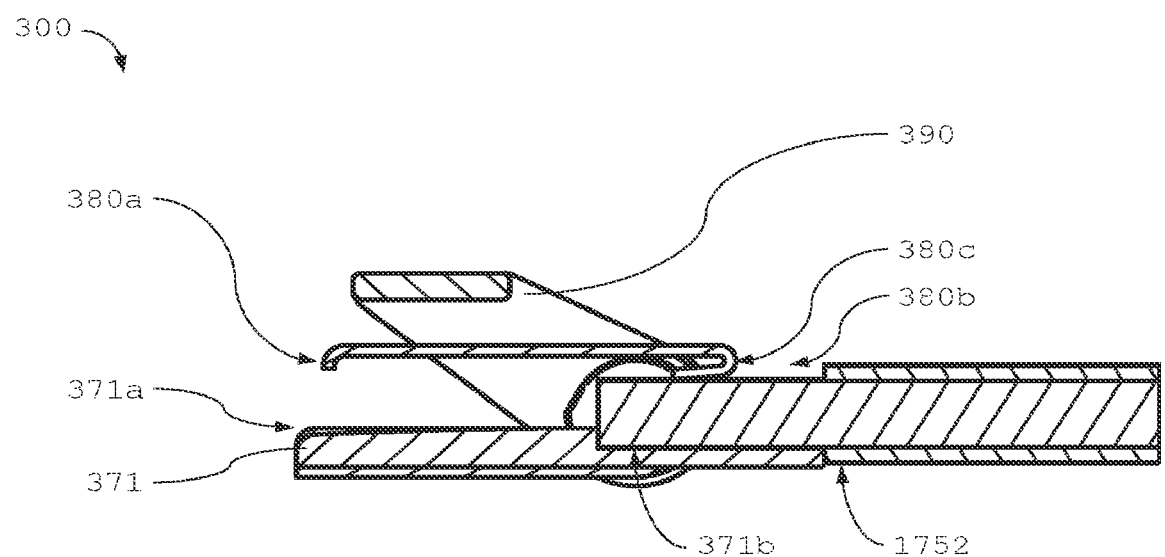
FIG. 2I illustrates an enlarged cross-sectional view of internal components of a manual or tool operated and releasable clamp connection terminal of an external connector assembly, in accordance with an exemplary embodiment.

FIG. 2I illustrates an enlarged cross-sectional view of an exemplary embodiment of manual or tool operated and releasable clamp connection terminal of the exemplary embodiments of external connectors illustrated in FIG. 2A-G modified to add a secondary push-in clamp connection terminal to receive a stripped pig-tail jumper electrical wire conductor or stripped external connector link electrical wire conductor. In this exemplary embodiment the manual or tool operated and releasable clamp connection terminals of the external connectors 300-305 may have an electrical member 371 (or electrical link member 370 or electrical cross-link member 372-375—not illustrated) or other exemplary electrical members—not illustrated, having a second-end recess groove 371a (or 370a or 372a-375a—not illustrated) (or other alignment or seating feature of the electrical members) to receive building electrical cable wire conductors as described above and a second spring-clamp jaw 380c formed in the rear upper surface of the spring-clamp 380 opening 380b at the opposing end of the spring-clamp 380 upper member to the first spring-clamp jaw 380a and positioned immediately above the first-end recess groove 371b of the electrical member 371 or other alignment or seating feature of the internal electrical member 371. The second spring-clamp jaw 380c may be operable to receive a stripped pig-tail jumper electrical wire conductor or stripped external connector link electrical wire conductor inserted through the connection terminal opening of the external connector cover 310-315 (see FIG. 2A-G) as illustrated, for example as shown in FIG. 2I, with stripped pig-tail jumper electrical wire 1752. The second spring-clamp jaw 380c is illustrated in a compressed state having had the pig-tail jumper electrical wire conductor 1752 inserted under the jaw 380c and between the electrical link member 371 and its first-end recess groove 371b. In this alternative exemplary embodiment, there is no need for the stripped pig-tail jumper electrical wire conductor to be resistance welded (or otherwise affixed) to the first-end recess groove 371b of the internal electrical member 371 as would be the case in the exemplary embodiment illustrated in FIGS. 2E and 2H. As a result, the spring-clamp 380 and corresponding jaw 380c may grip and secure a top portion of the inserted pig-tail jumper electrical wire conductor (for example 1752) to the corresponding first-end recess groove 371b (or 370b, or 372b-375b—not illustrated). Thus, gripping an inserted stripped pig-tail jumper electrical wire conductor with sufficient force within a first-end recess groove 371b (or 370b, or 372b-375b—not illustrated) of the internal electrical member 371 (or the internal electrical link member 370, or the internal electrical cross-link member 372-375—not illustrated), of the external connector assembly manual or tool operated and releasable clamp connection terminal, which may significantly reduce the electrical resistance between these conductive elements to a minimum suitable for a permanent electrical coupling when carrying the rated load of the pig-tail jumper electrical wire. The above-referenced push-in clamp connection terminal also may provide a reliable and secure mechanical coupling. The operation of the manual levers 390 (and the alternative arrangements) and the insertion of the building electrical cable wires may be otherwise the same as described for FIG. 2A-H above.

Figure 2J:
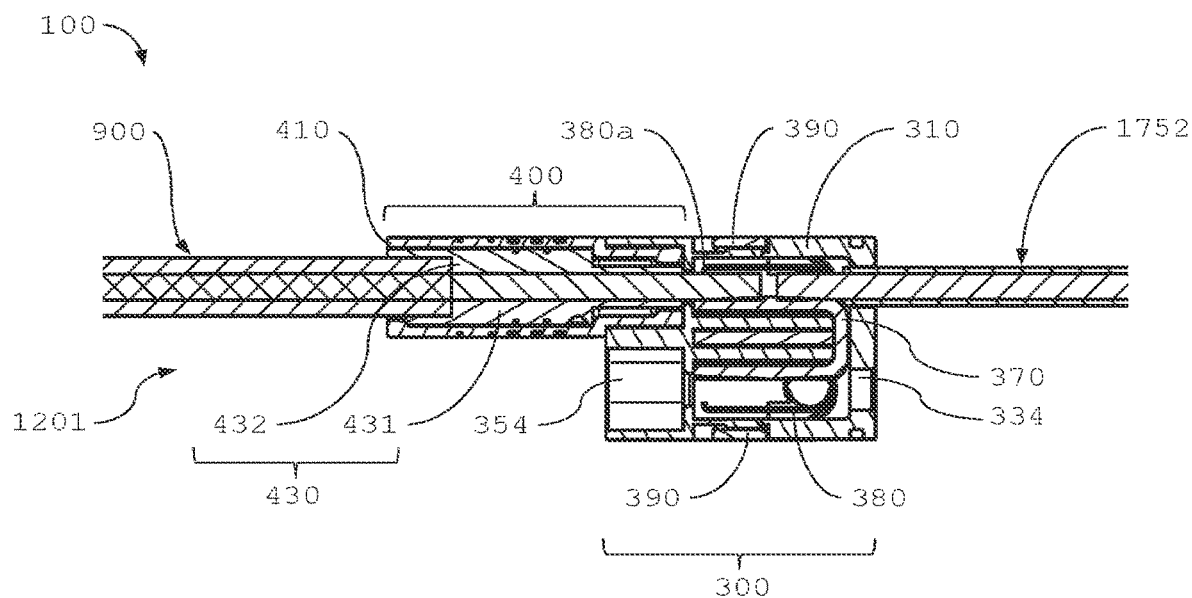
FIG. 2J illustrates a cross-sectional view of an exemplary external connector assembly in accordance with the exemplary embodiment of FIG. 5D, while connected with a building electrical supply cable fitted with a cable protector assembly.
Figure 2K:
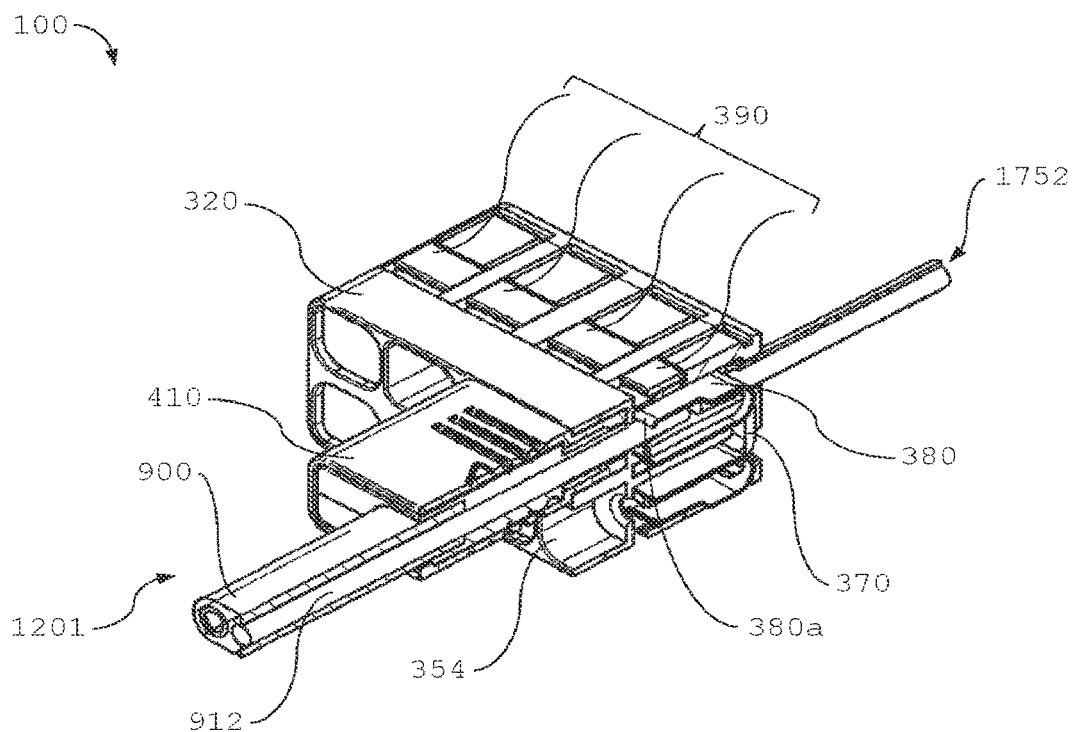
FIG. 2K illustrates an isometric cutaway view of an exemplary external connector assembly and a building electrical supply cable fitted with a cable protector assembly, in accordance with the exemplary embodiment of FIG. 2J.

FIGS. 2J-K show a cross-sectional and an isometric cross-sectional view of the ground (or protective earth) circuit of a building electrical supply cable assembly 1201 with the cable protector slidable cover 410 retracted over the body assembly 430 (comprising the upper body 432 and lower body 431), coupled with the external connector assembly 300, which itself may be connected to an electrical or electronic wiring device (not shown—see FIG. 1A-G for examples) with the ground (or protective earth) pig-tail jumper electrical wire 1752. The vacant ground (or protective earth) branch first-end connection terminal opening 334 and second-end connection terminal ports 354 are shown immediately below. The ground (or protective earth) conductor of the building electrical supply cable 912 may be compressed by the external connector assembly 300 spring-clamp 380 and jaw 380a onto the second-end connection terminal of the internal electrical link member 370 when the associated manual lever 390 is in the closed position. The ground (or protective earth) pig-tail jumper electrical wire 1752 conductor may be resistance welded to the internal electrical link member 370 first-end connection terminal, which completes the electrical circuit from the ground (or protective earth) supply cable wire conductor to the electrical or electronic wiring device (not shown—see FIG. 1A-G for examples).

Some or all of the external connector assembly's individual manual or tool operated and releasable clamp connection terminals may also be configured to receive electrical signal cable wires or electrical communication network cable wires, and therefore may alternatively conduct electrical signals instead of electrical power. One practical difference in such a configuration is the gauge and type of electrical wire that may be mechanically and electrically coupled to the external connector's internal electrical terminals. Thus, an external connector assembly may alternatively be used to transmit/receive low-voltage electrical signals instead of or as well as high-voltage electrical power and used to provide utility power and network signals to residential, commercial and industrial buildings for example.

The external connector assemblies 300-305 covers 310-315 and bodies 320-325 and manual levers 390 may be fabricated using materials such as polymers, polycarbonates or polyamide materials, or any other suitable material. The internal electrical member 371, or internal electrical link member 370, or internal electrical cross-link members 372-375, which form the conductive parts of the external connector manual or tool operated and releasable clamp connection terminals, may be fabricated of electroplated copper alloy or any other galvanically suitable, oxidization protected and conductive material. The internal electrical link member 370 and the internal electrical cross-link member 372 may be electrically coupled by electric resistance butt or projection welding at point 372c (see FIG. 2H) or any other suitable process. The spring-clamps 380 may be fabricated from spring stainless steel or any other suitable oxidization protected, leaf spring material. The external connector assemblies may be designed to: include a different number of connection terminals; receive different types of electrical wire, such as solid or stranded electrical wires; receive different electrical wire gauges or combinations or electrical wire gauges across their connection terminals; have different connection terminal types such as a manual or tool operated and releasable clamp connection terminal (detailed above), a push-in clamp connection terminal, a weld connection terminal or other types of connection terminal; include a different number of manual levers than they have manual or tool operated and releasable clamp connection terminals, such that multiple manual or tool operated and releasable clamp connection terminals are operable together through the action of a single manual lever; use manual levers with a different number of cam features or lever-arms; or use different actuator types such as push-button actuators or slide actuators for their manual or tool operated and releasable clamp connection terminals, all known to persons of ordinary skill in the art without departing from the scope and spirit of the exemplary embodiments.

Figure 3C:
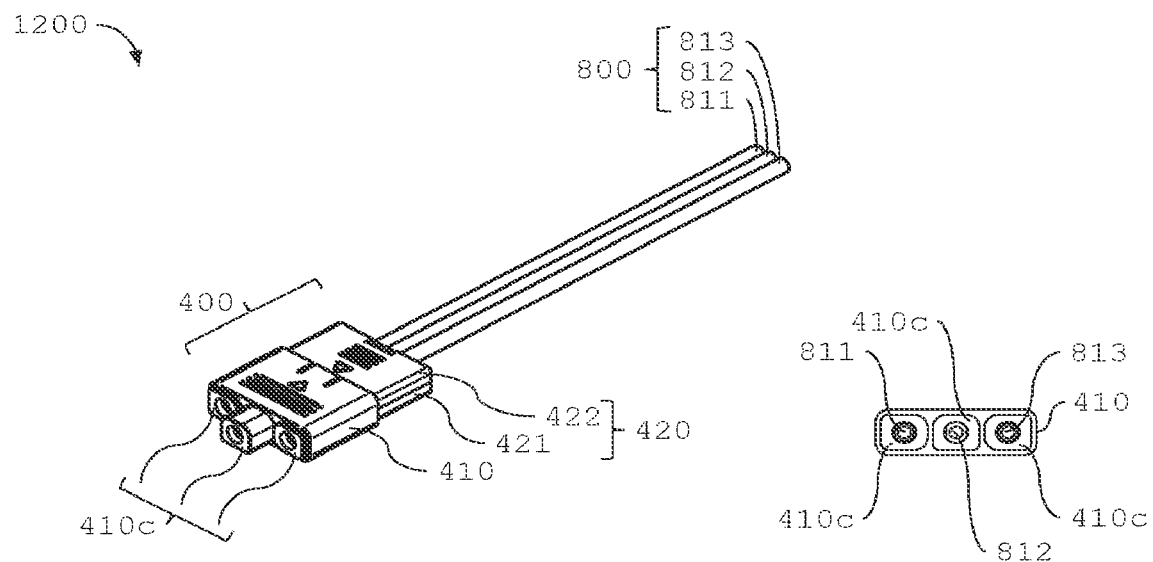
FIG. 3C illustrates a front perspective view of the building electrical supply cable assembly of FIG. 3A, with the cable protector slidable cover in a retracted position exposing the stripped conductors of the building electrical supply cable wires.
Figure 3C:
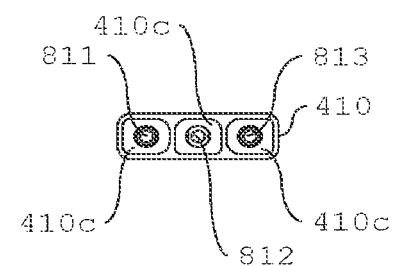
Figure 3C:
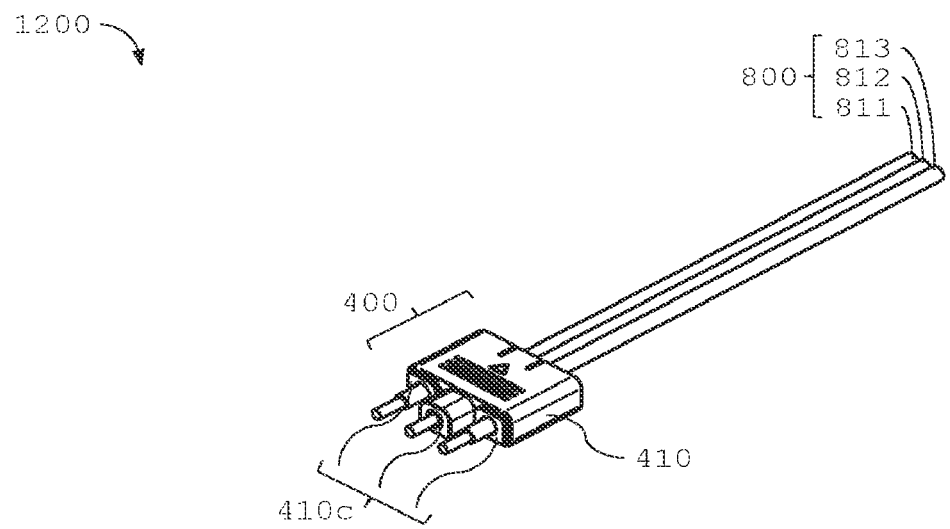

FIGS. 3A and 3C are perspective and front views of the end portion of a building electrical supply cable assembly 1200 (see FIG. 21A for a full view) with electrical cable wires 811-813 as would be the case for a Metal Clad (MC) cable fitted with a cable protector assembly 400 according to a further exemplary embodiment and comprising a slidable cover 410, and a body assembly 420 comprising a lower body 421 and an upper body 422. The electrical cable wire 811 may be the hot (or live) supply electrical wire and may have black insulation surrounding a conductor, the electrical cable wire 812 may be the ground (or protective earth) supply electrical wire and may have green insulation surrounding a conductor and the electrical cable wire 813 may be the neutral supply electrical wire and may have white insulation surrounding a conductor. In FIG. 3A, the cable protector slidable cover 410 is shown in an extended position, covering and protecting the stripped conductors of the electrical cable wires 811-813 from contact with other conductive parts of the electrical cable connecting system or from contact with installers.

FIG. 3B is a front view of the same end portion of a building electrical supply cable assembly 1200 as shown in FIG. 3A showing the polarization and keyway features on the front of the slidable cover 410c and the relative positions of the electrical cable wires 811-813 therein. For example, slidable cover 410c is shown with its protruding central opening feature having different curvature on its upper corners than on its lower corners.

FIG. 3C is a perspective view of the same end portion of a building electrical supply cable assembly 1200 as shown in FIG. 3A, but with the cable protector slidable cover 410 retracted to expose the stripped conductors of the electrical cable wires 811-813, which may be inserted into the second-end connection terminal ports 350-352 (for example see FIGS. 2A and 2C) of an external connector assembly 300 or 302 of a modular electrical or electronic wiring device. The polarization and keyway features on the front of the slidable cover 410c prevent the electrical cable 800 from coupling with the wrong second-end connection terminal ports of an external connector as described above.

The cable protector slidable cover 410 may be coupled with the correct second-end connection terminal ports, (for example, ports 350-352 in FIGS. 2A and 2C), of an external connector assembly with the slidable cover 410 still in the extended position (see FIG. 3A). The extended position of the cable protector cover 410 makes the electrical cable 800 safe to handle even when the stripped conductors of the electrical cable wires 811-813 contained within the slidable cover 410 are hot or live. Upon coupling of the cable protector slidable cover 410 with the correct external connector second-end connection terminal ports (for example 350-352), the cable protector body assembly 420 and the electrical cable 800 itself may be pushed towards the face of the slidable cover 410 and the external connector assembly, allowing the latch 410b to overcome the extended detent recess 422c and the slidable cover 410 to slide axially along the cable protector body assembly 430 until the latch 410b enters the retracted detent recess 422d (see FIG. 3D) and allowing the stripped conductors of the electrical cable wires 811-813 to enter the second-end connection terminal ports, for example, ports 350-352 (shown in FIGS. 2A and 2C), and within, for example, the manual or tool operated and releasable clamp connection terminals of the external connector assembly 300 or 302.

Figure 3D:
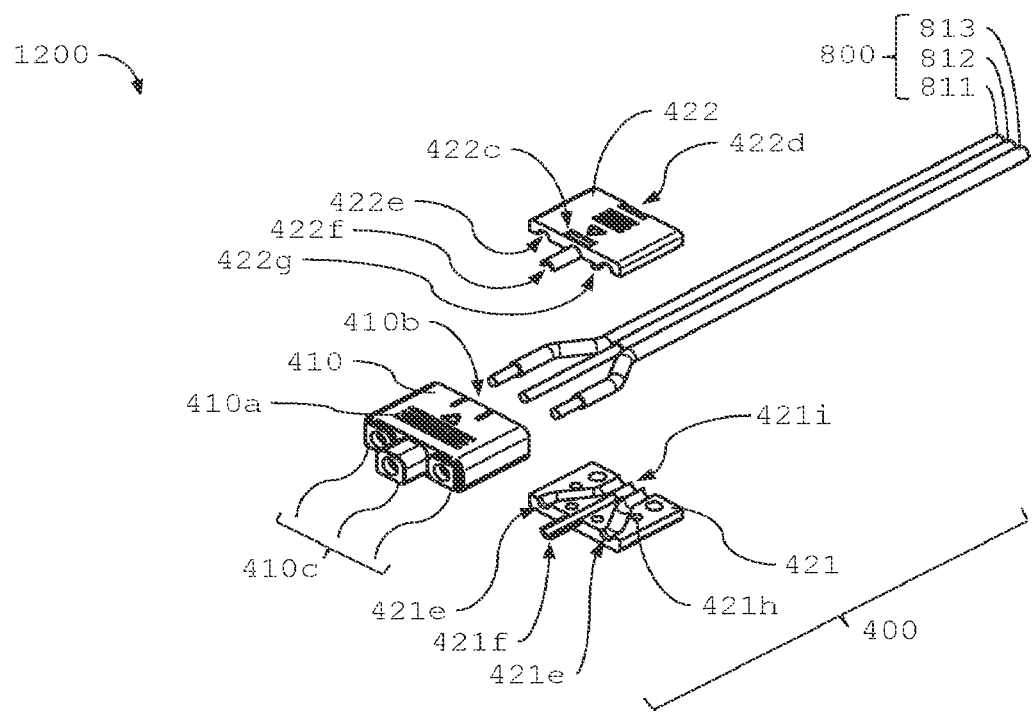
FIG. 3D illustrates an exploded front perspective view of the supply cable protector assembly fitted to the end of a building electrical supply cable, in accordance with the exemplary embodiment of FIG. 3A.
Figures 3E, 3F:
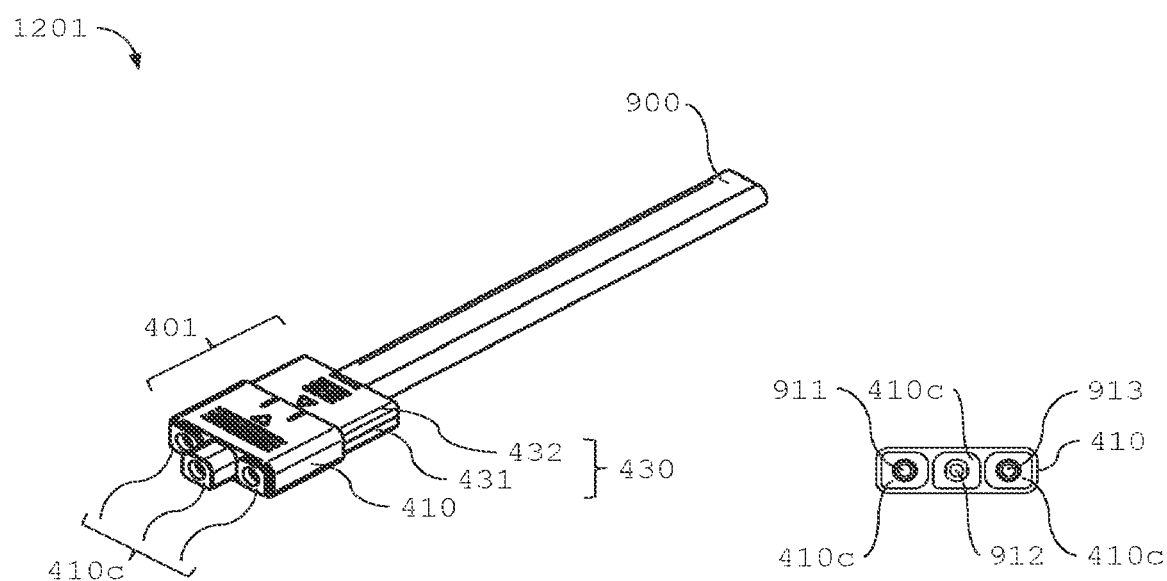
FIG. 3E illustrates a front perspective view of a supply cable protector assembly fitted to the end of a Non-Metallic sheathed (NM) type building electrical supply cable assembly according to an exemplary embodiment, with a corresponding cable protector slidable cover in an extended position.
FIG. 3F illustrates a front view of a building electrical supply cable assembly in accordance with the exemplary embodiment of FIG. 3E.
Figure 3G:
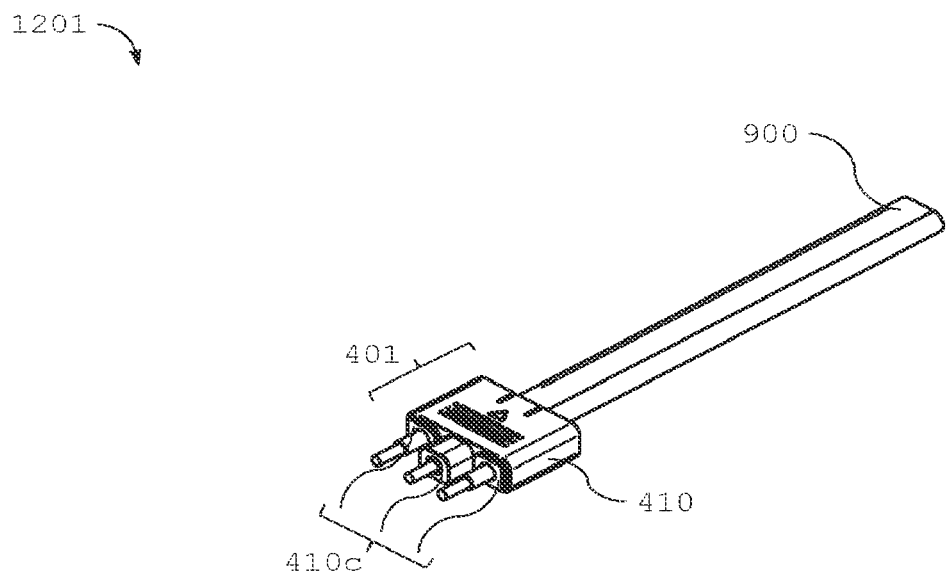
FIG. 3G illustrates a front view of the building electrical supply cable assembly of FIG. 3E, with the cable protector slidable cover in a retracted position exposing the stripped conductors of the building electrical supply cable wires.
Figure 3H:
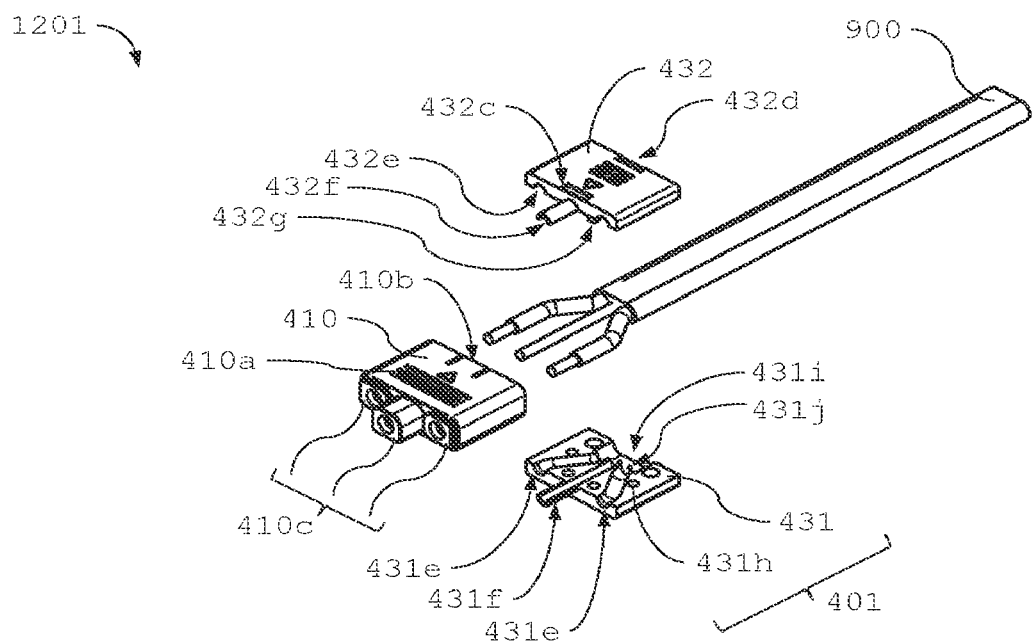
FIG. 3H illustrates an exploded front perspective view of a supply cable protector assembly fitted to the end of a building electrical supply cable, in accordance with the exemplary embodiment of FIG. 3E.

FIG. 3D is an exploded view of the same end portion of a building electrical supply cable assembly 1200 as shown in FIG. 3A, revealing the internal construction of the cable protector assembly 400 shown in these exemplary embodiments. The cable protector slidable cover 410 may be provided with the following molded features: a series of grip grooves 410a to allow an installer to manually grip the slidable cover 410 and slide the cover 410 along the axis of the cable protector body assembly; a latch feature 410b to provide a haptic and/or an audible signal and to engage with one of two detent recesses 422c and 422d on the upper body 422; an insulator 422f, which when the upper body 422 and lower body 421 is assembled forms a substantially tubular insulator with the reciprocal insulator 421f and covers part of the stripped length of the electrical cable ground (or protective earth) wire 812. The upper body 422 and lower body 421 may be fabricated with up to three electrical cable wire channels 421e and 422e into which the electrical cable wires 811-813 may be fitted having been pre-formed and stripped to the appropriate lengths before assembly. The entrance to the electrical cable wire channels may be fabricated with electrical cable jacket or electrical cable wire insulation grip features (not shown but similar to those shown in FIG. 3I-H, 431j and 432j for a cable protector lower body 431 and upper body 432 for type NM cable assembly). The upper body 422 and the lower body 421 may be assembled and interlock together using a series of six bosses 422g projecting from the upper body 422, which align intimately with a series of six externally counterbored apertures 421h (counterbores not shown but similar to those shown in FIG. 3H, 442h). When the upper body 422 and lower body 421 are assembled around the electrical cable wires 811-813 the tops of the bosses 422g projecting into the external counterbores on the lower body 421 may be heat-staked to form securing rivet heads flush with the outside of the lower body 421. The slidable cover 410 may be then slidably fitted over the assembled body 420 to rest in either the extended or retracted detent position.

FIGS. 3E-I shows perspective, front and exploded views of a building electrical supply cable assembly 1201 according to a further exemplary embodiment using NM type cable in place of the MC type cable shown in building electrical supply cable assembly 1200 shown in FIGS. 3A-D. Other than the cable entry features (for example 431i) and electrical cable jacket or electrical cable wire insulation features (for example 431j and 432j) molded into the lower body 431 and upper body 432 the construction may be substantially the same as that discussed above for the building electrical supply cable assembly 1200 of FIGS. 3A-D. The electrical cable wire 911 may be the hot (or live) supply electrical wire and may have black insulation surrounding a conductor, the electrical cable wire 912 may be the ground (or protective earth) supply electrical wire and may have no insulation surrounding a conductor and the electrical cable wire 913 may be the neutral supply electrical wire and may have white insulation surrounding a conductor. The cable protector assembly 401 may use the same slidable cover 410 as building electrical supply cable assembly 1200 shown in FIGS. 3A-D, and the cable protector assembly 401 may be interchangeable with cable protector assembly 400 with respect to the external connectors configured to receive them.

FIG. 3I illustrates the upper body 432 of a supply cable protector assembly 401, wherein there may be an additional molded cutting guide 432k to indicate more precisely where to cut the electrical cable wires (not illustrated) for use in field fitting applications of the supply cable protector assembly 401 (or any other cable protector assembly including a cutting guide). The front edge of the molded cutting guide 432k may act as a marker for the subsequent cutting of the electrical cable wires and when cut the molded cutting guide 432k may be snapped off from the upper body portion of 432 along a molded groove between the molded cutting guide 432k and the insulator 432f. All cable protector bodies according to the various exemplary embodiments described herein may have a cutting guide molded therein to facilitate field fitting of cable protector assemblies.

FIG. 3J-K is a perspective and front view of the end portion of a building electrical supply cable assembly 1202 (see FIG. 21C for a full view), for use with wiring device electrical boxes having ½-inch knock-outs, with electrical cable wires 811-813 as would be the case for a Metal Clad (MC) cable fitted with a cable protector according to a further exemplary embodiment and may comprise a slidable cover 411, and a body assembly 440 comprising lower body 441 and an upper body 442. The electrical cable wire 811 may be the hot (or live) supply electrical wire and may have black insulation surrounding a conductor, the electrical cable wire 812 may be the ground (or protective earth) supply electrical wire and may have green insulation surrounding a conductor and the electrical cable wire 813 may be the neutral supply electrical wire and may have white insulation surrounding a conductor. The cable protector slidable cover 411 is shown in an extended position, covering and protecting the stripped conductors of the electrical cable wires 811-813 from contact with other conductive parts of the electrical cable connecting system or from contact with installers.

FIG. 3K is a front view of the same end portion of a building electrical supply cable assembly 1202 as shown in FIG. 3J showing the polarization and keyway features on the front of the slidable cover 411c and the relative positions of the electrical cable wires 811-813 therein. For example, slidable cover 411c is shown with its protruding upper left opening feature having different curvature on its upper corners than on its lower corners.

Figure 3L:
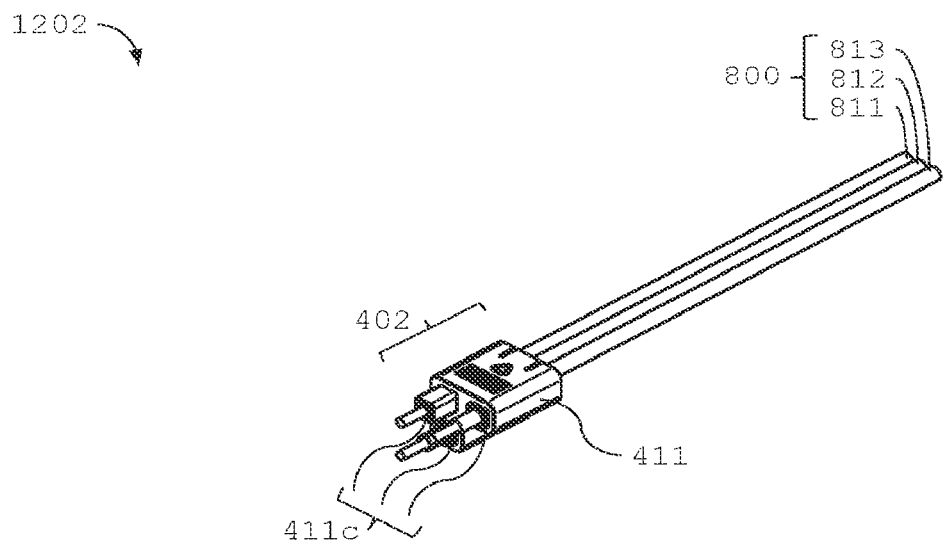
FIG. 3L illustrates a front perspective view of the supply cable protector assembly of FIG. 3J, with the cable protector slidable cover in a retracted position exposing the stripped conductors of the building electrical supply cable wires.

FIG. 3L is a perspective view of the same end portion of a building electrical supply cable assembly 1202 as shown in FIG. 3J, but with the cable protector slidable cover 411 retracted to expose the stripped conductors of the electrical cable wires 811-813, which may be inserted into the second-end connection terminal ports 350-352 (for an example see FIG. 2F) of an external connector assembly 304 or 305 (not shown—see FIGS. 2F, 9 and 11) of a modular electrical or electronic wiring device. The polarization and keyway features on the front of the slidable cover 411c prevent the electrical cable 800 from coupling with the wrong second-end connection terminal ports of an external connector as described above. The cable protector slidable cover 411 may be coupled with the correct second-end connection terminal ports, (see, for example, ports 350-352 shown in FIG. 2F), of an external connector with the slidable cover 411 still in the extended position (see FIG. 3J). The extended position of the cable protector slidable cover 411 makes the electrical cable 800 safe to handle even when the stripped conductors of the electrical cable wires 811-813 contained within the slidable cover 411 are hot or live. Upon coupling of the cable protector slidable cover 411 into the correct external connector second-end connection terminal ports (for example 350-352) the cable protector body assembly 440 and the electrical cable 800 itself may be pushed towards the face of the slidable cover 411 and the external connector, allowing the latch 411b to overcome the extended detent recesses 442c and the slidable cover 411 to slide axially along the cable protector body assembly 440 until the latch 411b enters the retracted detent recess 442d (see FIG. 3M) and allowing the stripped conductors of the electrical cable wires 811-813 to enter the second-end connection terminal ports, for example, ports 350-352 (shown in FIG. 2F), and within, for example, the manual or tool operated and releasable clamp connection terminals of the external connector assembly 304 or 305 (not shown—see FIGS. 2F, 9 and 11).

Figure 3M:
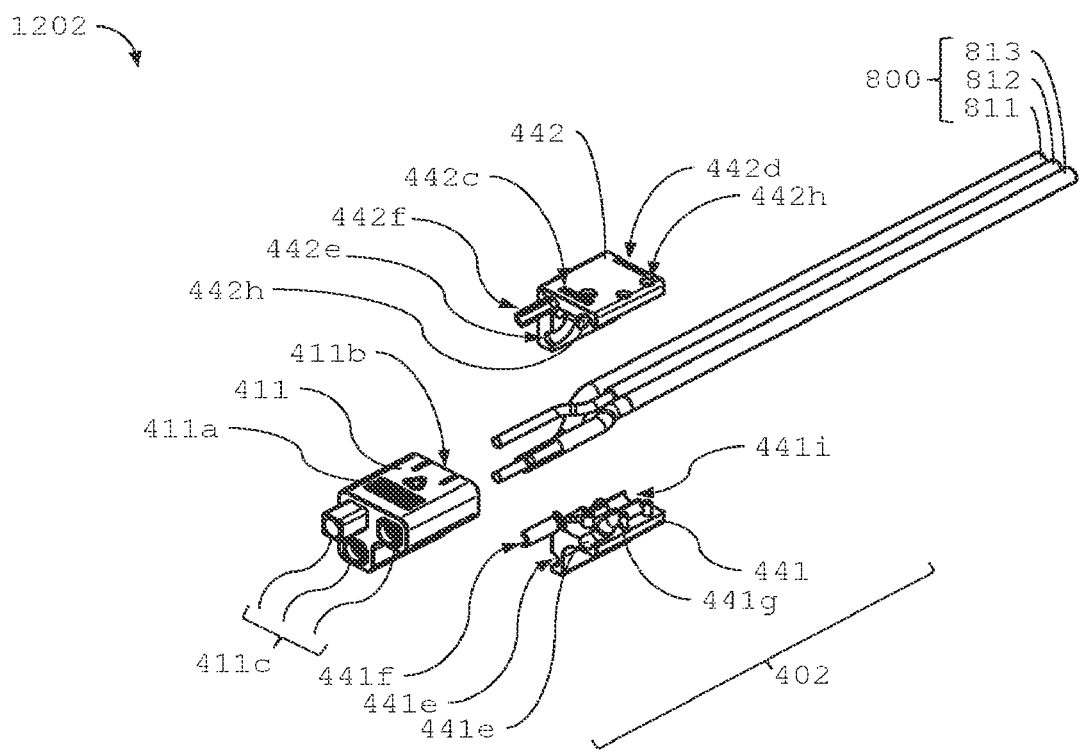
FIG. 3M illustrates an exploded front perspective view of a supply cable protector assembly fitted to the end of a building electrical supply cable, in accordance with the exemplary embodiment of FIG. 3J.
Figure 3R:
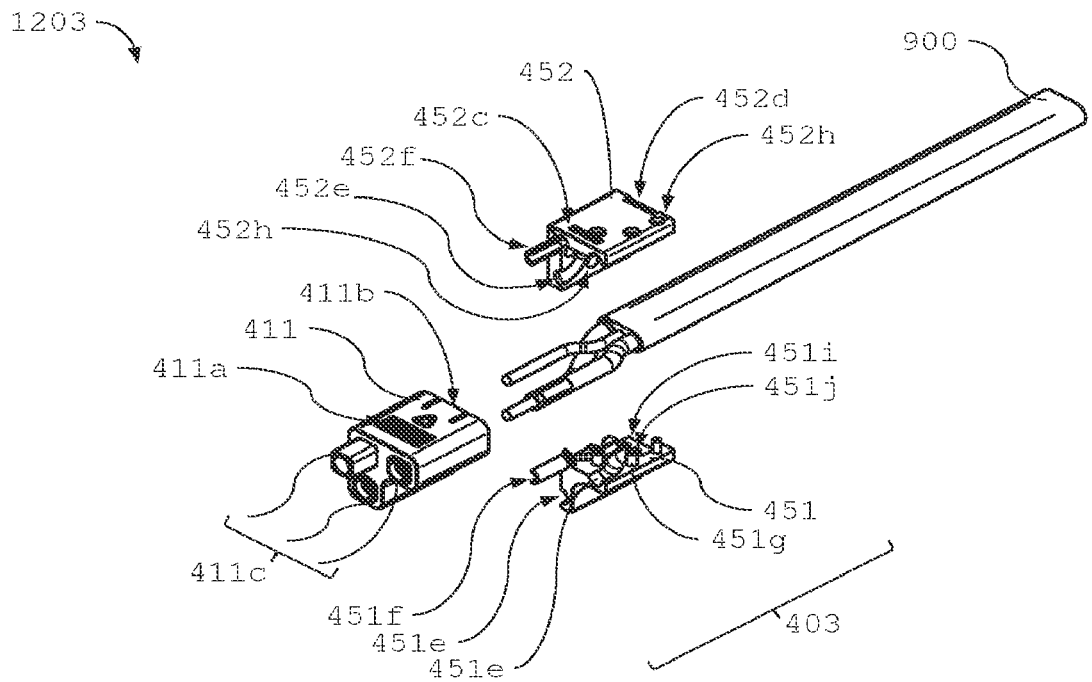
FIG. 3R illustrates an exploded front perspective view of a supply cable protector assembly fitted to the end of a building electrical supply cable, in accordance with the exemplary embodiment of FIG. 3N.

FIG. 3M is an exploded view of the same end portion of a building electrical supply cable assembly 1202 as shown in FIG. 3J, revealing the internal construction of the cable protector assembly 402 shown in these exemplary embodiments. The cable protector slidable cover 411 may be provided with the following molded features: a series of grip grooves 411a to allow an installer to manually grip the slidable cover 411 and slide the cover 411 along the axis of the cable protector body assembly 440; a latch feature 411b to provide a haptic and/or an audible signal and engage with one of two detent recesses 442c and 442d on the upper body 442; an insulator 442f, which when the upper body 442 and lower body 441 are assembled forms a substantially tubular insulator with the reciprocal insulator 441f and covers part of the stripped length of the electrical cable ground (or earth) wire 812. The upper body 442 and lower body 441 may be fabricated with up to three electrical cable wire channels 441e and 442e into which the electrical cable wires 811-813 may be fitted having been pre-formed and stripped to the appropriate lengths before assembly. The entrance to the electrical cable wire channels may be fabricated with electrical cable jacket or electrical cable wire insulation grip features (not shown but similar to those shown in FIG. 3I-H 431j and 432j for a cable protector lower body 431 and upper body 432 for type NM cable assembly). The upper body 442 and the lower body 441 may be assembled and interlock together using a series of six bosses 441g projecting from the lower body 441, which align intimately with a series of six externally counterbored apertures 442h. When the upper body 442 and lower body 441 are assembled around the electrical cable wires 811-813 the tops of the bosses 441g projecting into the external counterbores on the upper body 442 may be heat-staked to form securing rivet heads flush with the outside of the upper body 442. The slidable cover 411 may then be slidably fitted over the assembled body 440 to rest in either the extended or retracted detent position.

FIGS. 3N-R shows perspective, front and exploded views of a building electrical supply cable assembly 1203 according to a further exemplary embodiment using NM type cable in place of the MC type cable shown in building electrical supply cable assembly 1202 shown in FIGS. 3J-M. Other than the cable entry features 451i and 452i (not shown but similar to 451i) and electrical cable jacket or electrical cable wire insulation features 451j and 452j (not shown but similar to 451j) molded into the lower body 451 and upper body 452 the construction may be substantially the same as that discussed above for the building electrical supply cable assembly 1202 of FIGS. 3J-M. The electrical cable wire 911 may be the hot (or live) supply electrical wire and may have black insulation surrounding a conductor, the electrical cable wire 912 may be the ground (or protective earth) supply electrical wire and may have no insulation surrounding a conductor and the electrical cable wire 913 may be the neutral supply electrical wire and may have white insulation surrounding a conductor. The cable protector assembly 403 may use the same slidable cover 411 as building electrical supply cable assembly 1202 shown in FIGS. 3J-M, and the cable protector assembly 403 may be interchangeable with cable protector assembly 402 with respect to the external connectors configured to receive them.

The building electrical branch cable assemblies 1300-1303 (see FIGS. 22A-D) and the internal electrical branch cable assemblies 1304-1305 (see FIG. 23A-B) are similar in many respects to the building electrical supply cable assemblies 1200-1203 except that unlike the building electrical supply cable assemblies 1200-1203, the other ends of the building electrical branch cable assemblies and internal electrical branch cable assemblies are fitted with a cable protector assembly 500-503. Another difference is that the branch cable protector assembly 500-503 may have different polarization and keyway features on their slidable covers to prevent them from mechanically and electrically coupling with the wrong second-end connection terminal ports of an external connector and the internal electrical branch cable assemblies 1304-1305 are shorter to facilitate use inside a wiring device electrical box 2000 (see FIG. 7). Many alternative lengths of the building electrical supply cable assemblies 1200-1203, the building electrical branch cable assemblies 1300-1303 and internal electrical branch cable assemblies 1304-1305 are possible without departing from the scope and spirit of the exemplary embodiments.

Figures 4A, 4B:
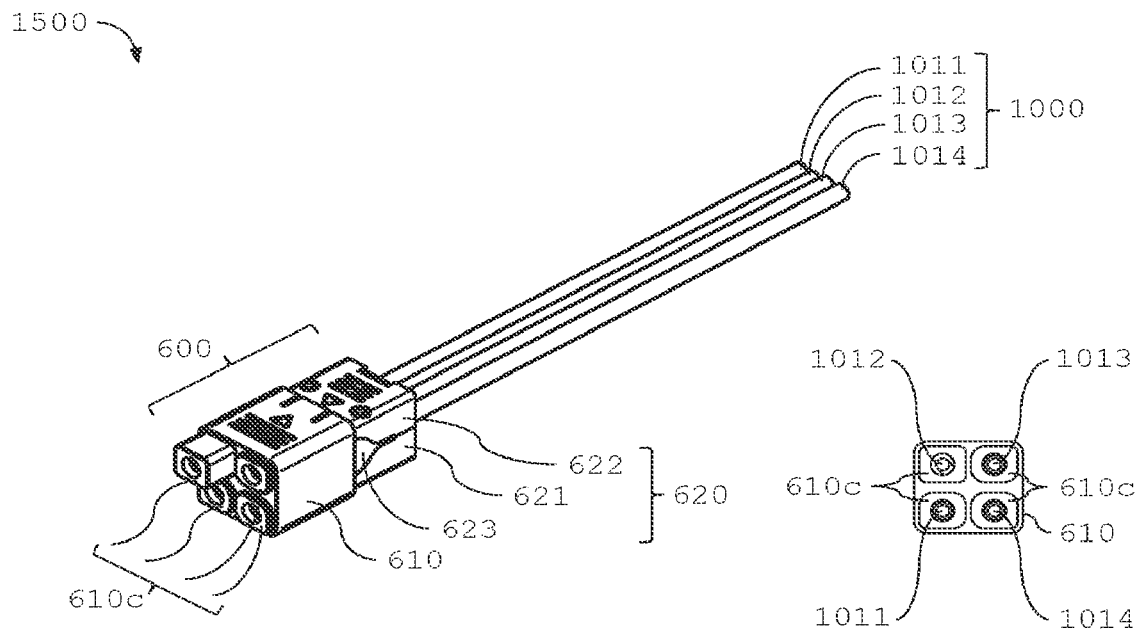
FIG. 4A illustrates a front perspective view of a load output cable protector assembly fitted to the end of a Metal Clad (MC) type building electrical jumper cable assembly, with a corresponding cable protector slidable cover in an extended position, in accordance with an exemplary embodiment.
FIG. 4B illustrates a front view of a building electrical jumper cable protector assembly in accordance with the exemplary embodiment of FIG. 4A.

FIG. 4A-B is a perspective and front view of the end portion of a building electrical jumper cable assembly 1500 (see FIG. 28A for a full view of the building electrical jumper cable assembly) with electrical cable wires 1011-1014 as would be the case for a Metal Clad (MC) cable fitted with a load output cable protector assembly 600 according to a further exemplary embodiment and may comprise a slidable cover 610, and a body assembly 620 comprising a lower body 621, an intermediate body 623 and an upper body 622. A electrical cable 1000 may include electrical cable wires 1011-1014. The electrical cable wire 1011 may be the switched hot (or switched live) or traveler #1 jumper electrical wire and may have black insulation surrounding a conductor, the electrical cable wire 1012 may be the ground (or protective earth) jumper electrical wire and may have green insulation surrounding a conductor, the electrical cable wire 1013 may be the neutral jumper electrical wire and may have white insulation surrounding a conductor, and the electrical cable wire 1014 may be the traveler jumper electrical wire and may have red insulation surrounding a conductor. The cable protector slidable cover 610 is shown in an extended position covering and protecting the stripped conductors of the electrical cable wires 1011-1014 from contact with other conductive parts of the electrical cable connecting system or from contact with installers.

FIG. 4B is a front view of the same end portion of a building electrical jumper cable assembly 1500 as shown in FIG. 4A showing the polarization and keyway features on the front of the slidable cover 610c and the relative positions of the electrical cable wires 1011-1014 therein. For example, slidable cover 610c is shown with its protruding upper left opening feature having different curvature on its upper corners than on its lower corners.

Figure 4C:
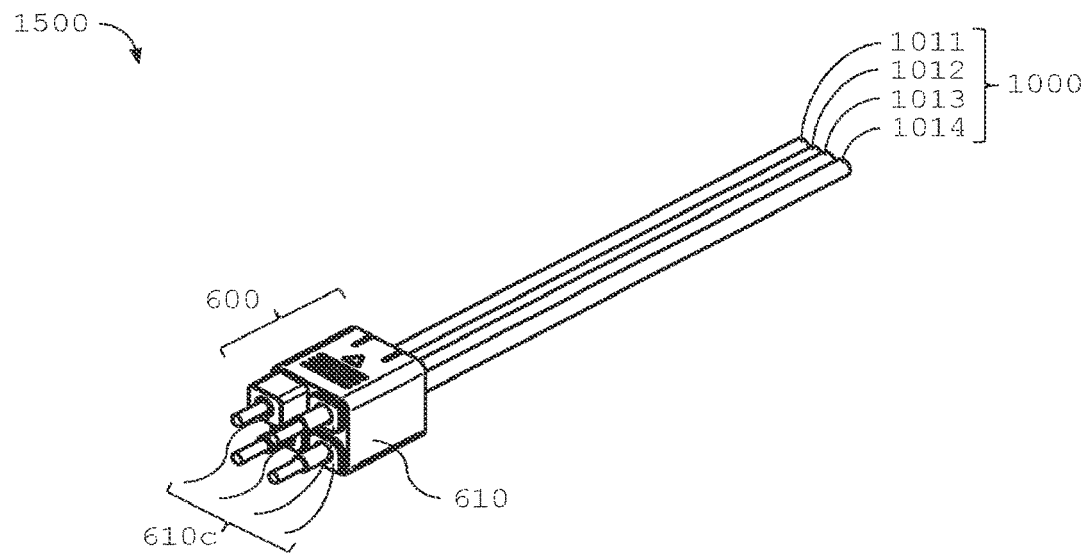
FIG. 4C illustrates a front perspective view of a load output cable protector assembly in accordance with the exemplary embodiment of FIG. 4A, with the cable protector slidable cover in a retracted position exposing the stripped conductors of the building electrical jumper cable electrical wires.

FIG. 4C is a perspective view of the same end portion of a building electrical jumper cable assembly 1500 as shown in FIG. 4A but with the cable protector slidable cover 610 retracted to expose the stripped conductors of the electrical cable wires 1011-1014, which may be inserted into the second-end connection terminal ports 356-359 (see FIGS. 2A, 2B, 2D and 2F) of an external connector assembly 300, 301, 303 or 304 of a modular electrical or electronic wiring device. The polarization and keyway features on the front of the slidable cover 610c prevent the electrical cable 1000 from coupling with the wrong second-end connection terminal ports of an external connector.

Figure 4D:
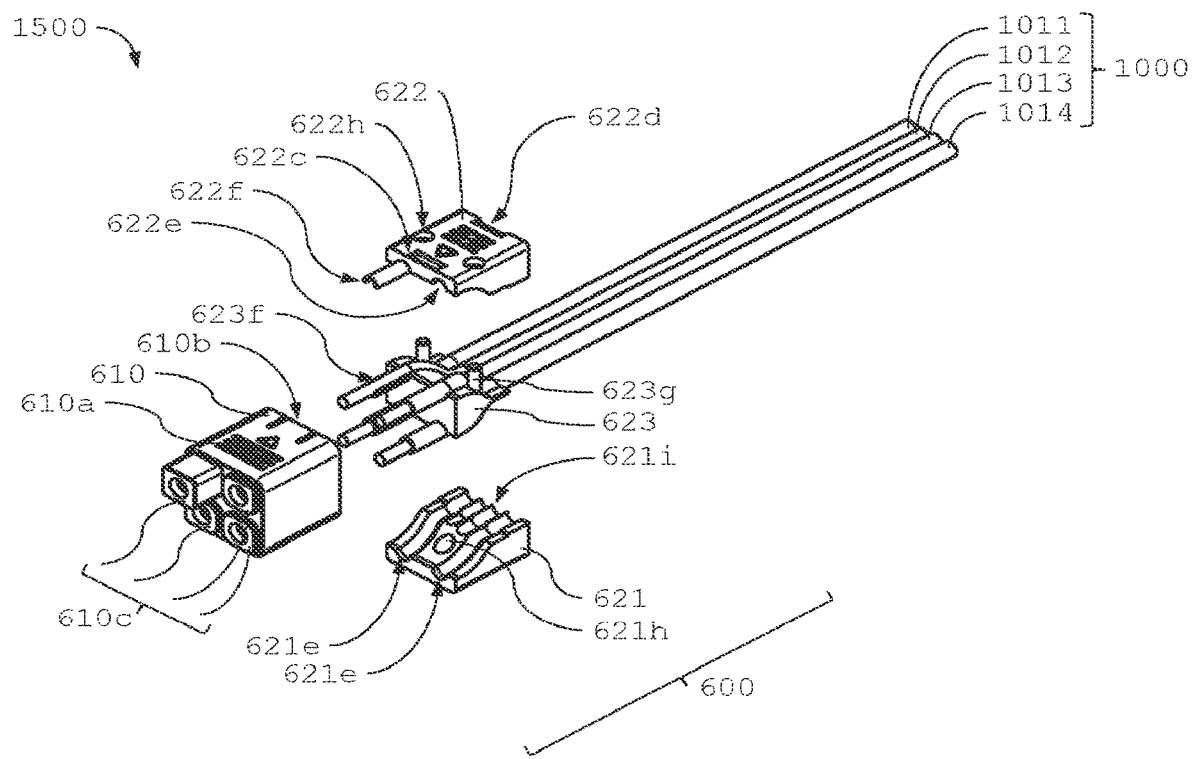
FIG. 4D illustrates an exploded front perspective view of a load output cable protector assembly fitted to the end of a building electrical jumper cable, in accordance with the exemplary embodiment of FIG. 4A.

FIG. 4D is an exploded view of the same end portion of a building electrical jumper cable assembly 1500 as shown in FIG. 4A, revealing the internal construction of the cable protector assembly 600 shown in these exemplary embodiments. The cable protector slidable cover 610 may be provided with the following molded features: a series of grip grooves 610a to allow an installer to manually grip the slidable cover 610 and slide the cover 610 along the axis of the cable protector body assembly 620; a latch feature 610b to provide a haptic and/or audible signal and to engage with one of two detent recesses 622c and 622d on the upper body 622; an insulator 622f, which when the upper body 622 and intermediate body 623 are assembled forms a substantially tubular insulator with the reciprocal insulator 623f and covers part of the stripped length of the electrical cable wire 1012. The upper body 622, intermediate body 623 and the lower body 621 may be fabricated with up to four electrical cable wire channels 622e, 623e and 621e (not labelled on the intermediate body 623) into which the electrical cable wires 1011-1014 may be fitted having been pre-formed and stripped to the appropriate lengths before assembly. The entrances to the electrical cable wire channels may be fabricated with electrical cable jacket or electrical cable wire insulation grip features (not shown but similar to those shown in FIG. 3I, 432i for a type NM cable assembly). The upper body 622, intermediate body 623 and the lower body 621 may be assembled and interlock together using a series of three bosses 623g projecting from the intermediate body, and the bosses 623g align intimately with a series of three externally counterbored apertures 622h and 621h (counterbores not shown on lower body 621 but similar to those shown on 622h). When the upper body 622, intermediate body 623 and the lower body 621 are assembled around the electrical cable wires 1011-1014 the tops of the bosses 623g projecting into the external counterbores on the upper body 622 and the lower body 621 may be heat-staked to form securing rivet heads flush with the outside of the upper body 622 and the lower body 621. The slidable cover 610 may be then slidably fitted over the assembled body 620 to rest in either the extended or retracted detent position.

The building electrical jumper cable assembly 1500 may have both ends (see FIG. 28A) of the cable assembly fitted with a cable protector using a similar construction method to that discussed above, the other end having a load input cable protector assembly 700.

The building electrical load cable assembly 1400 (FIGS. 1A-C) may be similar in many respects to the building electrical jumper cable assembly 1500 except that unlike the building electrical jumper cable assembly 1500 only one end of the cable assembly is fitted with a cable protector and only a three-wire cable is used with the traveler #1 output electrical cable wire 1014 omitted. Many alternative lengths of the building electrical jumper cable assembly 1500 and the building electrical load cable assembly 1400 are possible without departing from the scope and spirit of the exemplary embodiments.

Figures 4E, 4F:
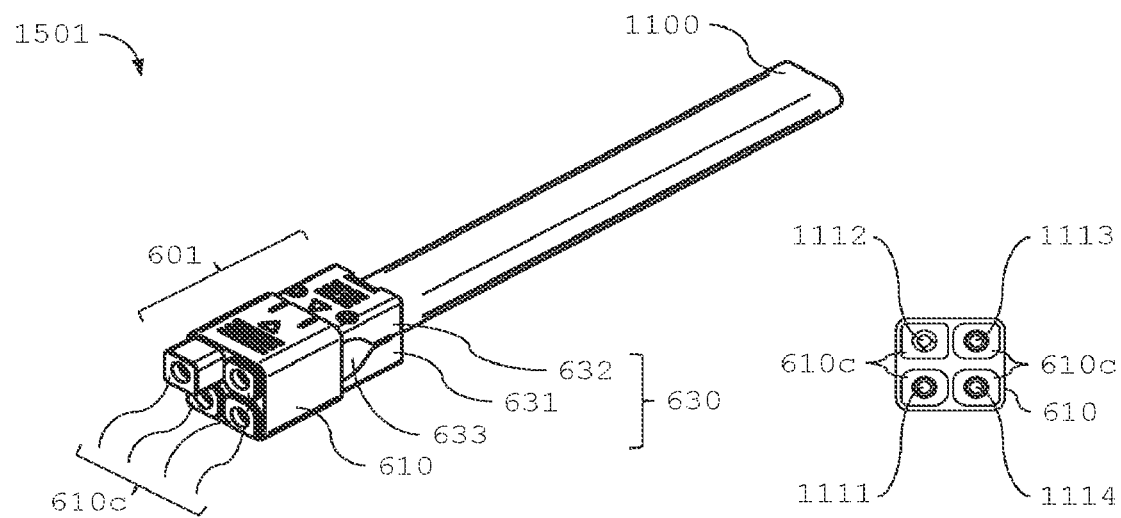
FIG. 4E illustrates a front perspective view of a load output cable protector assembly fitted to the end of an NM type building electrical jumper cable assembly with a corresponding cable protector slidable cover in an extended position in accordance with an exemplary embodiment.
FIG. 4F illustrates a front view of a load output cable protector assembly in accordance with the exemplary embodiment of FIG. 4E.
Figure 4G:
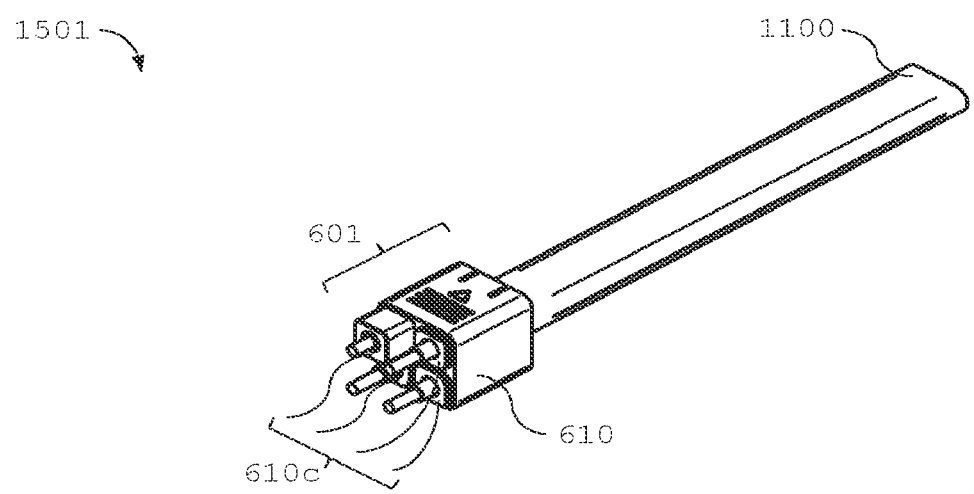
FIG. 4G illustrates a front perspective view of a load output cable protector assembly in accordance with the exemplary embodiment of FIG. 4E, with the cable protector slidable cover in a retracted position exposing the stripped conductors of the building electrical jumper cable wires.
Figure 4H:
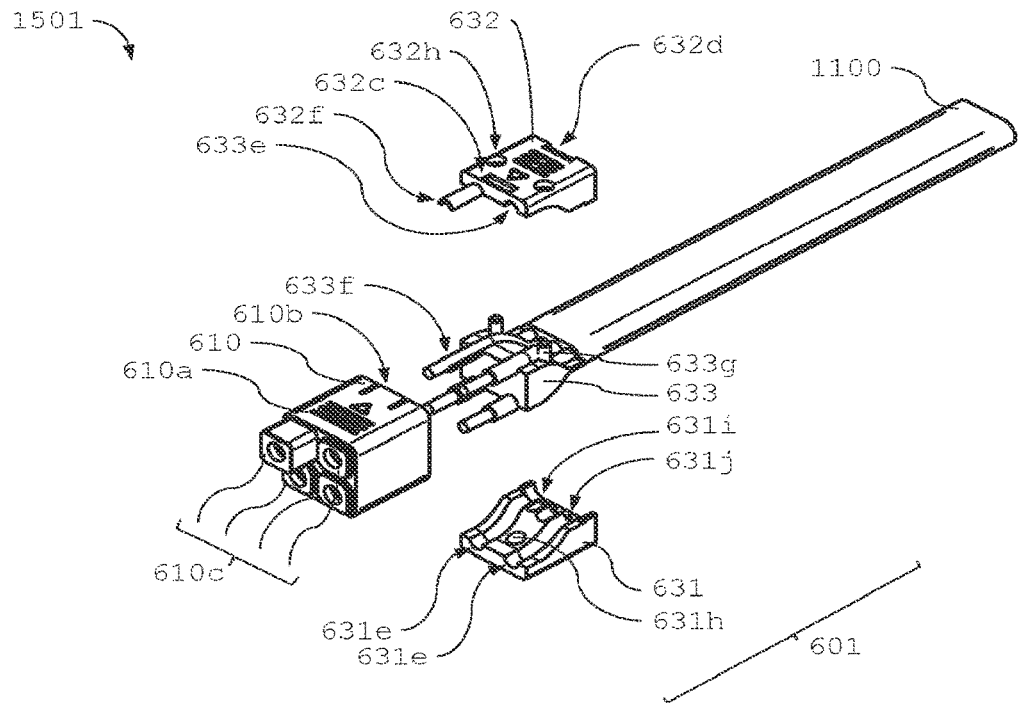
FIG. 4H illustrates an exploded front perspective view of a load output cable protector assembly fitted to the end of a building electrical jumper cable assembly, in accordance with the exemplary embodiment of FIG. 4E.

FIGS. 4E-F shows perspective and front views of a building electrical jumper cable assembly 1501 using NM type cable in place of the MC type cable shown in building electrical jumper cable assembly 1500 shown in FIGS. 4A-D. Other than the cable entry features 631i and 632i and the electrical cable jacket or electrical cable wire insulation features 631j and 632j (not shown but similar to 631j) molded into the lower body 631 and upper body 632 the construction may be substantially the same as that discussed above for the building electrical jumper cable assembly 1500 of FIGS. 4A-D. The electrical cable wire 1111 may be the switched hot (or switched live) or traveler #1 jumper electrical wire and may have black insulation surrounding a conductor, the electrical cable wire 1112 may be the ground (or protective earth) jumper electrical wire and may have no insulation surrounding a conductor, the electrical cable wire 1113 may be the neutral jumper electrical wire and may have white insulation surrounding a conductor, and the electrical cable wire 1114 may be the traveler jumper output electrical wire and may have red insulation surrounding a conductor. The cable protector assembly 601 uses the same slidable cover 610 as building electrical jumper cable assembly 1500 shown in FIGS. 4A-D, which makes the cable protector assembly 601 interchangeable with cable protector assembly 600 with respect to the external connectors configured to receive them. In other building electrical cable constructions or internal cable constructions, wherever a cable end is interchangeable with another, the same cable protector slidable cover may be utilized, for example cable protector slidable covers 410, 411, and 610.

Referring to FIGS. 3-4, the cable protector slidable cover and body components may be fabricated using materials such as polymers, polycarbonates or polyamide materials, or any other suitable material.

A different combination of polarization and key-way features may be molded into alternative cable protector slidable covers than those shown in the exemplary embodiments of FIGS. 3-4 and these may be used to achieve similar results or to make the electrical cable connecting system even more specific between cable protectors and external connectors; a different number of bosses and counterbored apertures may be used or a different method of fastening the cable protector body components together may be used such as adhesive or solvent bonding or ultrasonic welding, snap-fitting of bosses or clips or other methods such as over-molding of the cable protector body directly onto the cable or wires; a different number of tubular insulators may be provided as part of the cable protector body components (for example 420, 430, 440, 450, 620 and 630) to partially cover more than one stripped electrical cable wire to make cable preparation uniform and simplified; the cable protector body components (for example 420, 430, 440, 450, 620 and 630) may be provided with further features to aid field application of cable protectors such as electrical cable wire length cutting guides molded into them an example of which is shown in FIG. 3I (one exemplary guide 432k is shown on the ground electrical wire insulator), whereupon the protruding stripped or uninsulated electrical cable wire conductor may be cut at the tip of the guide and the guide snapped and removed to leave the electrical cable wire at the correct length; different types of latches and/or detents may be used which provide different types haptic and/or audible signals or visual signals such as markings that are only exposed when the latch is engaged correctly in a detent; different types of cables with different constructions and/or different insulation materials and/or electrical wire gauges and/or numbers of electrical wires and/or lengths may be used, such as collections of discrete wires held together with ties or loose coverings; although the cable protectors may be configured for factory-fitting to building electrical cables the cable protectors may also be field-fitted at the job-site using a different assembly technique in place of heat-staking such as snap-fitting of bosses or another suitable method without departing from the scope and spirit of the exemplary embodiments. Also, other safety features to enable the cable protector slidable covers (for example 410, 411 and 610) to extend automatically upon release of the manual levers 390 and the removal of a building electrical cable assembly (for examples see FIGS. 21-28, 1200-1203, 1300-1305, 1400-1401, 1500-1501 and 1600-1601) from the external connector (for examples see FIGS. 2A-G, 300-305) may be provided by using one or more springs between the cable protector slidable cover (for examples see FIGS. 3 and 4, 410, 411 and 610) and the body (for example for examples see FIGS. 3 and 4, 420, 430, 440, 450, 620 and 630) to provide an extending motion of the slidable cover without departing from the scope and spirit of the exemplary embodiments. Such a spring action between the cable protector slidable cover and its body within the cable protector assembly may be provided by using one or more coil, torsion or leaf spring components or by using one or more molded in spring features within the cable protector slidable cover and/or its body, both methods known to persons of ordinary skill in the art and without departing from the scope and spirit of the exemplary embodiments. Furthermore, such a spring action between the cable protector slidable cover and its body may be designed to overcome the extended detent feature and allow the cable protector slidable cover to return to rest in its fully extended position without departing from the scope and spirit of the exemplary embodiments.

Figure 5A:
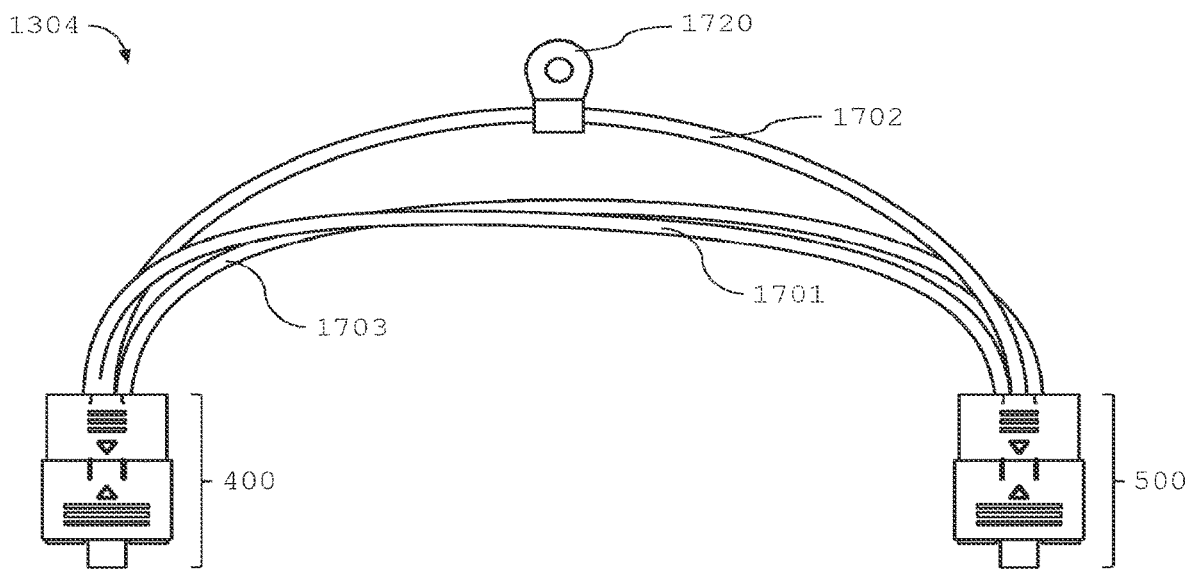
FIG. 5A illustrates a plan view of an internal electrical branch cable assembly with optional ground (or protective earth) flag style crimp terminal, in accordance with an exemplary embodiment.
Figure 5B:
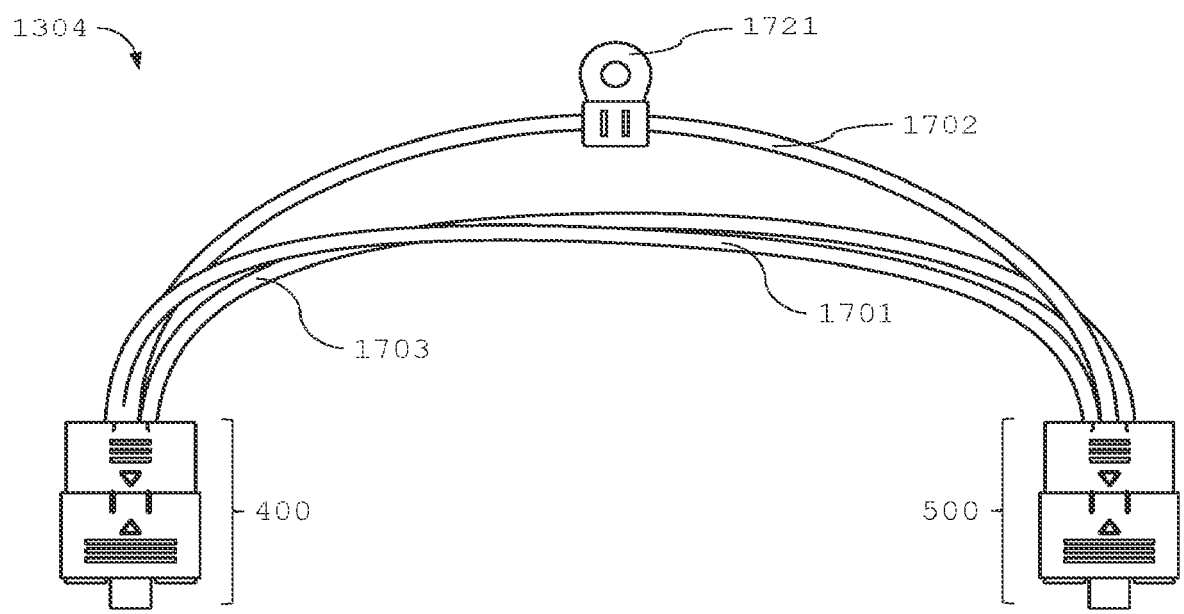
FIG. 5B illustrates a plan view of an internal electrical branch cable assembly with optional ground (or protective earth) insulation displacement style crimp terminal, in accordance with an exemplary embodiment.
Figure 5C:
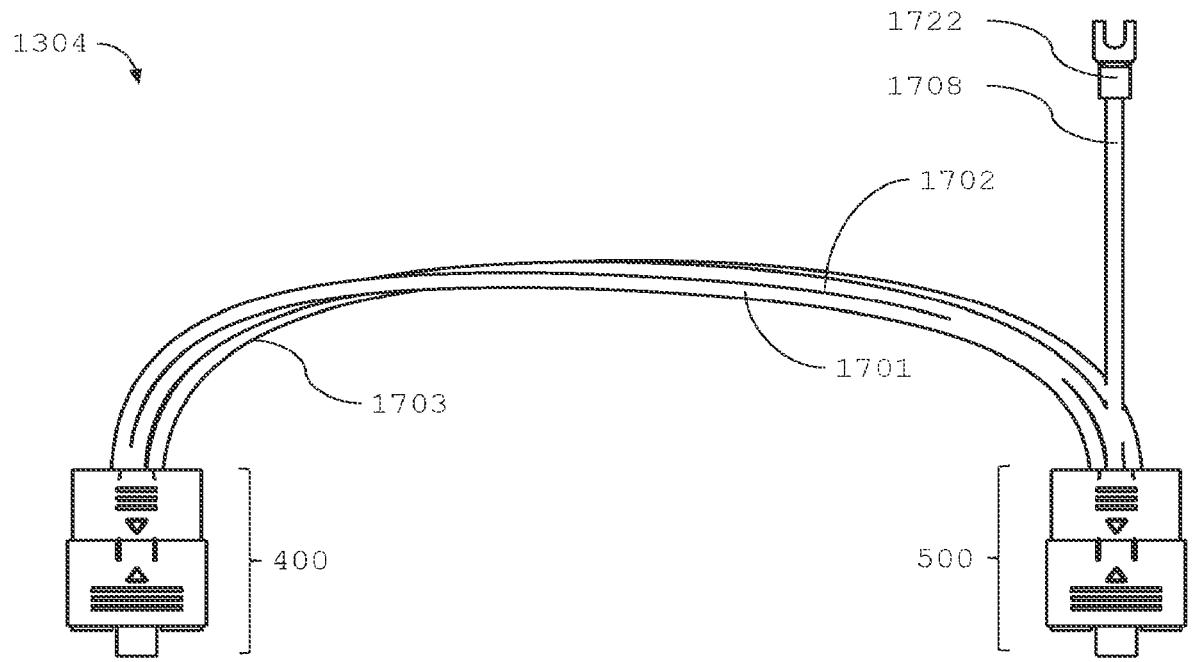
FIG. 5C illustrates a plan view of an internal electrical branch cable assembly with optional flying-lead ground (or protective earth) electrical wire fitted with an optional crimp terminal, in accordance with an exemplary embodiment.
Figure 5D:
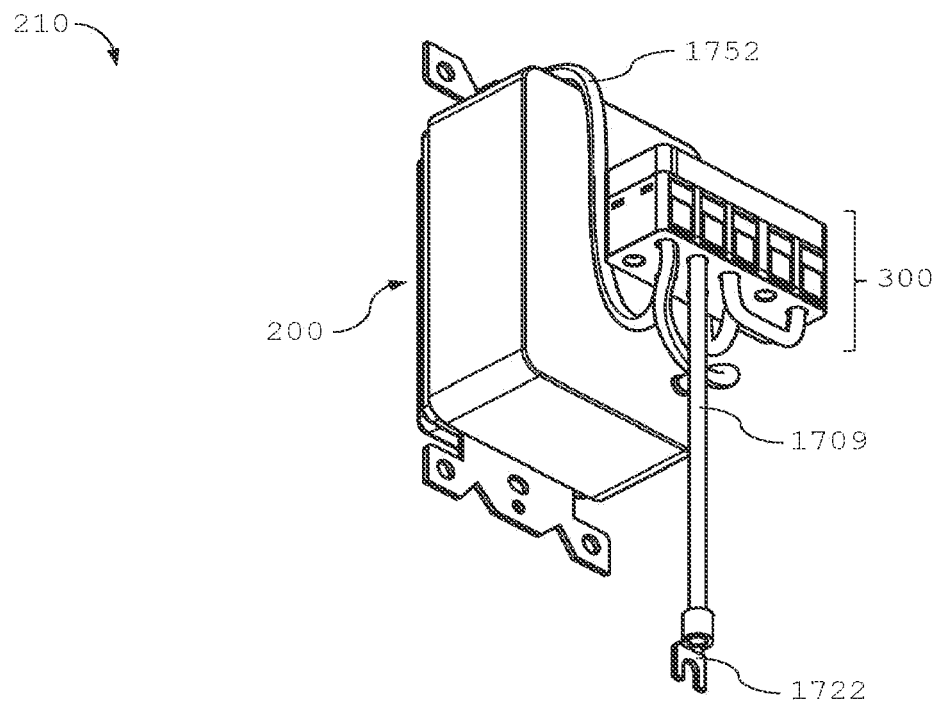
FIG. 5D illustrates a rear perspective view of an electrical or electronic wiring device connected to an external connector assembly fitted with an optional flying-lead ground (or protective earth) electrical wire through a first-end terminal and fitted with an optional crimp terminal, in accordance with an exemplary embodiment.
Figure 5E:
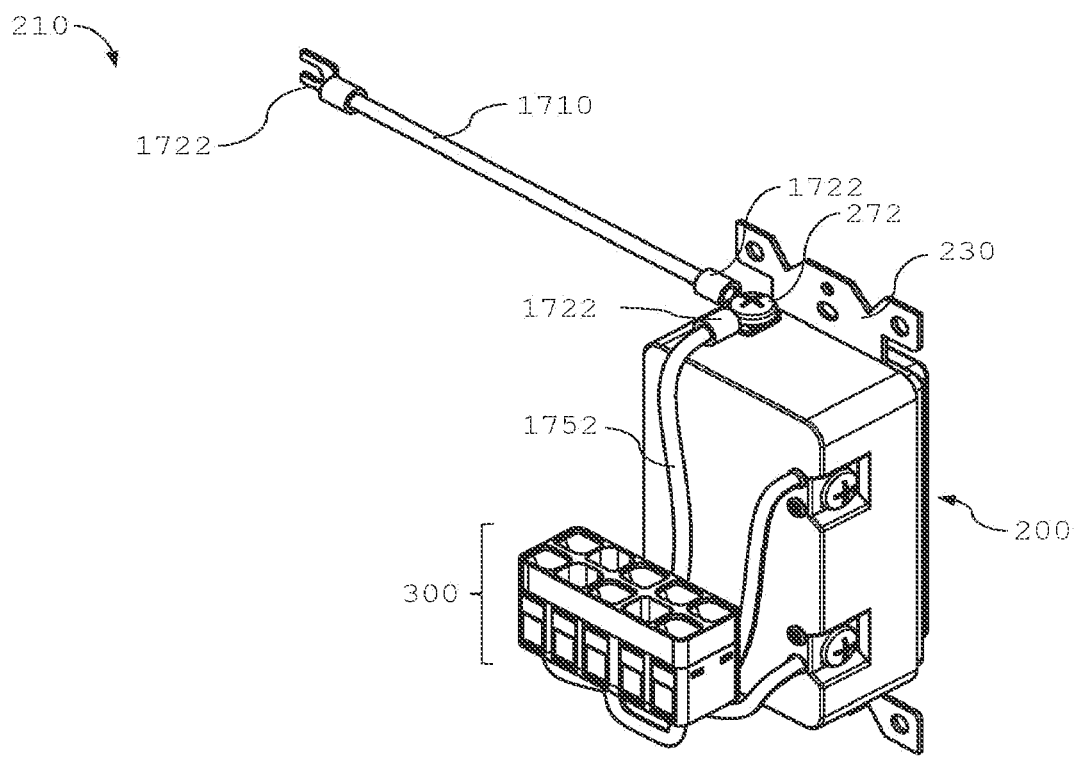
FIG. 5E illustrates a rear perspective view of an electrical or electronic wiring device connected to an external connector assembly where the electrical or electronic wiring device ground terminal is fitted with an optional wiring device ground (or protective earth) flying-lead electrical wire, fitted with an optional crimp terminal in accordance with an exemplary embodiment.

FIGS. 5A-E show various configurations of ground (or protective earth) wiring system for use when a metal wiring device electrical box or when Metal Clad (MC) building electrical cables are used. FIGS. 5A-C illustrate a modified internal electrical branch cable assembly 1304. The descriptions below are similarly applicable to the internal electrical branch cable assembly 1305 for use with wiring device electrical boxes having ½-inch knock-outs. FIGS. 5D-E illustrate a modified modular electrical or electronic wiring device assembly 210 having a dedicated ground (or protective earth) electrical wire. Any other modular electrical or electronic wiring device may be similarly applicable for example 210-222.

FIG. 5A is a front view of an internal electrical branch cable assembly 1304 complete with supply and branch cable protector assemblies 400 and 500, with an optional extended ground (or protective earth) electrical wire 1702 electrically coupled to an optional flag style crimp terminal 1720 intended to connect to a grounding point connector or a grounding screw of a metal wiring device electrical box. Alternatively, a short section of the ground (or protective earth) electrical wire insulation may be stripped and left bare to facilitate the coupling of the ground (or protective earth) electrical wire conductor to a grounding screw of a metal wiring device electrical box. The ground (or protective earth) electrical wire 1702 may be of a different length and the flag style crimp terminal 1720 may be replaced with any other style of crimp terminal suitable for the application without departing from the scope and spirit of the exemplary embodiments.

FIG. 5B is a front view of an internal electrical branch cable assembly 1304 complete with supply and branch cable protector assemblies 400 and 500, with an optional extended ground (or protective earth) electrical wire 1702 electrically coupled to an optional insulation displacement crimp terminal 1721 intended to connect to a grounding point connector or grounding screw of a metal wiring device electrical box. Alternatively, a short section of the ground (or protective earth) electrical wire insulation may be stripped and left bare to facilitate coupling of the ground (or protective earth) electrical wire conductor to a grounding screw of a metal wiring device electrical box. The ground (or protective earth) electrical wire 1702 may be of a different length and the insulation displacement crimp terminal 1721 may be replaced with any other style of crimp terminal suitable for the application without departing from the scope and spirit of the exemplary embodiments.

FIG. 5C is a front view of an internal electrical branch cable assembly 1304 with two supply and branch cable protector assemblies 400 and 500 with an optional flying-lead ground (or protective earth) electrical wire 1708 of about eight inches or less in length. The optional flying-lead ground (or protective earth) electrical wire 1708 may have green colored insulation surrounding a conductor. The first-end of the optional flying-lead ground (or protective earth) electrical wire 1708 may be electrically coupled to the ground electrical wire of the internal electrical branch cable assembly 1304 and a second-end may be electrically coupled to an optional crimp terminal 1722 intended to connect to a grounding point connector or grounding screw of a metal wiring device electrical box. People having ordinary skill in the art will recognize that the optional flying-lead ground (or protective earth) electrical wire 1708 may be of a different length and the crimp terminal 1722 may be replaced with any other style of crimp terminal (or left stripped and bare) suitable for the application without departing from the scope and spirit of the exemplary embodiments.

FIG. 5D is a rear perspective view of a modular electrical or electronic wiring device assembly 210, which comprises an electrical or electronic wiring device 200 and an external connector assembly 300 and an optional external connector ground (or protective earth) flying-lead electrical wire 1709 of about eight inches or less in length. The optional external connector ground (or protective earth) flying-lead electrical wire 1709 may have green colored insulation surrounding a conductor. The first-end of the optional external connector ground (or protective earth) flying-lead electrical wire 1709 may be electrically coupled to an optional crimp terminal 1722 intended to connect to a grounding point connector or grounding screw of a metal wiring device electrical box. The second-end of the optional external connector ground (or protective earth) flying lead electrical wire 1709 may be electrically coupled to the external connector assembly 300 ground (or protective earth) supply first-end connection terminal 331. The ground (or protective earth) from a building electrical supply cable assembly (not shown—see FIG. 21A-B) may be coupled with the modular electrical or electronic wiring device assembly 210 via an external connector assembly 300 to connect to the metal wiring device electrical box. The external connector ground (or protective earth) flying-lead electrical wire 1709 may be of a different length and the crimp terminal 1722 may be replaced with any other style of crimp terminal (or left stripped and bare) suitable for the application without departing from the scope and spirit of the exemplary embodiments.

FIG. 5E is a perspective view of a modular electrical or electronic wiring device assembly 210, which comprises an electrical or electronic wiring device 200 and an external connector assembly 300 and a wiring device ground (or protective earth) flying-lead electrical wire 1710 of about eight inches or less in length. The wiring device ground (or protective earth) flying-lead electrical wire 1710 may have green colored insulation surrounding a conductor. The wiring device ground (or protective earth) flying-lead electrical wire 1710 first-end may pass through one of the openings 220a (not shown—see FIG. 1A-G for examples) or alternatively from a crimp terminal 1722 electrically and mechanically attached to the yoke 230 grounding screw 272 or may be electrically coupled at a first-end to the wiring device ground (or protective earth) electrical terminal (not shown) and at a second-end to an optional crimp terminal 1722 intended to connect to a grounding point connector or grounding screw of a metal wiring device electrical box. The ground (or protective earth) from a building electrical supply cable assembly (not shown) may be coupled with the modular electrical or electronic wiring device assembly 210 via an external connector assembly 300 to connect to the metal wiring device electrical box (not shown). The wiring device ground (or protective earth) flying-lead electrical wire 1710 may be of a different length and the crimp terminal 1722 may be replaced with any other style of crimp terminal (or left stripped and bare) suitable for the application without departing from the scope and spirit of the exemplary embodiments.

Figure 6:
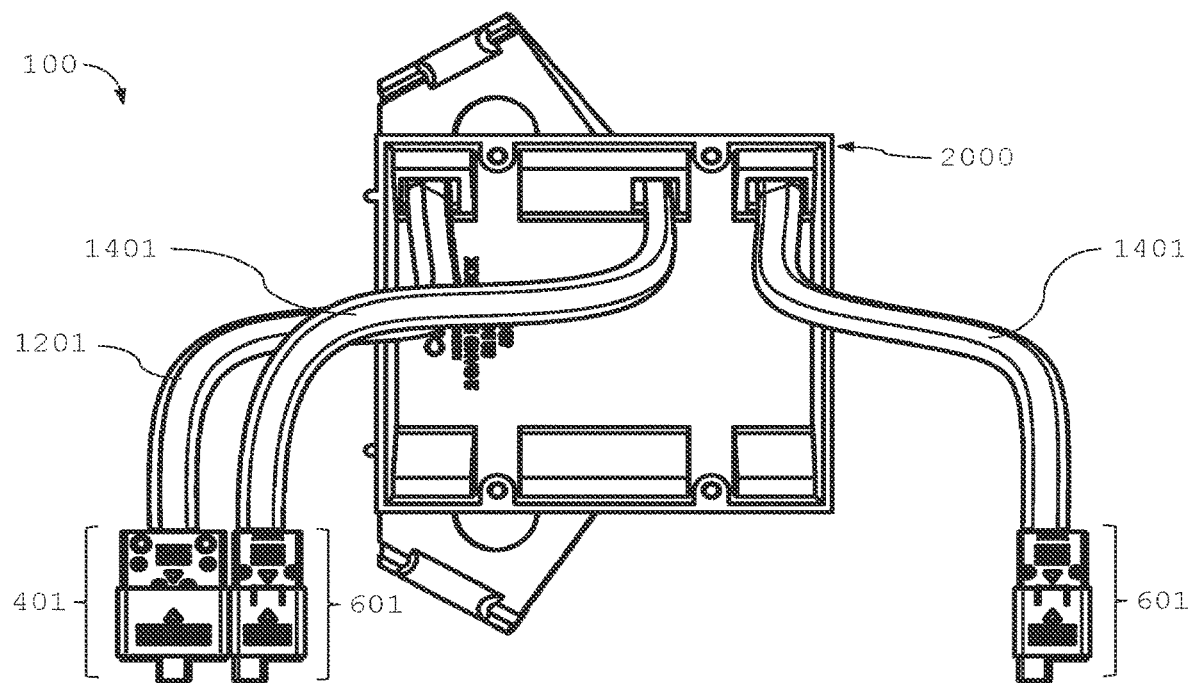
FIG. 6 illustrates a front view of an electrical cable connecting system with building electrical cables fitted with cable protector assemblies in accordance with exemplary embodiments, with respective cable protector slidable covers in extended positions.

FIG. 6 shows a front perspective view of a wiring device electrical box 2000 with NM type building electrical supply cable assembly 1201 and building electrical load cable assemblies 1401 fitted with cable protector assemblies 401 and 601, shown in the extended position, to protect the electrical cable wire conductors therein, prior to installation of additional modular electrical or electronic wiring device assemblies as would be the case during the rough-in phase of a two-phase installation process. At the point in the installation represented by FIG. 6, power may be safely applied to the building electrical cables and conductivity and ground or earth-fault tests may be carried out by coupling the building electrical cable assemblies 1201 or 1401 with a suitable test instrument via respective retractable cable protector assemblies 401 and 601. The installation may be feasibly and safely left in a powered state with the cable protector covers left in extended positions ready for the trim-out phase of the installation although often the installation will be powered-down between installation phases.

Figure 7:
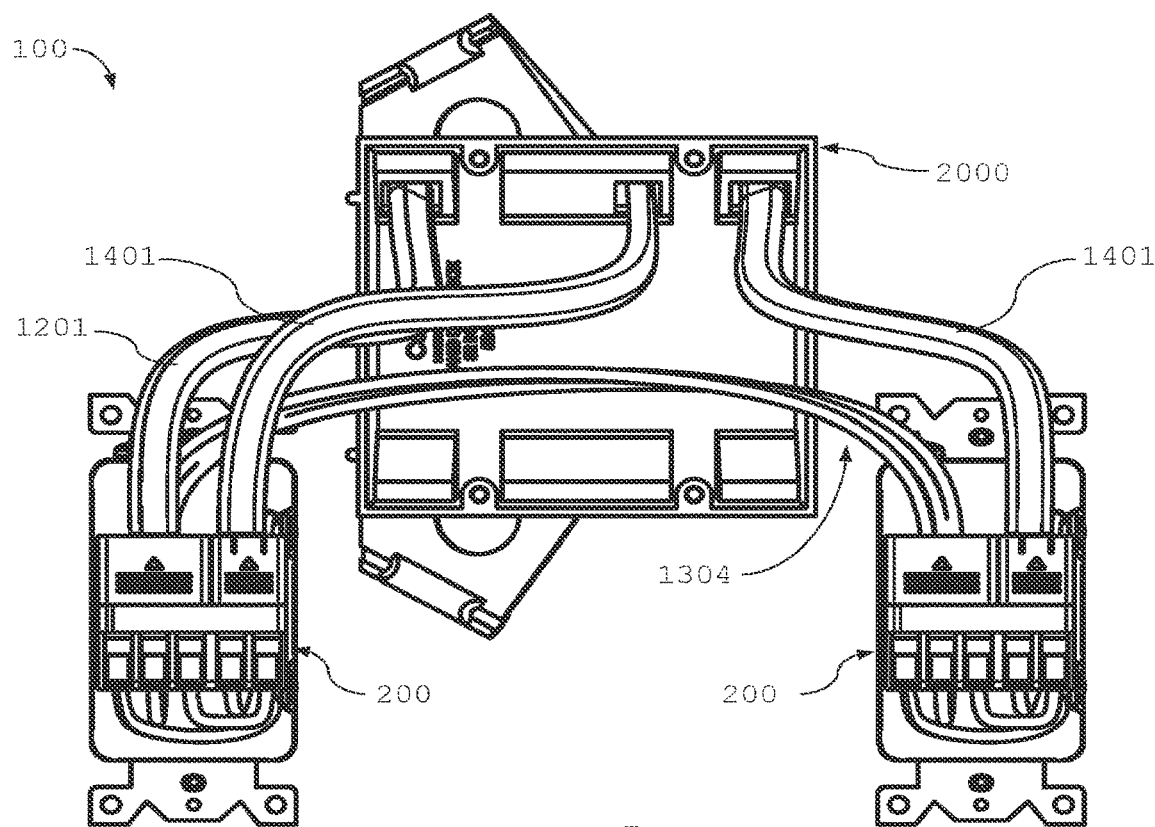
FIG. 7 illustrates a front view of an electrical cable connecting system with building electrical cables fitted with cable protector assemblies in accordance with exemplary embodiments, with respective cable protector slidable covers in retracted positions while connected to respective electrical or electronic wiring devices.

FIG. 7 shows a front perspective view of a wiring device electrical box 2000 with an NM type building electrical supply cable assembly 1201 and two building electrical load cable assemblies 1401, with cable protector slidable covers retracted and coupled to two modular electrical or electronic wiring device assemblies 200 via their external connector assemblies. The modular electrical or electronic wiring device assemblies 200 are also coupled by an internal electrical branch cable assembly 1304 to facilitate power distribution from the incoming electrical supply fed from the building electrical supply cable assembly 1201, via the first modular electrical or electronic wiring device assembly 200 and its external connector assembly, to the second modular electrical or electronic wiring device assembly 200 via its external connector assembly. The building electrical load cable assemblies 1401 provide electrical circuits from the two modular electrical or electronic wiring device assemblies 200 via their external connectors to downstream electrical loads (not shown). The internal electrical branch cable assembly 1304 may be shorter to facilitate its inside a wiring device electrical box 2000. FIG. 7 shows the final electrically complete state of the electrical cable connecting system during the trim-out phase of an installation immediately prior to fitting the wiring device face-plate to the wiring device electrical box 2000.

Figures 8A, 8B, 8C:
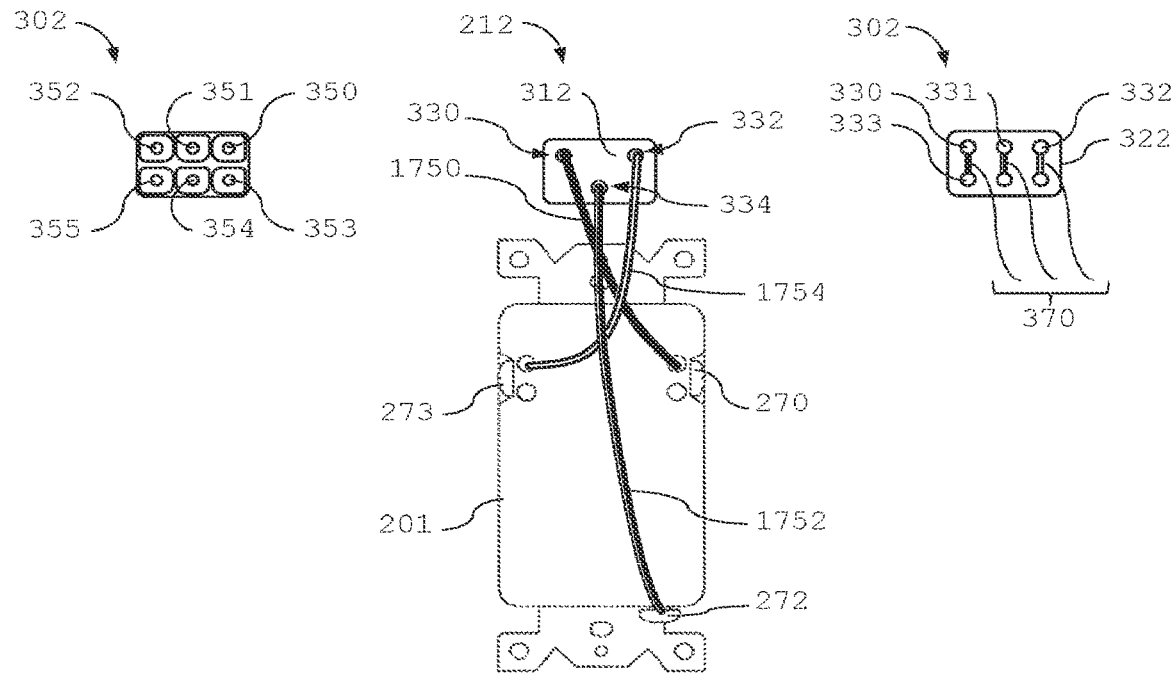
FIG. 8A illustrates a rear plan view of a non-feed thru type receptacle or GFCI modular electrical or electronic wiring device including an external connector assembly connected to the electrical terminals of the electrical or electronic wiring device by pig-tail jumper electrical wires in accordance with exemplary embodiments.
FIG. 8B illustrates a front view of the external connector assembly in accordance with the exemplary embodiment of FIG. 8A with the second-end terminal ports shown.
FIG. 8C illustrates a rear simplified diagrammatic view of the body of an external connector assembly in accordance with the exemplary embodiment of FIG. 8A with a cover removed exposing the internal electrical terminals and the electrical members.

FIG. 8A illustrates the modular electrical or electronic wiring device assembly 212 comprising external connector assembly 302 as illustrated in FIG. 1D, connected to a receptacle, wired spur connector, GFCI or AFCI electrical or electronic wiring device 201 according to an exemplary embodiment of the present invention. FIG. 8B illustrates the front portion of the external connector assembly 302 (for use with building electrical supply or branch cables fitted with cable protector assemblies 400-401 or 500-501 respectively) with second-end connection terminal ports 350-355. FIG. 8C illustrates a rear internal portion of the external connector assembly 302 with a rear cover portion 312 removed and with the internal connection terminals 330-335. As illustrated, each of the first-row supply connection terminals may be connected to adjacent second-row branch connection terminals respectively by three electrical link members 370, as would be the case for applications where an unprotected feed-thru branch circuit configuration may be used. Pig-tail jumper electrical wire 1750 may have black insulation around a conductor and may be connected between first-end connection terminal opening 330 (the hot (or live) supply connection terminal) and the hot (or live) supply electrical connection terminal 270 of the electrical or electronic wiring device 201. Pig-tail jumper electrical wire 1752 may have green insulation around a conductor and may be connected between first-end connection terminal opening 334 (for convenience) (the ground (or protective earth) branch connection terminal) and the ground (or protective earth) electrical connection terminal 272 of the electrical or electronic wiring device 201. Pig-tail jumper electrical wire 1754 may have white insulation around a conductor and may be connected between first-end connection terminal opening 332 (the neutral supply connection terminal) and the neutral electrical connection terminal 273 of the electrical or electronic wiring device 201.

Figures 9A, 9B, 9C:
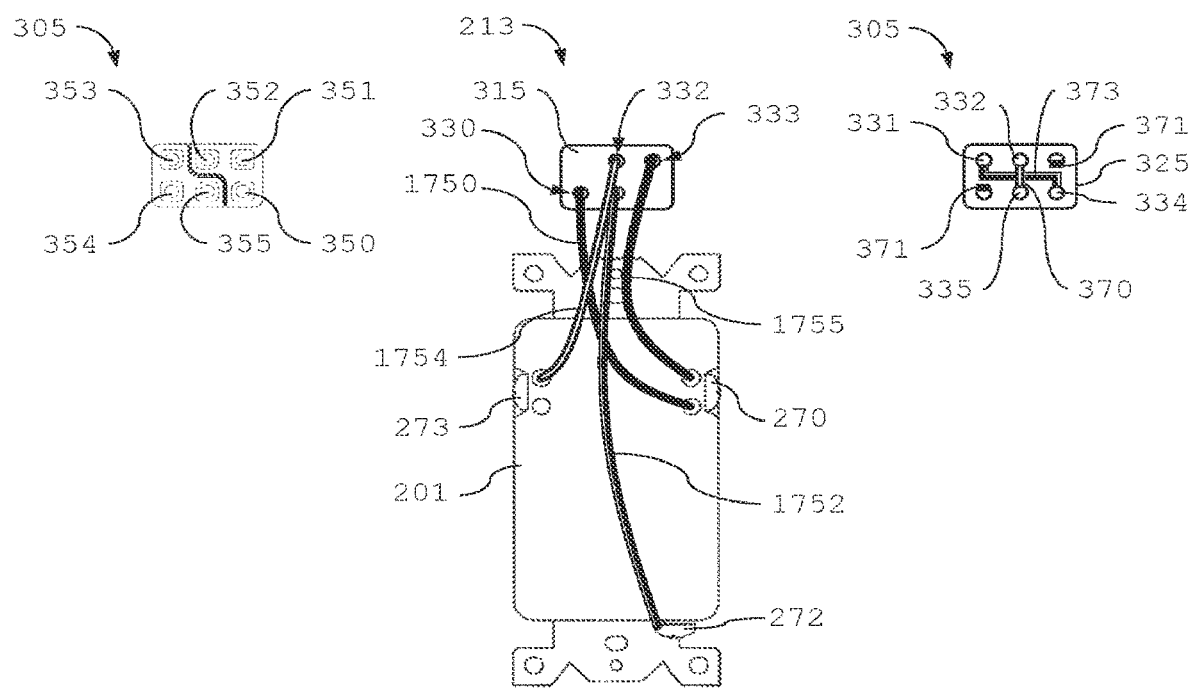
FIG. 9A illustrates a rear plan view of a non-feed thru type receptacle or GFCI modular electrical or electronic wiring device including an external connector assembly connected to the electrical terminals of the electrical or electronic wiring device by pig-tail jumper electrical wires in accordance with exemplary embodiments.
FIG. 9B illustrates a front view of an external connector assembly in accordance with the exemplary embodiment of FIG. 9A with the second-end terminal ports shown.
FIG. 9C illustrates a rear simplified diagrammatic view of the body of an external connector assembly in accordance with the exemplary embodiment of FIG. 9A with a cover removed exposing the internal electrical terminals and the electrical members.

FIG. 9A illustrates the modular electrical or electronic wiring device assembly 213 comprising external connector 305 (not illustrated elsewhere), connected to a receptacle, wired spur connection, GFCI or AFCI electrical or electronic wiring device 201 according to an exemplary embodiment of the present invention. FIG. 9B illustrates the front portion of the external connector assembly 305 (for use with building electrical supply or branch cables fitted with L-shaped cable protector assemblies 402-403 or 502-503 respectively) with second-end connection terminal ports 350-355. FIG. 9C illustrates a rear internal portion of the external connector assembly 305 with a rear cover portion 315 removed and with the internal connection terminals 330-335. As illustrated, the first-row connection terminal 332 (the neutral supply connection terminal) may be connected to adjacent second-row connection terminal 335 (the neutral branch connection terminal) by an electrical link member 370, the first-row connection terminal 331 (the ground (or protective earth) supply connection terminal) may be connected to second row connection terminal 334 (the ground (or protective earth) branch connection terminal) by an electrical cross-link member 373 and the remaining connection terminals 330 and 333 may be provided with internal electrical members 371 as would be the case for applications where an unprotected feed-thru branch circuit configuration may be used. Pig-tail jumper electrical wire 1750 may have black insulation around a conductor and may be connected between first-end connection terminal opening 330 (the hot (or live) supply connection terminal) and the line (or hot) electrical connection terminal 270 of the electrical or electronic wiring device 201. Pig-tail jumper electrical wire 1752 may have green insulation around a conductor and may be connected between first-end connection terminal opening 335 (for convenience) and the ground (or protective earth) electrical connection terminal 272 of the electrical or electronic wiring device 201. Pig-tail jumper electrical wire 1754 may have white insulation around a conductor and may be connected between first-end connection terminal opening 332 (the neutral supply connection terminal) and the neutral electrical connection terminal 273 of the electrical or electronic wiring device 201. Pig-tail jumper electrical wire 1755 may have black insulation around a conductor and may be connected between first-end connection terminal opening 333 (the hot (or live) branch connection terminal) and the live (or hot) electrical connection terminal 270 of the electrical or electronic wiring device 201.

Figures 10A, 10B, 10C:
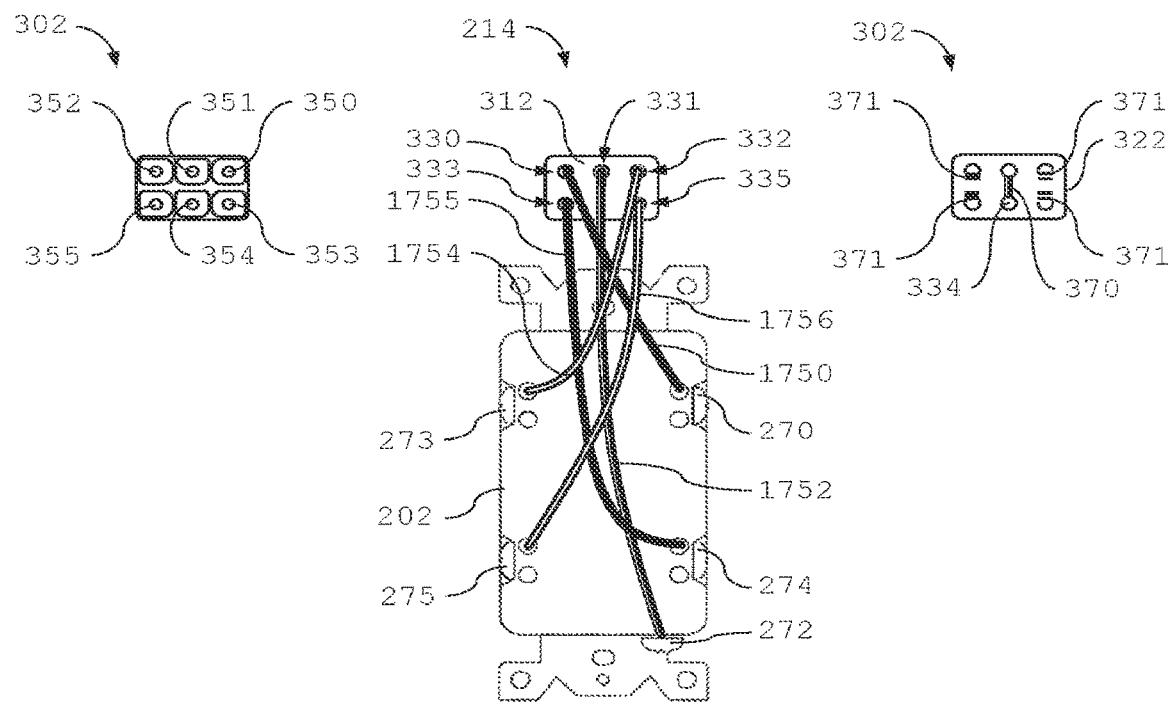
FIG. 10A illustrates a rear plan view of a feed thru type receptacle or GFCI modular electrical or electronic wiring device including an external connector assembly connected to the electrical terminals of the electrical or electronic wiring device by pig-tail jumper electrical wires in accordance with exemplary embodiments.
FIG. 10B illustrates a front view of an external connector assembly in accordance with the exemplary embodiment of FIG. 10A with the second-end terminal ports shown.
FIG. 10C illustrates a rear simplified diagrammatic view of the body of an external connector assembly in accordance with the exemplary embodiment of FIG. 10A with a cover removed exposing the internal electrical terminals and the electrical members.

FIG. 10A illustrates the modular electrical or electronic wiring device assembly 214 comprising the external connector assembly 302 as illustrated in FIG. 2C, connected to a GFCI or AFCI electrical or electronic wiring device 202 according to an exemplary embodiment of the present invention. FIG. 10B illustrates the front portion of the external connector assembly 302 (for use with building electrical supply or branch cables fitted with cable protector assemblies 400-401 or 500-501 respectively) with second-end connection terminal ports 350-355. FIG. 10C illustrates a rear internal portion of the external connector assembly 302 with a rear cover portion 312 removed and with the internal connection terminals 330-335. As illustrated, the first-row connection terminal 331 (the ground (or protective earth) supply connection terminal) may be connected to adjacent second-row connection terminal 334 (the ground (or protective earth) branch connection terminal) by an electrical link member 370, and the remaining connection terminals 330, 332, 333 and 335 may be provided with internal electrical members 371 as would be the case for applications where a protected feed-thru branch circuit configuration may be used. Pig-tail jumper electrical wire 1750 may have black insulation around a conductor and may be connected between first-end connection terminal opening 330 (the hot (or live) supply connection terminal) and the live (or hot) supply electrical connection terminal 270 of the electrical or electronic wiring device 202. Pig-tail jumper electrical wire 1752 may have green insulation around a conductor and may be connected between first-end connection terminal opening 331 (the ground (or protective earth) supply connection terminal and the ground (or protective earth) electrical connection terminal 272 of the electrical or electronic wiring device 202. Pig-tail jumper electrical wire 1754 may have white insulation around a conductor and may be connected between first-end connection terminal opening 332 (the neutral supply connection terminal) and the neutral supply electrical connection terminal 273 of the electrical or electronic wiring device 202. Pig-tail jumper electrical wire 1755 may have black insulation around a conductor and may be connected between first-end connection terminal opening 333 (the hot (or live) branch output connection terminal) and the hot (or live) branch electrical connection terminal 274 of the electrical or electronic wiring device 202. Pig-tail jumper electrical wire 1756 may have white insulation around a conductor and may be connected between first-end connection terminal opening 335 (the neutral branch connection terminal) and the neutral branch electrical connection terminal 275 of the electrical or electronic wiring device 202.

Figures 11A, 11B, 11C:
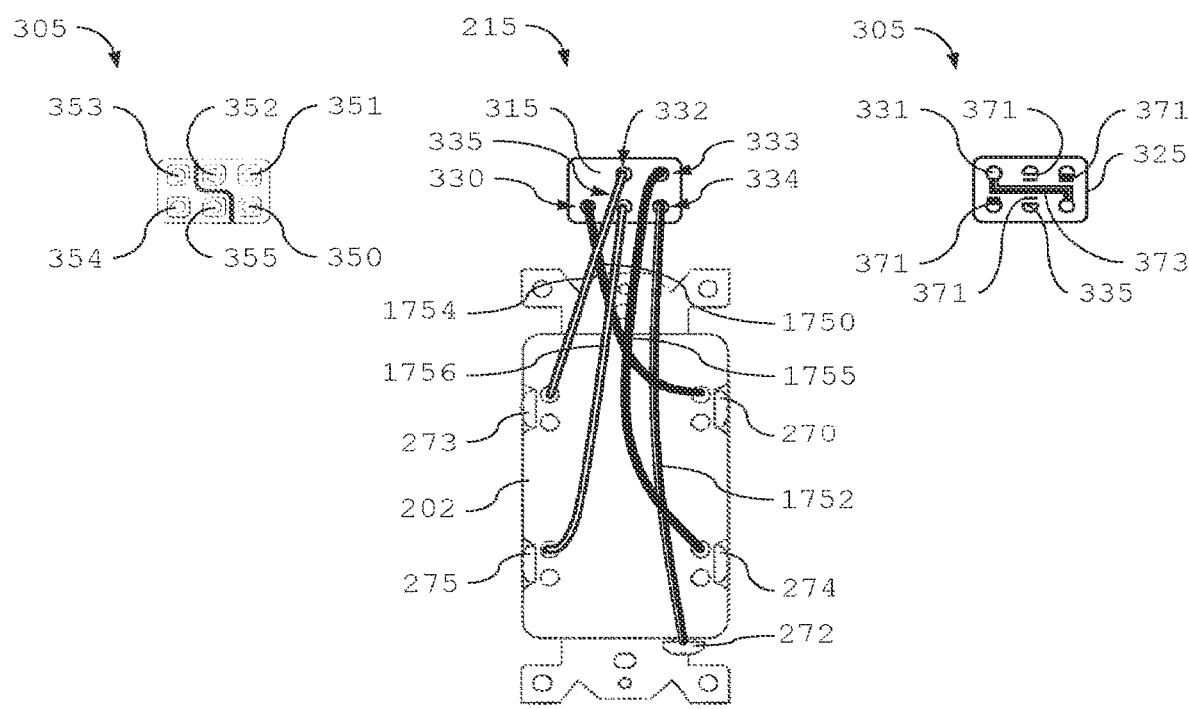
FIG. 11A illustrates a rear plan view of a feed thru type receptacle or GFCI modular electrical or electronic wiring device including an external connector assembly connected to the electrical terminals of the electrical or electronic wiring device by pig-tail jumper electrical wires in accordance with exemplary embodiments.
FIG. 11B illustrates a front view of an external connector assembly in accordance with the exemplary embodiment of FIG. 11A with the second-end terminal ports shown.
FIG. 11C illustrates a rear simplified diagrammatic view of the body of an external connector assembly in accordance with the exemplary embodiment of FIG. 11A with a cover removed exposing the internal electrical terminals and the electrical members.

FIG. 11A illustrates the modular electrical or electronic wiring device assembly 215 comprising the external connector assembly 305 connected to a GFCI or AFCI electrical or electronic wiring device 202 according to an exemplary embodiment of the present invention. FIG. 11B illustrates the front portion of the external connector assembly 305 (for use with building electrical supply or branch cables fitted with L-shaped cable protector assemblies 402-403 or 502-503 respectively) with second-end connection terminal ports 350-355. FIG. 11C illustrates a rear internal portion of the external connector assembly 305 with a rear cover portion 315 removed and with the internal connection terminals 330-335. As illustrated, the first-row connection terminal 331 (the ground (or protective earth) supply connection terminal) may be connected to second-row connection terminal 334 (the ground (or protective earth) branch connection terminal) by an electrical link member 373, and the remaining connection terminals 330, 332, 335 and 333 may be provided with internal electrical members 371 as would be the case for applications where a protected feed-thru branch circuit configuration may be used. Pig-tail jumper electrical wire 1750 may have black insulation around a conductor and may be connected between first-end connection terminal opening 330 (the hot (or live) supply connection terminal) and the hot (or live) supply electrical connection terminal 270 of the electrical or electronic wiring device 202. Pig-tail jumper electrical wire 1752 may have green insulation around a conductor and may be connected between first-end connection terminal opening 334 (the ground (or protective earth) branch connection terminal and the ground (or protective earth) electrical connection terminal 272 of the electrical or electronic wiring device 202. Pig-tail jumper electrical wire 1754 may have white insulation around a conductor and may be connected between first-end connection terminal opening 332 (the neutral supply connection terminal) and the neutral electrical connection terminal 273 of the electrical or electronic wiring device 202. Pig-tail jumper electrical wire 1755 may have black insulation around a conductor and may be connected between first-end connection terminal opening 333 (the hot (or live) branch connection terminal) and the hot (or live) branch electrical connection terminal 274 of the electrical or electronic wiring device 202. Pig-tail jumper electrical wire 1756 may have white insulation around a conductor and may be connected between first-end connection terminal opening 335 (the neutral branch connection terminal) and the neutral branch electrical connection terminal 275 of the electrical or electronic wiring device 202.

Figures 12A, 12B, 12C:
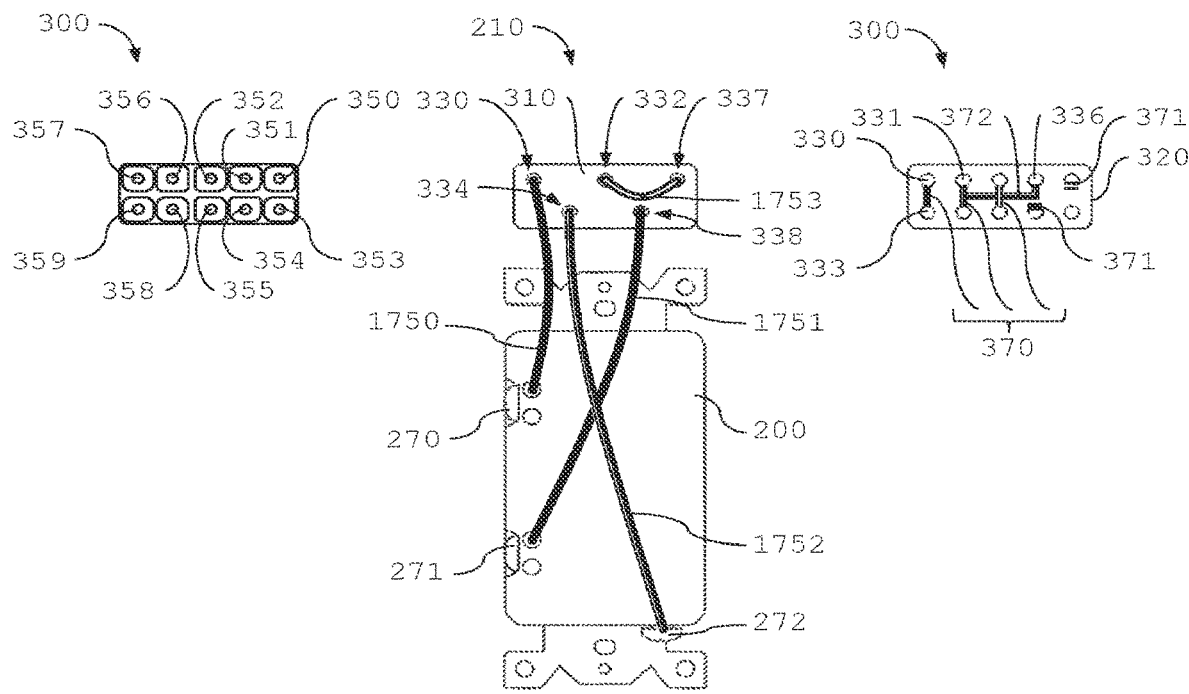
FIG. 12A illustrates a rear plan view of a 1-pole switch modular electrical or electronic wiring device including an external connector assembly connected to the electrical terminals of the electrical or electronic wiring device by pig-tail jumper electrical wires in accordance with exemplary embodiments.
FIG. 12B illustrates a front view of an external connector assembly in accordance with the exemplary embodiment of FIG. 12A with the second-end terminal ports shown.
FIG. 12C illustrates a rear simplified diagrammatic view of the body of an external connector assembly in accordance with the exemplary embodiment of FIG. 12A with a cover removed exposing the internal electrical terminals and the electrical members.

FIG. 12A illustrates the modular electrical or electronic wiring device assembly 210 comprising the external connector assembly 300 as illustrated in FIGS. 1A-C, connected to a 1-pole switch electrical or electronic wiring device 200 according to an exemplary embodiment of the present invention. FIG. 12B illustrates the front portion of the external connector assembly 300 (for use with building electrical supply or branch cables fitted with cable protector assemblies 400-401 or 500-501 respectively and building electrical load cables or building electrical jumper cables fitted with cable protector assemblies 600-601) and with second-end connection terminal ports 350-359. FIG. 12C illustrates a rear internal portion of the external connector assembly 300 with a rear cover portion 310 removed and with the internal connection terminals 330-339. As illustrated, each of the first-row supply connection terminals 330, 331 and 332 may be connected to the adjacent second-row branch connection terminals 333, 334 and 335 respectively by three electrical link members 370. As illustrated, the first-row connection terminal 331 (the ground (or protective earth) supply connection terminal), the second-row connection terminal 334 (the ground (or protective earth) branch connection terminal) and 336 (the ground (or protective earth) load output connection terminal) may be connected together by electrical cross-link member 372 and the remaining connection terminals 337 and 338 may be provided with electrical members 371 as would be the case for applications where a 1-pole switch (with local power feed) type electrical or electronic wiring device configuration may be used. Pig-tail jumper electrical wire 1750 may have black insulation around a conductor and may be connected between first-end connection terminal opening 330 (the hot (or live) supply connection terminal) and the hot (or live) electrical connection terminal 270 of the electrical or electronic wiring device 200. Pig-tail jumper electrical wire 1752 may have green insulation around a conductor and may be connected between first-end connection terminal opening 334 (the ground (or protective earth) branch connection terminal and the ground (or protective earth) electrical connection terminal 272 of the electrical or electronic wiring device 200. Pig-tail jumper electrical wire 1751 may have black insulation around a conductor and may be connected between first-end connection terminal opening 338 (the switched hot (or switched live) or traveler #1 load electrical connection terminal) and the switched hot (or switched live) electrical connection terminal 271 of the electrical or electronic wiring device 200. External connector neutral link electrical wire 1753 may have white insulation around a conductor and may be connected between first-end connection terminal opening 332 (the neutral supply electrical connection terminal) and the first-end connection terminal opening 337 (the neutral load output electrical connection terminal).

Figures 13A, 13B, 13C:
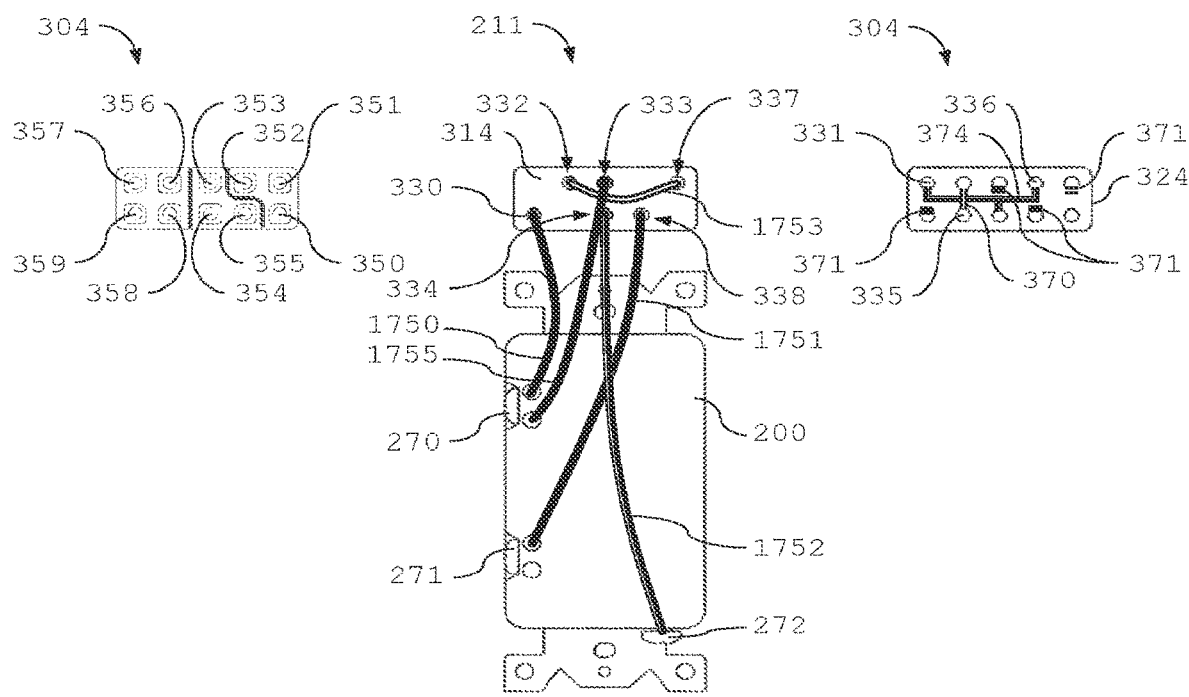
FIG. 13A illustrates a rear plan view of a 1-pole switch modular electrical or electronic wiring device including an external connector assembly connected to the electrical terminals of the electrical or electronic wiring device by pig-tail jumper electrical wires in accordance with exemplary embodiments.
FIG. 13B illustrates a front view of the external connector assembly in accordance with the exemplary embodiment of FIG. 13A with the second-end terminal ports shown.
FIG. 13C illustrates a rear simplified diagrammatic view of the body of an external connector assembly in accordance with the exemplary embodiment of FIG. 13A with a cover removed exposing the internal electrical terminals and the electrical members.

FIG. 13A illustrates the modular electrical or electronic wiring device assembly 211 comprising the external connector assembly 304 as illustrated in FIGS. 1E-G, connected to a 1-pole switch electrical or electronic wiring device 200 according to an exemplary embodiment of the present invention. FIG. 13B illustrates the front portion of the external connector assembly 304 (for use with building electrical supply or branch cables fitted with L-shaped cable protector assemblies 402-403 or 502-503 respectively and building electrical load cables or building electrical jumper cables fitted with cable protector assemblies 600-601) with second-end connection terminal ports 350-359. FIG. 13C illustrates a rear internal portion of the external connector assembly 304 with a rear cover portion 314 removed and with the internal connection terminals 330-339. As illustrated, the first-row connection terminal 332 (the neutral supply connection terminal) may be connected to adjacent second-row connection terminal 335 (the neutral branch connection terminal) by an electrical link member 370, the first-row connection terminal 331 (the ground (or protective earth) supply connection terminal) may be connected to the second row connection terminal 334 (the ground (or protective earth) branch connection terminal) and the first-row connection terminal 336 (the ground (or protective earth) load output connection terminal) by an electrical cross-link member 374 and the remaining connection terminals 330, 333, 337 and 338 may be provided with internal electrical members 371 as would be the case for applications where an 1-pole switch with local power feed type electrical or electronic wiring device configuration may be used. Pig-tail jumper electrical wire 1750 may have black insulation around a conductor and may be connected between first-end connection terminal opening 330 (the hot (or live) supply connection terminal) and the hot (or live) electrical connection terminal 270 of the electrical or electronic wiring device 200. Pig-tail jumper electrical wire 1755 may have black insulation around a conductor and may be connected between first-end connection terminal opening 333 (the hot (or live) branch electrical connection terminal) and the hot (or live) supply electrical connection terminal 270 of the electrical or electronic wiring device 200. Pig-tail jumper electrical wire 1752 may have green insulation around a conductor and may be connected between first-end connection terminal opening 334 (for convenience) (the ground (or protective earth) branch connection terminal and the ground (or protective earth) electrical connection terminal 272 of the electrical or electronic wiring device 200. Pig-tail jumper electrical wire 1751 may have black insulation around a conductor and may be connected between first-end connection terminal opening 338 (the switched hot (or switched live) or traveler #1 load output connection terminal) and the switched hot (or switched live) electrical connection terminal 271 of the electrical or electronic wiring device 200. External connector neutral link electrical wire 1753 may have white insulation around a conductor and may be connected between first-end connection terminal opening 332 (the neutral supply electrical connection terminal) and the first-end connection terminal opening 337 (the neutral load output electrical connection terminal).

Figures 14A, 14B, 14C:
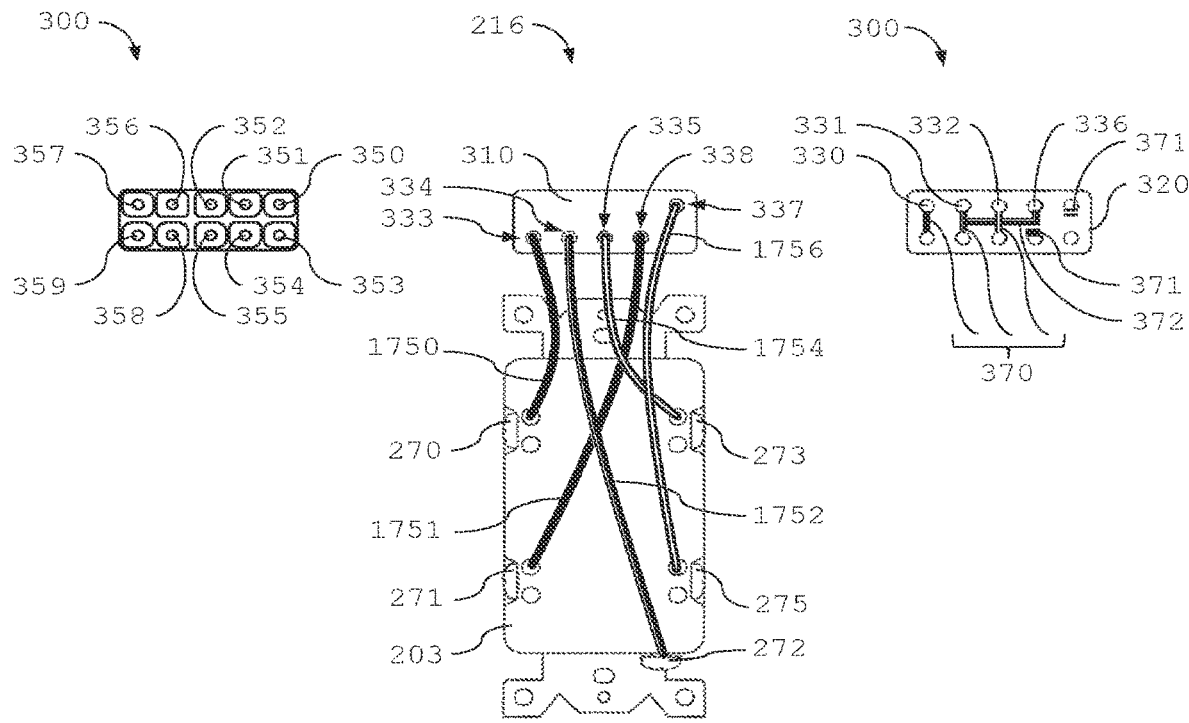
FIG. 14A illustrates a rear plan view of a 2-pole switch modular electrical or electronic wiring device including an external connector assembly connected to the electrical terminals of the electrical or electronic wiring device by pig-tail jumper electrical wires in accordance with exemplary embodiments.
FIG. 14B illustrates a front view of the external connector assembly in accordance with the exemplary embodiment of FIG. 14A with the second-end terminal ports shown.
FIG. 14C illustrates a rear simplified diagrammatic view of the body of an external connector assembly in accordance with the exemplary embodiment of FIG. 14A with a cover removed exposing the internal electrical terminals and the electrical members.

FIG. 14A illustrates the modular electrical or electronic wiring device assembly 216 comprising the external connector assembly 300 as illustrated in FIG. 2A, connected to a 2-pole switch electrical or electronic wiring device 203 according to an exemplary embodiment of the present invention. FIG. 14B illustrates the front portion of the external connector assembly 300 (for use with building electrical supply or branch cables fitted with cable protector assemblies 400-401 or 501-502 respectively and building electrical load cables, or building electrical jumper cables fitted with cable protector assemblies 600-601) with second-end connection terminal ports 350-359. FIG. 14C illustrates a rear internal portion of the external connector assembly 300 with a rear cover portion 310 removed and with the internal connection terminals 330-339. As illustrated, each of the first-row supply connection terminals 330, 331 and 332 may be connected to adjacent second-row of branch connection terminals 333, 334 and 335 respectively by three electrical link members 370, first-row connection terminal 331 (the ground (or protective earth) supply connection terminal) and second-row connection terminal 334 (the ground (or protective earth) branch connection terminal) may be connected to first-row connection terminal 336 (the ground (or protective earth) load output connection terminal) by an electrical cross-link member 372 and the remaining connection terminals 337 and 338 may be provided with internal electrical members 371 as would be the case for applications where a 2-pole switch (with local power feed) type electrical or electronic wiring device configuration may be used. Pig-tail jumper electrical wire 1750 may have black insulation around a conductor and may be connected between first-end connection terminal opening 333 (for convenience) (the hot (or live) branch connection terminal) and the hot (or live) supply electrical connection terminal 270 of the electrical or electronic wiring device 203. Pig-tail jumper electrical wire 1752 may have green insulation around a conductor and may be connected between first-end connection terminal opening 334 (for convenience) (the ground (or protective earth) branch connection terminal and the ground (or protective earth) electrical connection terminal 272 of the electrical or electronic wiring device 203. Pig-tail jumper electrical wire 1751 may have black insulation around a conductor and may be connected between first-end connection terminal opening 338 (the switched hot (or switched live) load output connection terminal) and the switched hot (or switched live) electrical connection terminal 271 of the electrical or electronic wiring device 203. Pig-tail jumper electrical wire 1754 may have white insulation around a conductor and may be connected between first-end connection terminal opening 335 (for convenience) (the neutral branch connection terminal) and the neutral supply electrical connection terminal 273 of the electrical or electronic wiring device 203. Pig-tail jumper electrical wire 1756 may have white insulation around a conductor and may be connected between first-end connection terminal opening 337 (the neutral load output connection terminal) and the switched neutral electrical connection terminal 275 of the electrical or electronic wiring device 203.

Figures 15A, 15B, 15C:
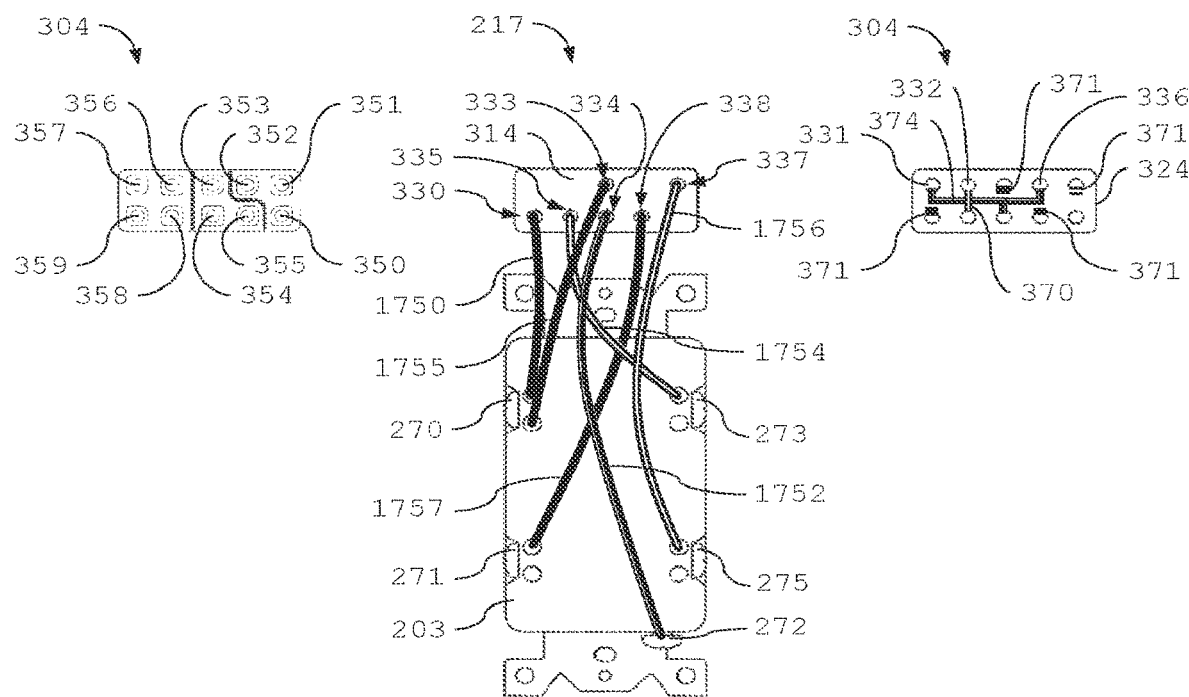
FIG. 15A illustrates a rear plan view of a 2-pole switch modular electrical or electronic wiring device including an external connector assembly connected to the electrical terminals of the electrical or electronic wiring device by pig-tail jumper electrical wires in accordance with exemplary embodiments.
FIG. 15B illustrates a front view of an external connector assembly in accordance with the exemplary embodiment of FIG. 15A with the second-end terminal ports shown.
FIG. 15C illustrates a rear simplified diagrammatic view of the body of an external connector assembly in accordance with the exemplary embodiment of FIG. 15A with a cover removed exposing the internal electrical terminals and the electrical members.

FIG. 15A illustrates the modular electrical or electronic wiring device assembly 217 comprising the external connector assembly 304 as illustrated in FIG. 2F, connected to a 2-pole switch electrical or electronic wiring device 203 according to an exemplary embodiment of the present invention. FIG. 15B illustrates the front portion of the external connector assembly 304 (for use with building electrical supply or branch cables fitted with L-shaped cable protector assemblies 402-403 or 502-503 respectively and building electrical load cables or building electrical jumper cables fitted with cable protector assemblies 600-601) with second-end connection terminal ports 350-359. FIG. 15C illustrates a rear internal portion of the external connector assembly 304 with a rear cover portion 314 removed and with the internal connection terminals 330-339 (331 numbered for orientation). As illustrated, the first-row connection terminals 332 (the neutral supply connection terminal) may be connected to adjacent second-row connection terminals 335 (the neutral branch connection terminal) by an electrical link member 370, first-row connection terminal 331 (the ground (or protective earth) supply connection terminal) and second-row connection terminal 334 (the ground (or protective earth) branch connection terminal) may be connected to first-row connection terminal 336 (the ground (or protective earth) load output connection terminal) by an electrical cross-link member 374 and the remaining connection terminals 330, 333, 337 and 338 may be provided with internal electrical members 371 as would be the case for applications where a 2-pole switch (with local power feed) type electrical or electronic wiring device configuration may be used. Pig-tail jumper electrical wire 1750 may have black insulation around a conductor and may be connected between first-end connection terminal opening 330 (the hot (or live) supply connection terminal) and the hot (or live) supply electrical connection terminal 270 of the electrical or electronic wiring device 203. Pig-tail jumper electrical wire 1752 may have green insulation around a conductor and may be connected between first-end connection terminal opening 334 (for convenience) (the ground (or protective earth) branch connection terminal and the ground (or protective earth) electrical connection terminal 272 of the electrical or electronic wiring device 203. Pig-tail jumper electrical wire 1754 may have white insulation around a conductor and may be connected between first-end connection terminal opening 335 (for convenience) (the neutral branch connection terminal) and the neutral supply electrical connection terminal 273 of the electrical or electronic wiring device 203. Pig-tail jumper electrical wire 1755 may have black insulation around a conductor and may be connected between first-end connection terminal opening 333 (the hot (or live) branch electrical connection terminal) and the hot (or live) supply electrical connection terminal 270 of the electrical or electronic wiring device 203. Pig-tail jumper electrical wire 1757 may have black insulation around a conductor and may be connected between first-end connection terminal opening 338 (the switched hot (or switched live) or traveler #1 load output connection terminal) and the switched hot (or switched live) electrical connection terminal 271 of the electrical or electronic wiring device 203. Pig-tail jumper electrical wire 1756 may have white insulation around a conductor and may be connected between first-end connection terminal opening 337 (the neutral load output connection terminal) and the switched neutral electrical connection terminal 275 of the electrical or electronic wiring device 203.

Figures 16A, 16B, 16C:
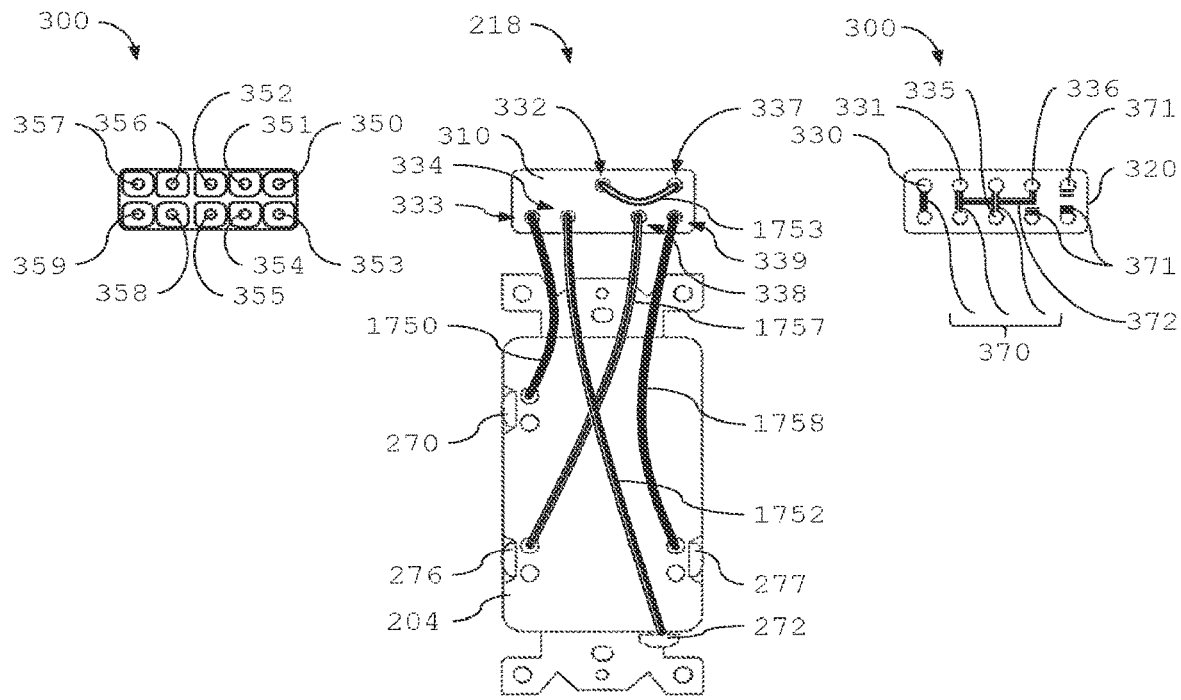
FIG. 16A illustrates a rear plan view of a 3-way switch modular electrical or electronic wiring device including an external connector assembly configured for local power feed, connected to the electrical terminals of the electrical or electronic wiring device by pig-tail jumper electrical wires in accordance with exemplary embodiments.
FIG. 16B illustrates a front view of an external connector assembly in accordance with the exemplary embodiment of FIG. 16A with the second-end terminal ports shown.
FIG. 16C illustrates a rear simplified diagrammatic view of the body of an external connector assembly in accordance with the exemplary embodiment of FIG. 16A with a cover removed exposing the internal electrical terminals and the electrical members.

FIG. 16A illustrates the modular electrical or electronic wiring device assembly 218 comprising the external connector assembly 300 as illustrated in FIG. 2A, connected to a 3-way switch electrical or electronic wiring device 204 according to an exemplary embodiment of the present invention. FIG. 16B illustrates the front portion of the external connector assembly 300 (for use with building electrical supply or branch cables fitted with cable protector assemblies 400-401 or 500-501 respectively and building electrical load cables or building electrical jumper cables fitted with cable protector assemblies 600-601) with second-end connection terminal ports 350-359. FIG. 16C illustrates a rear internal portion of the external connector assembly 300 with a rear cover portion 310 removed and with the internal connection terminals 330-339 (330 numbered for orientation). As illustrated, each of the first-row supply connection terminals 330, 331 and 332 may be connected to the adjacent second-row branch connection terminals 333, 334 and 335 respectively by three electrical link members 370, first-row connection terminal 331 (the ground (or protective earth) supply connection terminal) and second-row connection terminal 334 (the ground (or protective earth) branch connection terminal) may be connected to first-row connection terminal 336 (the ground (or protective earth) load output connection terminal) by an electrical cross-link member 372 and the remaining connection terminals 337-339 may be provided with internal electrical members 371 as would be the case for applications where a 3-way switch (with local power feed) type electrical or electronic wiring device configuration may be used. Pig-tail jumper electrical wire 1750 may have black insulation around a conductor and may be connected between first-end connection terminal opening 333 (for convenience) (the hot (or live) branch connection terminal) and the common electrical connection terminal 270 of the electrical or electronic wiring device 204. Pig-tail jumper electrical wire 1752 may have green insulation around a conductor and may be connected between first-end connection terminal opening 334 (for convenience) (the ground (or protective earth) branch connection terminal and the ground (or protective earth) electrical connection terminal 272 of the electrical or electronic wiring device 204. Pig-tail jumper electrical wire 1757 may have red insulation around a conductor and may be connected between first-end connection terminal opening 338 (the switched hot (or switched live) or traveler #1 load output electrical connection terminal) and the traveler #1 electrical connection terminal 276 of the electrical or electronic wiring device 204. Pig-tail jumper electrical wire 1758 may have black insulation around a conductor and may be connected between first-end connection terminal opening 339 (the traveler #2 load output electrical connection terminal) and the traveler #2 electrical connection terminal 277 of the electrical or electronic wiring device 204. External connector neutral link electrical wire 1753 may have white insulation around a conductor and may be connected between first-end connection terminal opening 332 (the neutral supply electrical connection terminal) and the first-end connection terminal opening 337 (the neutral load output electrical connection terminal).

Figures 17A, 17B, 17C:
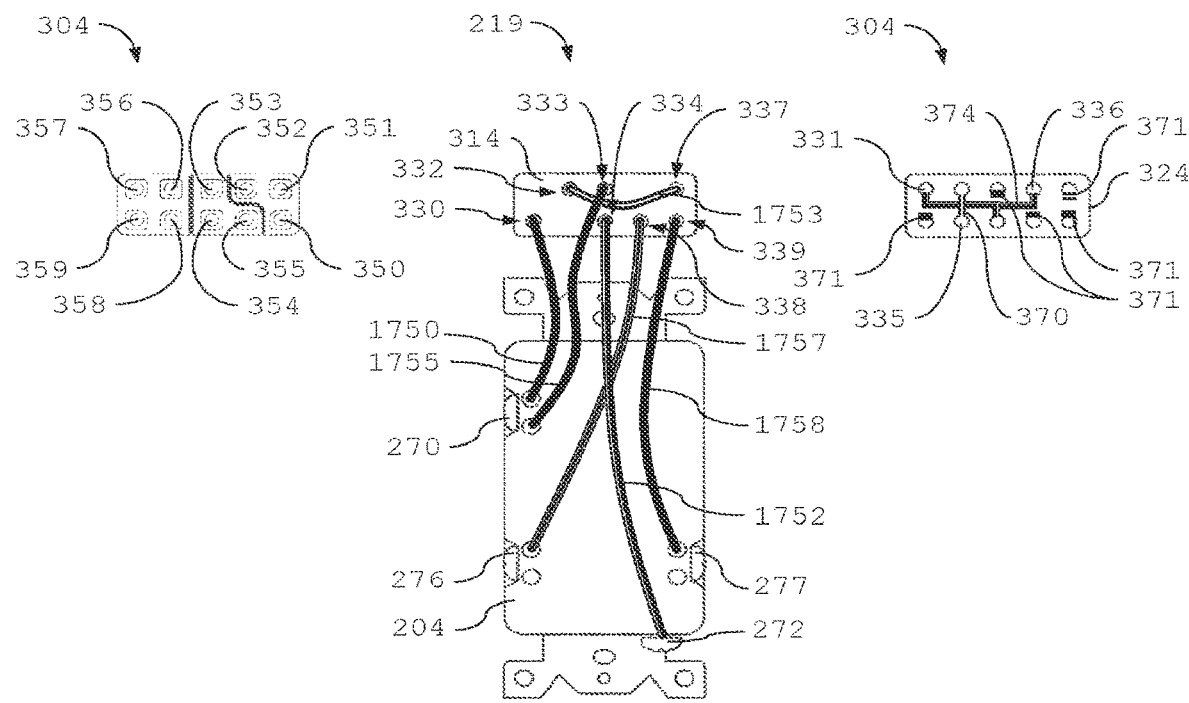
FIG. 17A illustrates a rear plan view of a 3-way switch modular electrical or electronic wiring device including an external connector assembly configured for local power feed, connected to the electrical terminals of the electrical or electronic wiring device by pig-tail jumper electrical wires in accordance with exemplary embodiments.
FIG. 17B illustrates a front view of an external connector assembly in accordance with the exemplary embodiment of FIG. 17A with the second-end terminal ports shown.
FIG. 17C illustrates a rear simplified diagrammatic view of the body of an external connector assembly in accordance with the exemplary embodiment of FIG. 17A with a cover removed exposing the internal electrical terminals and the electrical members.

FIG. 17A illustrates the modular electrical or electronic wiring device assembly 219 comprising the external connector assembly 304 as illustrated in FIG. 2H connected to a 3-way switch electrical or electronic wiring device 204 according to an exemplary embodiment of the present invention. FIG. 17B illustrates the front portion of the external connector assembly 304 (for use with building electrical supply or branch cables fitted with L-shaped cable protector assemblies 402-403 or 502-503 respectively and building electrical load cables or building electrical jumper cables fitted with cable protector assemblies 600-601) with second-end connection terminal ports 350-359. FIG. 17C illustrates a rear internal portion of the external connector assembly 304 with a rear cover portion 314 removed and with the internal connection terminals 330-339. As illustrated, the first-row connection terminals 332 (the neutral supply connection terminal) may be connected to the adjacent second-row connection terminal 335 (the neutral branch connection terminal) by an electrical link member 370, first-row connection terminal 331 (the ground (or protective earth) supply connection terminal) may be connected to second-row connection terminal 334 (the ground (or protective earth) branch connection terminal) and first-row connection terminal 336 (the ground (or protective earth) load output connection terminal) by an electrical cross-link member 374 and the remaining connection terminals 330, 333, 337, 338 and 339 may be provide with internal electrical members 371 as would be the case for applications where a 3-way switch (with local power feed) type electrical or electronic wiring device configuration may be used. Pig-tail jumper electrical wire 1750 may have black insulation around a conductor and may be connected between first-end connection terminal opening 330 (the hot (or live) supply connection terminal) and the hot (or live) electrical connection terminal 270 of the electrical or electronic wiring device 204. Pig-tail jumper electrical wire 1752 may have green insulation around a conductor and may be connected between first-end connection terminal opening 334 (for convenience) (the ground (or protective earth) branch connection terminal and the ground (or protective earth) electrical connection terminal 272 of the electrical or electronic wiring device 204. Pig-tail jumper electrical wire 1755 may have black insulation around a conductor and may be connected between first-end connection terminal opening 333 (the hot (or live) branch connection terminal) and the hot (or live) electrical connection terminal 270 of the electrical or electronic wiring device 204. Pig-tail jumper electrical wire 1757 may have red insulation around a conductor and may be connected between first-end connection terminal opening 338 (the switched hot (or switched live) or traveler #1 load output electrical connection terminal) and the traveler #1 electrical connection terminal 276 of the electrical or electronic wiring device 204. Pig-tail jumper electrical wire 1758 may have black insulation around a conductor and may be connected between first-end connection terminal opening 339 (the traveler #2 load output electrical connection terminal) and the traveler #2 electrical connection terminal 277 of the electrical or electronic wiring device 204. External connector neutral link electrical wire 1753 may have white insulation around a conductor and may be connected between first-end connection terminal opening 332 (the neutral supply electrical connection terminal) and the first-end connection terminal opening 337 (the neutral load output electrical connection terminal).

Figures 18A, 18B, 18C:
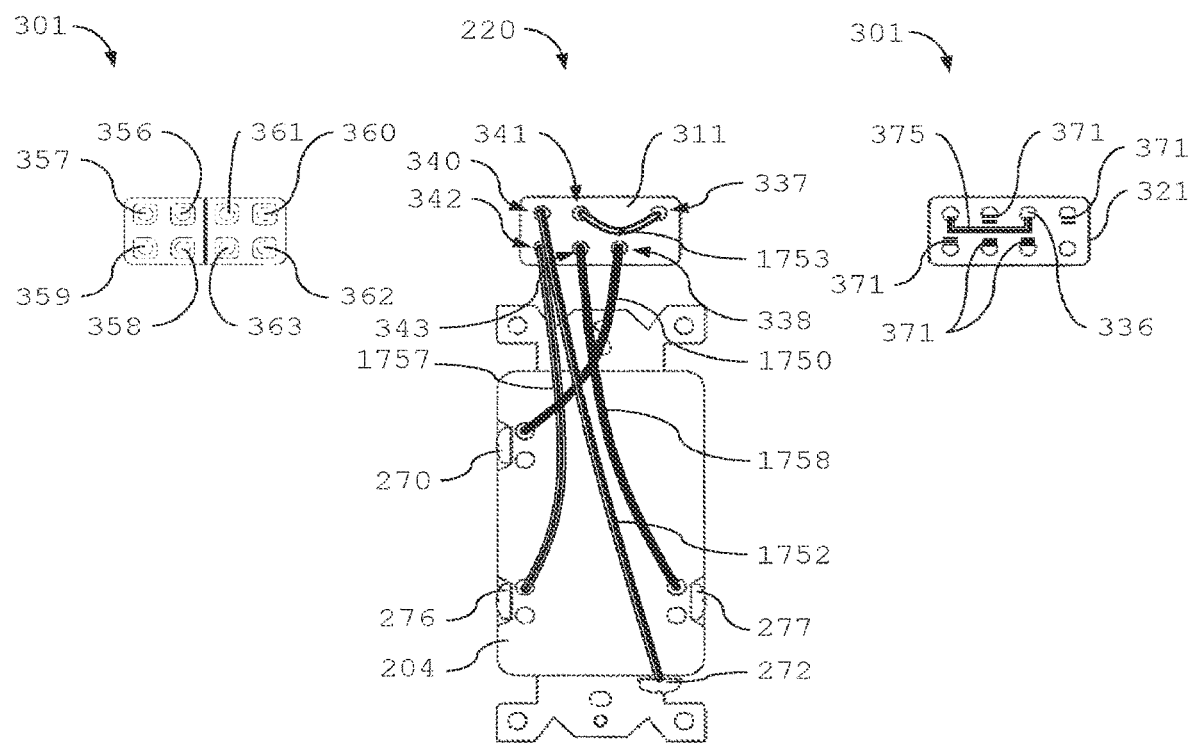
FIG. 18A illustrates a rear plan view of a 3-way switch modular electrical or electronic wiring device including an external connector assembly configured for remote power feed, connected to the electrical terminals of the electrical or electronic wiring device by pig-tail jumper electrical wires in accordance with exemplary embodiments.
FIG. 18B illustrates a front view of an external connector assembly in accordance with the exemplary embodiment of FIG. 18A with the second-end terminal ports shown.
FIG. 18C illustrates a rear simplified diagrammatic view of the body of an external connector assembly in accordance with the exemplary embodiment of FIG. 18A with a cover removed exposing the internal electrical terminals and the electrical members.

FIG. 18A illustrates the modular electrical or electronic wiring device assembly 220 comprising the external connector assembly 301 as illustrated in FIG. 2B, connected to a 3-way switch electrical or electronic wiring device 204 according to an exemplary embodiment of the present invention. FIG. 18B illustrates the front portion of the external connector assembly 301 (for use with building electrical load cables and load shorting link assemblies fitted with cable protector assemblies 600-601, building electrical jumper cables fitted with cable protector assemblies 600-601 and 700-701 and building electrical feeder cables fitted with cable protector assemblies 701-701) with second-end connection terminal ports 356-363. FIG. 18C illustrates a rear internal portion of the external connector assembly 301 with a rear cover portion 311 removed and with the internal connection terminals 336-343. As illustrated, the first-row connection terminals 340 (the ground (or protective earth) load input connection terminal and 336 (the ground (or protective earth) load output connection terminal may be connected with an electrical cross-link member 375, and the remaining connection terminals 337, 338, 341, 342 and 343 may be provided with internal electrical members 371 as would be the case for applications where a 3-way switch (with remote power feed) type electrical or electronic wiring device configuration may be used. Pig-tail jumper electrical wire 1750 may have black insulation around a conductor and may be connected between first-end connection terminal opening 338 (the hot (or live) or traveler #1 load output connection terminal) and the common electrical connection terminal 270 of the electrical or electronic wiring device 204. Pig-tail jumper electrical wire 1752 may have green insulation around a conductor and may be connected between first-end connection terminal opening 340 (the ground (or protective earth) load input connection terminal and the ground (or protective earth) electrical connection terminal 272 of the electrical or electronic wiring device 204. Pig-tail jumper electrical wire 1758 may have black insulation around a conductor and may be connected between first-end connection terminal opening 343 (the traveler #2 load input electrical connection terminal) and the traveler #2 electrical connection terminal 277 of the electrical or electronic wiring device 204. Pig-tail jumper electrical wire 1757 may have red insulation around a conductor and may be connected between first-end connection terminal opening 342 (the switched hot (or switched live) or traveler #1 load input connection terminal) and the traveler #1 electrical connection terminal 276 of the electrical or electronic wiring device 204. External connector neutral link electrical wire 1753 may have white insulation around a conductor and may be connected between first-end connection terminal opening 341 (the neutral load input electrical connection terminal) and the first-end connection terminal opening 337 (the neutral load output electrical connection terminal).

Figures 19A, 19B, 19C:
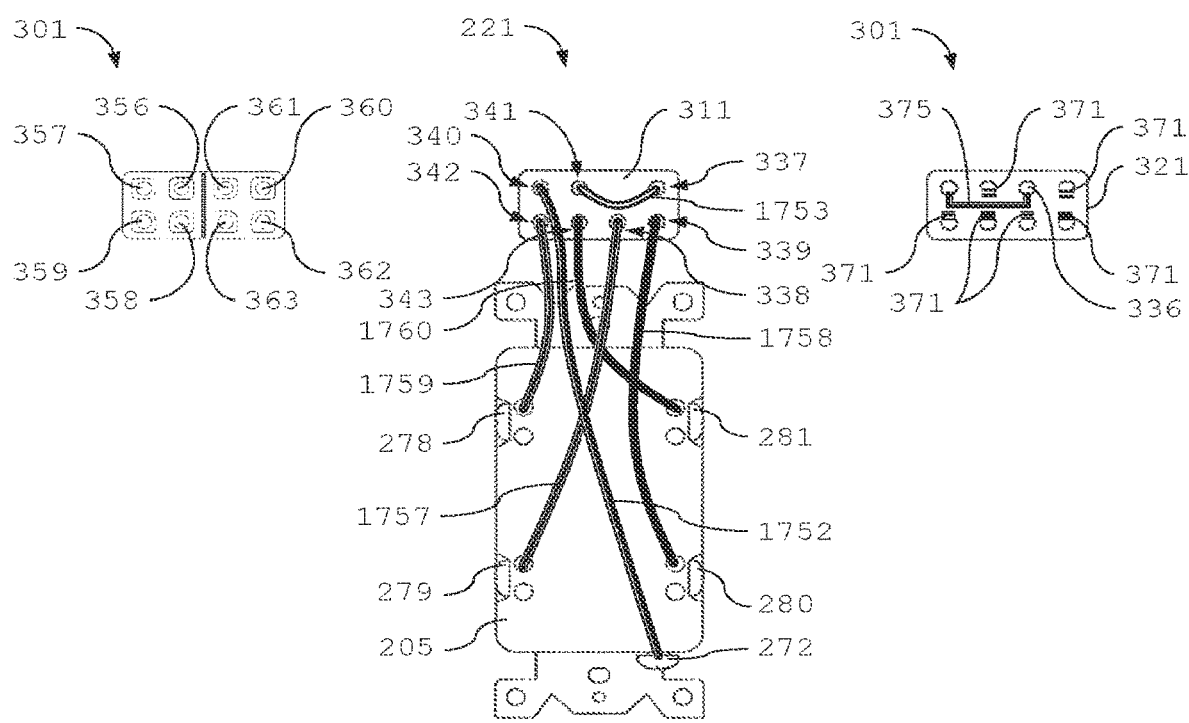
FIG. 19A illustrates a rear plan view of a 4-way switch modular electrical or electronic wiring device including an external connector assembly configured for remote power feed, connected to the electrical terminals of the electrical or electronic wiring device by pig-tail jumper electrical wires in accordance with exemplary embodiments.
FIG. 19B illustrates a front view of an external connector assembly in accordance with the exemplary embodiment of FIG. 19A with the second-end terminal ports shown.
FIG. 19C illustrates a rear simplified diagrammatic view of the body of an external connector assembly in accordance with the exemplary embodiment of FIG. 19A with a cover removed exposing the internal electrical terminals and the electrical members.

FIG. 19A illustrates the modular electrical or electronic wiring device assembly 221 comprising the external connector assembly 301 as illustrated in FIG. 2B, connected to a 4-way switch electrical or electronic wiring device 205 according to an exemplary embodiment of the present invention. FIG. 19B illustrates the front portion of the external connector assembly 301 (for use with building electrical load cables and load shorting link assemblies fitted with cable protector assemblies 600-601, building electrical jumper cables fitted with cable protector assemblies 600-601 and 700-701 and building electrical feeder cables fitted with cable protector assemblies 701-701) with second-end connection terminal ports 356-363. FIG. 19C illustrates a rear internal portion of the external connector assembly 301 with a rear cover portion 311 removed and with the internal connection terminals 336-343. As illustrated, the first-row connection terminals 340 (the ground (or protective earth) load input connection terminal and 336 (the ground (or protective earth) load output connection terminal may be connected by an electrical cross-link member 375, and the remaining connection terminals 337, 338, 339, 341, 342 and 343 may be provided with internal electrical members 371 as would be the case for applications where a 3-way switch (with remote power feed) type electrical or electronic wiring device configuration may be used. Pig-tail jumper electrical wire 1752 may have green insulation around a conductor and may be connected between first-end connection terminal opening 340 (the ground (or protective earth) load input connection terminal and the ground (or protective earth) electrical connection terminal 272 of the electrical or electronic wiring device 205. Pig-tail jumper electrical wire 1760 may have black insulation around a conductor and may be connected between first-end connection terminal opening 343 (the traveler #2 load input connection terminal) and the input #2 electrical connection terminal 281 of the electrical or electronic wiring device 205. Pig-tail jumper electrical wire 1758 may have black insulation around a conductor and may be connected between first-end connection terminal opening 339 (the traveler #2 load output connection terminal) and the output #2 electrical connection terminal 280 of the electrical or electronic wiring device 205. Pig-tail jumper electrical wire 1759 may have red insulation around a conductor and may be connected between first-end connection terminal opening 342 (the switched hot (or switched live) or traveler #1 load input connection terminal) and the input #1 electrical connection terminal 278 of the electrical or electronic wiring device 205. Pig-tail jumper electrical wire 1757 may have red insulation around a conductor and may be connected between first-end connection terminal opening 338 (the switched hot (or switched live) or traveler #1 load output connection terminal) and the output #1 electrical connection terminal 279 of the electrical or electronic wiring device 205. External connector neutral link electrical wire 1753 may have white insulation around a conductor and may be connected between first-end connection terminal opening 341 (the neutral load input electrical connection terminal) and the first-end connection terminal opening 337 (the neutral load output electrical connection terminal).

Figures 20A, 20B, 20C:
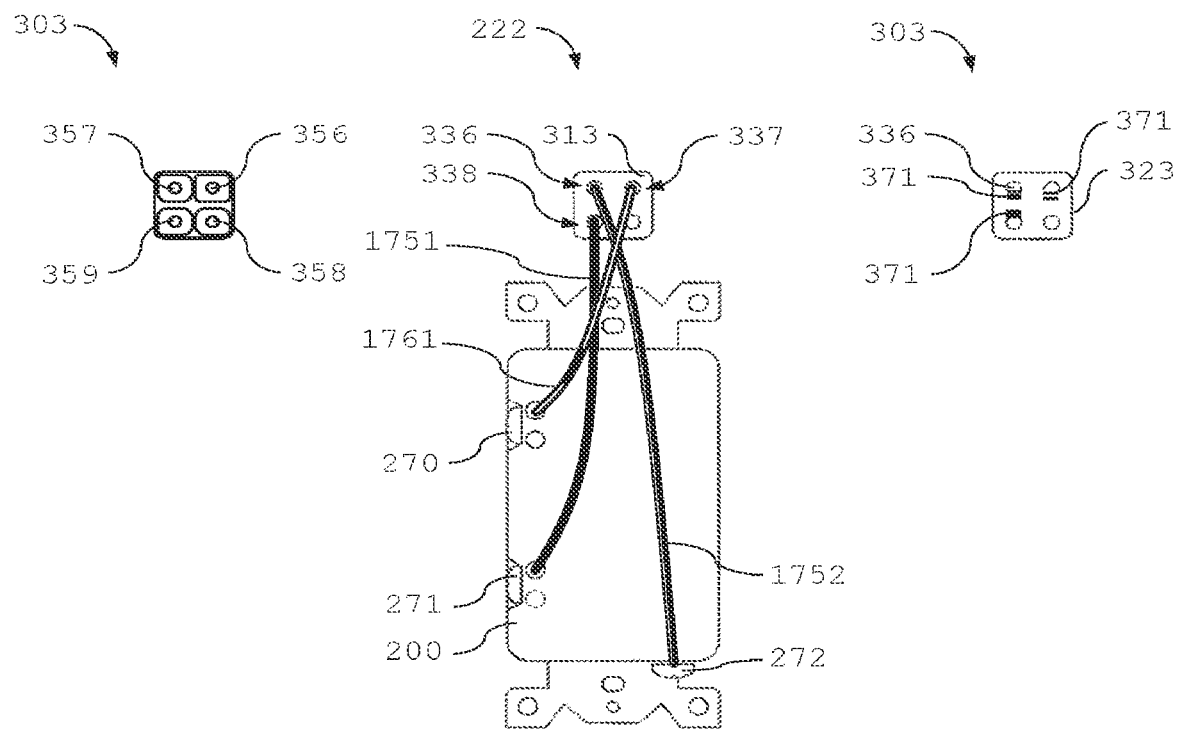
FIG. 20A illustrates a rear plan view of a 1-pole switch modular electrical or electronic wiring device including an external connector assembly configured for remote power feed, connected to the electrical terminals of the electrical or electronic wiring device by pig-tail jumper electrical wires in accordance with exemplary embodiments.
FIG. 20B illustrates a front view of an external connector assembly in accordance with the exemplary embodiment of FIG. 20A with the second-end terminal ports shown.
FIG. 20C illustrates a rear simplified diagrammatic view of the body of an external connector assembly in accordance with the exemplary embodiment of FIG. 20A with a cover removed exposing the internal electrical terminals and the electrical members.

FIG. 20A illustrates the modular electrical or electronic wiring device assembly 222 comprising the external connector assembly 303 as illustrated in FIG. 2D, connected to a 1-pole switch electrical or electronic wiring device 200 according to an exemplary embodiment of the present invention. FIG. 20B illustrates the front portion of the external connector assembly 303 (for use with building electrical load cables fitted with cable protector assemblies 600-601) with second-end connection terminal ports 356-359. FIG. 20C illustrates a rear internal portion of the external connector assembly 303 with a rear cover portion 313 removed and with the internal connection terminals 336-339. As illustrated, the connection terminals 336, 337 and 338 may be provided with internal electrical members 371 as would be the case for applications where a 1-pole switch (with remote power feed) type electrical or electronic wiring device configuration may be used. Pig-tail jumper electrical wire 1752 may have green insulation around a conductor and may be connected between first-end connection terminal opening 336 (the ground (or protective earth) load output connection terminal and the ground (or protective earth) electrical connection terminal 272 of the electrical or electronic wiring device 200. Pig-tail jumper electrical wire 1751 may have black insulation around a conductor and may be connected between first-end connection terminal opening 338 (the switched hot (or switched live) or traveler #1 load output electrical connection terminal) and the switched hot (or switched live) electrical connection terminal 271 of the electrical or electronic wiring device 200. Pig-tail jumper electrical wire 1761 may have white insulation around a conductor marked with a black band and may be connected between first-end connection terminal opening 337 (the neutral load output electrical connection terminal) and the hot (or live) electrical connection terminal 270 of the electrical or electronic wiring device 200.

There are many alternative types of electrical or electronic wiring devices that may be connected to the external connector assemblies of the exemplary embodiments of the present invention. The above descriptions are not intended to be exhaustive of all types possible but rather to show examples of and how many of the popular types of electrical or electronic wiring device may be connected to the electrical cable connecting system.

Figures 21A, 21B, 21C, 21D:
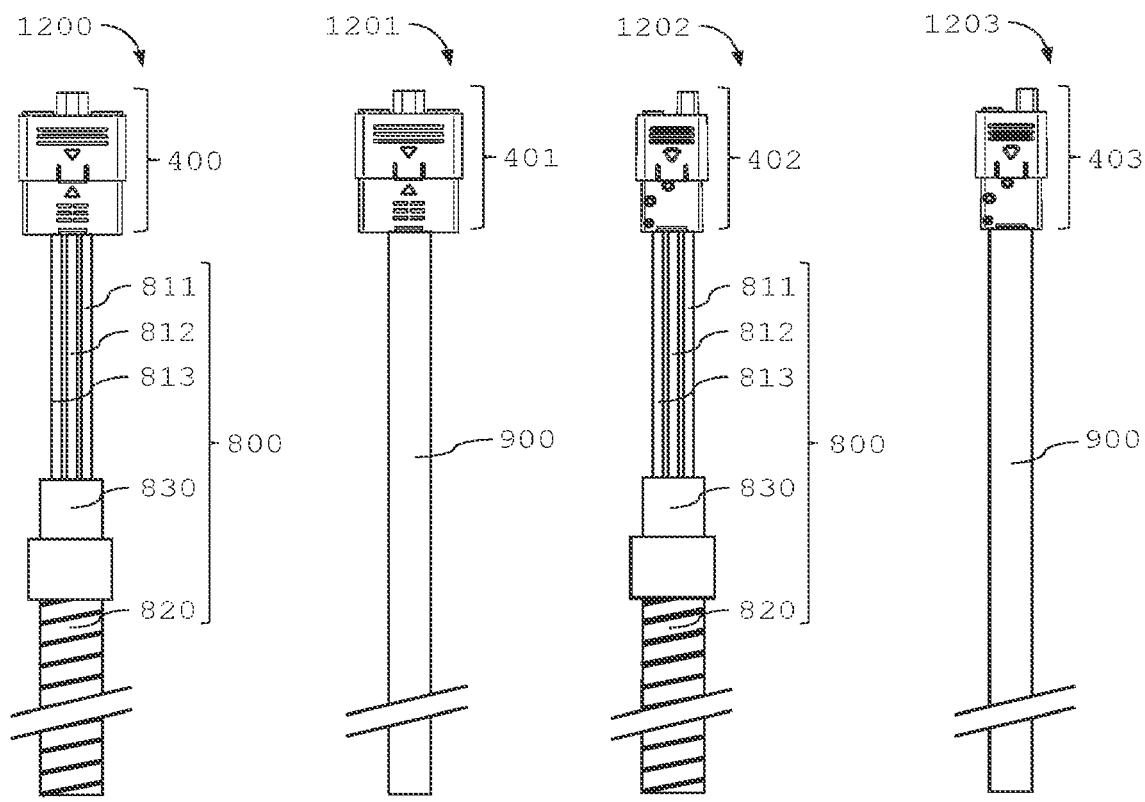
FIG. 21A illustrates a Metal Clad (MC) type building electrical supply cable assembly according to an exemplary embodiment.
FIG. 21B illustrates a Non-Metallic sheathed (NM) type building electrical supply cable assembly according to an exemplary embodiment.
FIG. 21C illustrates a Metal Clad (MC) type building electrical supply cable assembly according to an exemplary embodiment.
FIG. 21D illustrates a Non-Metallic sheathed (NM) type building electrical supply cable assembly according to an exemplary embodiment.

FIG. 21A illustrates the MC type building electrical supply cable assembly 1200 which may include a supply cable protector assembly 400 fitted to the MC type electrical cable assembly 800 and its internal electrical cable wires 811-813 according to an exemplary embodiment of the present invention. For convenience of installation an optional cable gland 830 may be fitted over the end of the jacket 820. The other end of the MC type electrical cable assembly 800 may be stripped of its jacket 820 and another optional cable gland 830 (not illustrated) may be fitted and its internal electrical cable wires 811-813 may be stripped of their insulation (not illustrated) to a predetermined length.

FIG. 21B illustrates the NM type building electrical supply cable assembly 1201 which may include a supply cable protector assembly 401 fitted to the NM type electrical cable 900 according to an exemplary embodiment of the present invention. The other end of the NM type electrical cable 900 may be stripped of a jacket (illustrated but not labelled) and its internal electrical cable wires (not illustrated) stripped of insulation to a predetermined length.

FIG. 21C illustrates the MC type building electrical supply cable assembly 1202 which may include a supply cable protector assembly 402 fitted to the MC type electrical cable assembly 800 and its internal electrical cable wires 811-813 for use with wiring device electrical boxes having ½-inch knock-outs according to an exemplary embodiment of the present invention. For convenience of installation an optional cable gland 830 may be fitted over the end of the jacket 820. The other end of the MC type electrical cable assembly 800 may be stripped of its jacket 820 and another optional cable gland 830 (not illustrated) may be fitted and its internal electrical cable wires 811-813 stripped of insulation (not illustrated) to a predetermined length.

FIG. 21D illustrates the NM type building electrical supply cable assembly 1203 which may include a supply cable protector assembly 403 fitted to the NM type electrical cable 900 for use with wiring device electrical boxes having ½-inch knock-outs according to an exemplary embodiment of the present invention. The other end of the NM type electrical cable 900 may be stripped of its jacket (illustrated but not labelled) and NM type building electrical supply cable wires (not illustrated) stripped of insulation to a predetermined length.

Figures 22A, 22B, 22C, 22D:
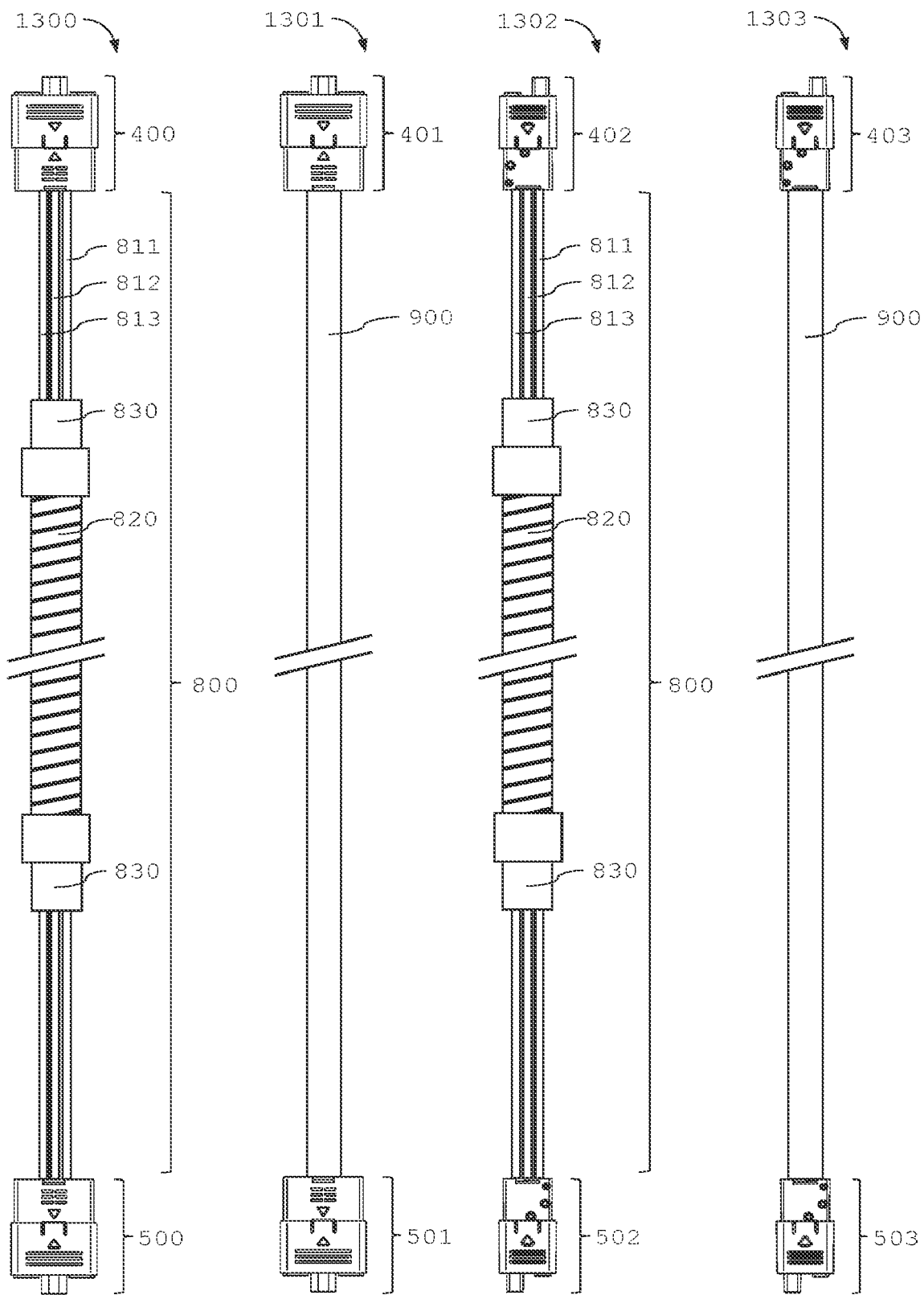
FIG. 22A illustrates a Metal Clad (MC) type building electrical branch cable assembly according to an exemplary embodiment.
FIG. 22B illustrates a Non-Metallic sheathed (NM) type building electrical branch cable assembly according to an exemplary embodiment.
FIG. 22C illustrates a Metal Clad (MC) type building electrical branch cable assembly according to an exemplary embodiment.
FIG. 22D illustrates a Non-Metallic sheathed (NM) type building electrical branch cable assembly according to an exemplary embodiment.

FIG. 22A illustrates the MC type building electrical branch cable assembly 1300 which may include a supply cable protector assembly 400 fitted to the MC type electrical cable assembly 800 and its internal electrical cable wires 811-813 according to an exemplary embodiment of the present invention. For convenience of installation an optional cable gland 830 may be fitted over the end of the jacket 820. The other end of the MC type electrical cable assembly 800 may also be fitted with an optional cable gland 830 and a branch cable protector assembly 500 may be fitted to its internal electrical cable wires 811-813.

FIG. 22B illustrates the NM type building electrical branch cable assembly 1301 which may include a supply cable protector assembly 401 fitted to the NM type electrical cable 900 according to an exemplary embodiment of the present invention. The other end of the NM type electrical cable 900 may be fitted with a branch cable protector assembly 501.

FIG. 22C illustrates the MC type building electrical branch cable assembly 1302 which may include a supply cable protector assembly 402 fitted to the MC type electrical cable assembly 800 and its internal electrical cable wires 811-813 for use with wiring device electrical boxes having ½-inch knock-outs according to an exemplary embodiment of the present invention. For convenience of installation an optional cable gland 830 may be fitted over the end of the jacket 820. The other end of the MC type electrical cable assembly 800 may be fitted with an optional cable gland 830 and a branch cable protector assembly 502 may be fitted to its internal electrical cable wires 811-813.

FIG. 22D illustrates the NM type building electrical branch cable assembly 1303 which may include a supply cable protector assembly 403 fitted to the NM type electrical cable 900 for use with wiring device electrical boxes having ½-inch knock-outs according to an exemplary embodiment of the present invention. The other end of the NM type electrical cable 900 may be fitted with a branch cable protector assembly 503.

FIG. 23A illustrates the internal electrical branch cable assembly 1304 which may include a supply cable protector assembly 400 fitted to the discrete electrical wires 1701-1703 for use within wiring device electrical boxes according to an exemplary embodiment of the present invention. The other end of the discrete electrical wires 1701-1703 may be fitted with a branch cable protector assembly 500.

FIG. 23B illustrates the internal electrical branch cable assembly 1305 which may include a supply cable protector assembly 401 fitted to the discrete electrical wires 1701-1703 for use within wiring device electrical boxes having ½-inch knock-outs according to an exemplary embodiment of the present invention. The other end of the discrete electrical wires 1701-1703 may be fitted with a branch cable protector assembly 501.

FIG. 24A illustrates the MC type building electrical load cable assembly 1400 which may include a load output cable protector assembly 600 fitted to the MC type electrical cable 800 and its internal electrical cable wires 811-813 according to an exemplary embodiment of the present invention. For convenience of installation an optional cable gland 830 may be fitted over the end of the jacket 820. The other end of the MC type electrical cable 800 may be stripped of its jacket 820 and another optional cable gland 830 (not illustrated) may be fitted and its internal electrical cable wires 811-813 may be stripped of insulation (not illustrated) to a predetermined length.

FIG. 24B illustrates the NM type building electrical load cable assembly 1401 which may include a load output cable protector assembly 601 fitted to the NM type electrical cable 900 according to an exemplary embodiment of the present invention. The other end of the NM type electrical cable 900 may be stripped of its jacket (illustrated but not labelled) and its internal electrical cable wires (not illustrated) may be stripped of insulation to a predetermined length.

FIG. 25 illustrates a load shorting link assembly 1800 connected to a load cable protector assembly 600 comprising a body 621-623 (623 not shown) and a slidable cover 610 according to an exemplary embodiment of the present invention. The load shorting link discrete electrical wire 1707 may be connected between the hot (or live) channel position and the neutral channel position of the load output cable protector assembly 600 and may be used to terminate building electrical cables with remote power feed.

FIG. 26 illustrates the load link cable assembly 1900 which may include an external connector assembly 303 fitted to the discrete electrical wires 1704-1706 according to an exemplary embodiment of the present invention. The other end of the discrete electrical wires 1704-1706 may be stripped of insulation to a predetermined length suitable for terminating to a load such as for example a lighting fixture. The load link cable assembly 1900 may then be used to facilitate direct connection to building electrical feeder 1600-1601 or building electrical jumper cable assemblies 1500-1501 directly by the operation of its external connector 303 manual or tool operated and releasable clamp connection terminals.

Figures 27A, 27B, 28A, 28B:
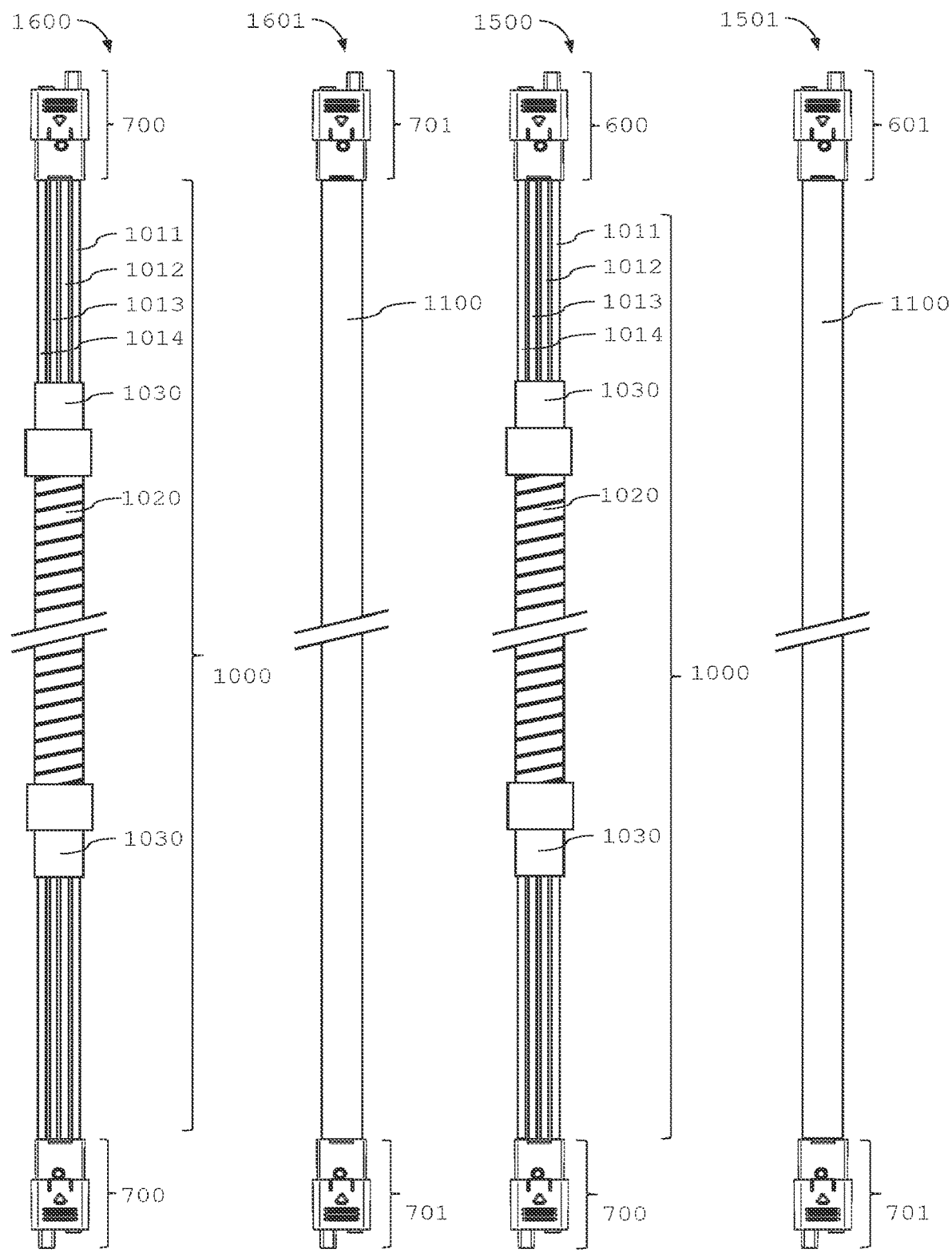
FIG. 27A illustrates a Metal Clad (MC) type building electrical feeder cable assembly according to an exemplary embodiment.
FIG. 27B illustrates a Non-Metallic sheathed (NM) type building electrical feeder cable assembly according to an exemplary embodiment.
FIG. 28A illustrates a Metal Clad (MC) type building electrical jumper cable assembly according to an exemplary embodiment.
FIG. 28B illustrates a Non-Metallic sheathed (NM) type building electrical jumper cable assembly according to an exemplary embodiment.

FIG. 27A illustrates the MC type building electrical feeder cable assembly 1600 which may include a load input cable protector assembly 700 fitted to the MC type electrical cable assembly 1000 and its internal electrical cable wires 1011-1014 according to an exemplary embodiment of the present invention. For convenience of installation an optional cable gland 1030 may be fitted over the end of the jacket 1020. The other end of the MC type electrical cable assembly 1000 may also be fitted with an optional cable gland 1030 and another load input cable protector assembly 700 may be fitted to its internal electrical cable wires 1011-1014.

FIG. 27B illustrates the NM type building electrical feeder cable assembly 1601 which may include a load input cable protector assembly 701 fitted to the NM type electrical cable 1100 according to an exemplary embodiment of the present invention. The other end of the NM type electrical cable 1100 may be fitted with another load input cable protector assembly 701.

FIG. 28A illustrates the MC type building electrical jumper cable assembly 1500 which may include a load output cable protector assembly 600 fitted to the MC type electrical cable assembly 1000 and its internal electrical cable wires 1011-1014 according to an exemplary embodiment of the present invention. For convenience of installation an optional cable gland 1030 may be fitted over the end of the jacket 1020. The other end of the MC type electrical cable assembly 1000 may be fitted with an optional cable gland 1030 and a load input cable protector assembly 700 may be fitted to its internal electrical cable wires 1011-1014.

FIG. 28B illustrates the NM type building electrical jumper cable assembly 1501 which may include a load output cable protector assembly 601 fitted to the NM type electrical cable 1100 according to an exemplary embodiment of the present invention. The other end of the NM type electrical cable 1100 may be fitted with a load input cable protector assembly 701.

One or more of the above-described features from any of the above-referenced exemplary embodiments may be used alone or in combination with any other one or more of the above-described features from any of the above-referenced exemplary embodiments in any suitable combination. Although the description below is made with examples to specific figures, the description is not intended to be limiting.

By using the electrical cable connecting system detailed above, electrical or electronic wiring device installations may be substantially completed without an installer being exposed to hot or live building electrical cable wires or contacts beyond the breaker or distribution panel. Furthermore, an electrical cable connecting system may be completed substantially without the use of tools and enables the installer to simply open and close the manual levers on external connectors and insert building electrical cables that are supplied pre-cut and fitted with cable protectors. Even normally complex staircase lighting wiring systems may be entirely installed in the same way de-skilling and reducing the amount of labor in the installation process significantly. Furthermore, the exemplary embodiments above allow electrical or electronic wiring devices to be replaced safely without an installer or homeowner having to turn the power off at the breaker (not shown). For example, none of the connection terminals on the external connector, or the building electrical cable wire conductors need to be exposed. Many homeowners or installers are not skilled at selecting the correct breaker or choose not to turn the power off at the breaker if the building is in active use during maintenance.

Although each exemplary embodiment has been described in detail, any features and modifications that are applicable to one embodiment may also be applicable to other embodiments. Although the invention has been described herein with reference to specific exemplary embodiments, these descriptions are not meant to be construed in a limiting way. Various modifications of the disclosed exemplary embodiments, as well as alternative embodiments, will become apparent to persons of ordinary skill in the art upon reference to the description of the exemplary embodiments above. The invention and the specific exemplary embodiments described herein may be readily utilized as a basis for modifying or designing other structures or methods for carrying out the same purposes as the invention. Equivalent constructions do not depart from the spirit and scope of the invention as set forth in the claims. It is to be understood that the claims are intended to cover modifications or embodiments that fall within the scope of the invention.

What is claimed is:

1. An electrical connector, configured to:
   receive at least two cable wires directly through terminal ports of the connector, and secure stripped or bare conductors of the at least two cable wires within an inner portion of the connector such that each of the at least two cable wires is electrically coupled to a corresponding conductive internal electrical member of an electrical connection terminal within the connector, wherein one or more of the terminal ports is configured to align with at least one polarization or key-way feature of a slidable cover of an electrical wire protector in only one or certain configurations.

2. A modular electrical or electronic wiring device, comprising the electrical connector of claim 1 and an electrical or electronic wiring device, wherein the electrical or electronic wiring device comprises internal electrical terminals that are directly coupled to respective conductive internal electrical members of the connector.

3. An integrated modular electrical or electronic wiring device, comprising:
   an integrated electrical connector that is integral with an electrical or electronic wiring device,
   wherein the integrated modular electrical or electronic wiring device is configured to:
   receive at least two cable wires directly through at least two terminal ports of the integrated electrical connector, and
   secure stripped or bare conductors of the at least two cable wires within an inner portion of the integrated electrical connector such that each of the at least two cable wires is electrically coupled to a corresponding conductive internal electrical member of an electrical connection terminal within the integrated electrical connector,
   wherein one or more terminal ports is configured to align with at least one polarization or key-way feature of a slidable cover of at least one electrical wire protector in only one or certain configurations, and
   wherein the electrical or electronic wiring device comprises internal electrical connection terminals that are directly coupled to or integral with respective conductive internal electrical members of the integrated electrical connector.

* * * * *